(12) United States Patent
Warren et al.

(10) Patent No.: US 8,569,391 B2
(45) Date of Patent: Oct. 29, 2013

(54) ORDERED POROUS MESOSTRUCTURED MATERIALS FROM NANOPARTICLE-BLOCK COPOLYMER SELF-ASSEMBLY

(75) Inventors: Scott Warren, Washington, DC (US);
Ulrich Wiesner, Ithaca, NY (US);
Francis J. DiSalvo, Jr., Ithaca, NY (US)

(73) Assignee: Cornell University, Ithaca, NY (US)

( * ) Notice: Subject to any disclaimer, the term of this patent is extended or adjusted under 35 U.S.C. 154(b) by 244 days.

(21) Appl. No.: 12/812,714

(22) PCT Filed: Jan. 13, 2009

(86) PCT No.: PCT/US2009/030860
§ 371 (c)(1),
(2), (4) Date: Feb. 4, 2011

(87) PCT Pub. No.: WO2009/097184
PCT Pub. Date: Aug. 6, 2009

(65) Prior Publication Data
US 2011/0130478 A1 Jun. 2, 2011

Related U.S. Application Data

(60) Provisional application No. 61/011,030, filed on Jan. 14, 2008.

(51) Int. Cl.
*C08F 297/02* (2006.01)
*B22F 9/24* (2006.01)
*B22F 7/02* (2006.01)

(52) U.S. Cl.
USPC ............... 521/153; 521/50; 521/61; 521/154; 264/44; 216/2; 977/932

(58) Field of Classification Search
USPC ........................................ 521/153
See application file for complete search history.

(56) References Cited

U.S. PATENT DOCUMENTS

2006/0057464 A1  3/2006  Kim et al.

FOREIGN PATENT DOCUMENTS

JP  2002-190324  7/2002
JP  2003-342411  12/2003
(Continued)

OTHER PUBLICATIONS

Kamperman, Marleen; Wiesner, Ulrich. "Mesostructured Polymer-Inorganic Hybrid Materials from Blocked Macromolecular Architectures and Nanoparticles" in "Block Copolymers in Nanoscience" edited by M. Lazzari, G. Liu, and S. Lecommandoux (Wiley 2006).*

(Continued)

*Primary Examiner* — Randy Gulakowski
*Assistant Examiner* — Christina Wales
(74) *Attorney, Agent, or Firm* — Harris Beach PLLC

(57) ABSTRACT

The invention provides mesostructured materials and methods of preparing mesostructured materials including metal-rich mesostructured nanoparticle-block copolymer hybrids, porous metal-nonmetal nanocomposite mesostructures, and ordered metal mesostructures with uniform pores. The nanoparticles can be metal, metal alloy, metal mixture, intermetallic, metal-carbon, metal-ceramic, semiconductor-carbon, semiconductor-ceramic, insulator-carbon or insulator-ceramic nanoparticles, or combinations thereof. A block copolymer/ligand-stabilized nanoparticle solution is cast, resulting in the formation of a metal-rich (or semiconductor-rich or insulator-rich) mesostructured nanoparticle-block copolymer hybrid. The hybrid is heated to an elevated temperature, resulting in the formation of an ordered porous nanocomposite mesostructure. A nonmetal component (e.g., carbon or ceramic) is then removed to produce an ordered mesostructure with ordered and large uniform pores.

29 Claims, 32 Drawing Sheets

(56) References Cited

FOREIGN PATENT DOCUMENTS

JP        2007-308544        11/2007
KR        10-0764613 B1    10/2007

OTHER PUBLICATIONS

Kim, Bumjoon J; Chiu, Julia J; Yi, Gi-Ra; Pine, David J; Kramer, Edward J. Nanoparticle-Induced Phase Transitions in Diblock-Copolymer Films. Advanced Materials, 2005, 17, 2618-2622.*

Patent Cooperation Treaty Office, PCT/US09/030860 International Search Report, dated Nov. 30, 2009, 5 pgs.

Patent Cooperation Treaty Office, PCT/US09/030860 Written Opinion of the International Searching Authority, dated Nov. 24, 2009, 4 pgs.

Quaranta et al., Optical sensing to organic vapors of fluorinated polyimide nanocomposites containing silver nanoclusters, Sensors and Actuators B, 2006, 118, pp. 418-424.

Lilei Ye et al., Effect of Ag Particle Size on Electrical Conductivity of Isotropically Conductive Adhesives, IEEE Transactions on Electronics Packaging Manufacturing, 1999, vol. 22, No. 4, pp. 299-302.

Hermes, Stephan et al., Loading of porous metal-organic open frameworks with organometallic CVD precursors: inclusion compounds of the type [LnM]a@MOF-5, J. Mater. Chem., 2006, 16, pp. 2464-2472.

* cited by examiner

ORDERED POROUS MESOSTRUCTURED MATERIALS FROM NANOPARTICLE-BLOCK COPOLYMER SELF-ASSEMBLY

STATEMENT REGARDING FEDERALLY SPONSORED RESEARCH OR DEVELOPMENT

The disclosed invention was made with government support under contract no. DE-FG02-03ER46072 from the Department of Energy and contract no. DMR-0605856 from the National Science Foundation. The government has rights in this invention.

CROSS-REFERENCE TO RELATED APPLICATIONS

This application is a national stage application under 35 U.S.C. §371 of PCT Application No. PCT/US2009/030860, filed Jan. 13, 2009, which claims priority to and the benefit of U.S. provisional patent application Ser. No. 61/011,030, filed Jan. 14, 2008, entitled "Ordered metal-rich mesostructures from nanoparticle-block copolymer self-assembly," which is incorporated herein by reference in its entirety.

1. TECHNICAL FIELD

This invention relates generally to porous mesostructured materials and methods for producing them. The invention further relates to ordered metal-rich mesostructures and methods for producing them. The invention also relates to methods for producing porous mesostructures from metal nanoparticle-block copolymer self-assembly.

2. BACKGROUND OF THE INVENTION

Despite considerable progress in the field of porous solids, major challenges remain in the synthesis of ordered mesostructured materials with high metal content from the coassembly of macromolecular surfactants and inorganic species. The ability to control the structure of metals at the mesoscale (2 to 50 nm) helps to promote the development of improved fuel cell electrodes and may also assist in the miniaturization of optical and electronic materials for data transmission, storage, and computation (A. Haryono, W. H. Binder, Small 2, 600 (2006); A. C. Balazs, T. Emrick, T. P. Russell, Science 314, 1107 (2006)).

An early route to preparing mesoporous metals involves the dealloying of a less noble metal from a bimetallic alloy; this has been used for the preparation of Raney nickel and other metals (M. Raney, U.S. Pat. No. 1,628,190 (1927)). Dealloying processes provide limited control over structural parameters such as pore geometry and order. In contrast, block copolymer self-assembly or templating with metal species provides access to highly ordered structures. Synthetic routes to such structures have included adsorbing and then reducing metal ions within a preassembled block copolymer scaffold (Y. N. C. Chan, R. R. Schrock, R. E. Cohen, Chem. Mater. 4, 24 (1992)) and coassembling ligand-stabilized nanoparticles (NPs) with block copolymers (D. E. Fogg, L. H. Radzilowski, R. Blanski, R. R. Schrock, E. L. Thomas, Macromolecules 30, 417 (1997)). More recently, polymer-coated NPs that behave like surfactants have been isolated at the interface of block copolymer domains, which can create a bicontinuous morphology at higher loadings (B. J. Kim, G. H. Fredrickson, C. J. Hawker, E. J. Kramer, Langmuir 23, 7804 (2007)).

Despite this progress, the conversion of metal polymer hybrids into porous mesostructured materials with ordered and large pores (≥5 nm) has not been accomplished, in part because of the low volume fraction of metals in most hybrids and the widespread use of gold, which has a high diffusion coefficient and therefore retains its mesostructure only at low temperatures (P. Buffat, J.-P. Borel, Phys. Rev. A 13, 2287 (1976); R. Li, K. Sieradzki, Phys. Rev. Lett. 68, 1168 (1992); J. Erlebacher, M. J. Aziz, A. Karma, N. Dimitrov, K. Sieradzki, Nature 410, 450 (2001)). Although a protective organic layer can be added to metal NPs to prevent uncontrolled aggregation, even a thin organic layer represents a considerable volume of the overall material: For example, a 1-nm-diameter metal NP with a relatively thin 1-nm organic shell is just 4% metal by volume. As a result, the typical metal content in most block copolymer-metal NP hybrids is only a few volume %, and the prospects for converting the hybrid into an ordered porous mesostructured material, in which the metal would have a volume fraction between 60 and 75% for an inverse hexagonal structure, are poor. Mesoporous metals have been synthesized at a smaller length scale, with 2- to 4-nm pores, through the coassembly of metal ions with small-molecule surfactants followed by reduction (G. S. Attard et al., Science 278, 838 (1997); G. S. Attard, C. G. Göltner, J. M. Corker, S. Henke, R. H. Templer, Angew. Chem. Int. Ed. Engl. 36, 1315 (1997); Y. Yamauchi, T. Yokoshima, T. Momma, T. Osaka, K. Kuroda, J. Mater. Chem. 14, 2935 (2004); J. Jiang, A. Kucernak, Chem. Mater. 16, 1362 (2004)). The small pore size, however, limits the flow of liquids through the material, which is essential for many applications (D. Y. Zhao et al., Science 279, 548 (1998); M. E. Davis, Nature 417, 813 (2002)). Metals have also been deposited onto (W. A. Lopes, H. M. Jaeger, Nature 414, 735 (2001)) or into (J. Chai, D. Wang, X. Fan, J. M. Buriak, Nat. Nanotechnol. 2, 500 (2007)) thin films of block copolymers to create metal wires, but the surface dependent nature of the metal deposition most likely limits these processes to two-dimensional materials.

There is therefore a need in the art for mesostructured metal NP-block copolymer hybrids with exceptionally high NP loadings and tunable phase-separated morphologies with feature sizes>10 nm. There is also a need in the art for metal-rich mesostructures with ordered and large (≥5 nm) uniform pores.

Citation or identification of any reference in Section 2, or in any other section of this application, shall not be considered an admission that such reference is available as prior art to the present invention.

3. SUMMARY OF THE INVENTION

A method is provided for producing mesostructured materials composed of a single metal, multiple metals, alloys, intermetallics, transition metal oxides, metal-ceramic combinations, semiconductors, insulators or any combination thereof, with or without a framework of carbon or other inorganic or ceramic materials (e.g., silica). The metal(s) can be selected from the group consisting of platinum, palladium, gold, silver, copper, rhodium, ruthenium, iridium and bismuth.

A method of preparing a porous metal-carbon nanocomposite mesostructure is provided. In one embodiment, the method comprises:

(a) providing a block copolymer/ligand-stabilized metallic nanoparticle solution, in which nanoparticles are selected from the group consisting of metal, metal alloy, metal mixture, and intermetallic nanoparticles or combinations thereof;

(b) casting said solution resulting in the formation of a metal-rich mesostructured nanoparticle-block copolymer hybrid; and (c) heating said hybrid in an inert atmosphere to an elevated temperature resulting in the formation of an ordered porous metal-carbon nanocomposite mesostructure.

In one embodiment, the metallic nanoparticle solution comprises metallic nanoparticles, semiconductor nanoparticles, insulator nanoparticles or combinations thereof.

In another embodiment, the block copolymer includes a hydrophobic portion which comprises sp or $sp^2$ hybridized carbon atoms.

In another embodiment, the ligand-stabilized metallic nanoparticle further comprises a nonmetallic component selected from the group consisting of a semiconductor and an insulator.

In another embodiment, the semiconductor is selected from the group consisting of a transition metal oxide, a type IV semiconductor, a type III-V semiconductor and a type II-VI semiconductor.

In another embodiment, following step (c), carbon is removed to produce an ordered porous metal mesostructure.

In another embodiment, the carbon is removed by the use of a plasma, by acid etch or by heat treatment in air.

In another embodiment, the ordered porous metal-carbon nanocomposite mesostructure has a unit cell size of ≥10 nm.

In another embodiment, the ordered porous metal-carbon nanocomposite mesostructure has structural features sizes of ≥10 nm.

In another embodiment, the porous metal mesostructure has a unit cell size of ≥10 nm.

In another embodiment, the porous metal mesostructure has structural features sizes of ≥10 nm.

In another embodiment, the porous metal-carbon nanocomposite mesostructure is a porous platinum nanoparticle-carbon nanocomposite mesostructure. In another embodiment, in step (a), the block copolymer/ligand-stabilized nanoparticle solution is a PI-b-PDMAEMA block copolymer-ligand-stabilized platinum nanoparticle solution; in step (b), casting the solution results in the formation of a platinum rich mesostructured nanoparticle-block copolymer hybrid; and in step (c), heating the hybrid in the inert atmosphere to the elevated temperature results in the formation of an ordered porous platinum-carbon nanocomposite mesostructure. In another embodiment, following step (c) the carbon is removed to produce an ordered porous platinum mesostructure.

A method of preparing a porous semiconductor-carbon or insulator-carbon nanocomposite mesostructure is provided. In one embodiment, the method comprises:

(a) providing a block copolymer/ligand-stabilized semiconductor or insulator nanoparticle solution;

(b) casting said solution resulting in the formation of a semiconductor-rich or insulator-rich mesostructured nanoparticle-block copolymer hybrid; and (c) heating said hybrid in an inert atmosphere to an elevated temperature resulting in the formation of an ordered porous semiconductor-carbon or insulator-carbon nanocomposite mesostructure.

In another embodiment, the ligand-stabilized nanoparticle solution comprises semiconductor nanoparticles, insulator nanoparticles or combinations thereof.

In another embodiment, the block copolymer includes a hydrophobic portion which comprises sp or $sp^2$ hybridized carbon atoms.

In another embodiment, the semiconductor is selected from the group consisting of a transition metal oxide, a type IV semiconductor, a type III-V semiconductor and a type II-VI semiconductor.

In another embodiment, the following step (c), carbon is removed to produce an ordered porous semiconductor or insulator mesostructure.

In another embodiment, the carbon is removed by the use of a plasma, by acid etch or by heat treatment in air.

In another embodiment, the porous semiconductor-carbon or insulator-carbon nanocomposite mesostructure has a unit cell size of ≥10 nm.

In another embodiment, the porous semiconductor-carbon or insulator-carbon nanocomposite mesostructure has structural features sizes of ≥10 nm.

In another embodiment, the porous semiconductor or insulator mesostructure has a unit cell size of ≥10 nm.

In another embodiment, the porous semiconductor or insulator mesostructure has structural features sizes of ≥10 nm.

In another embodiment, the invention provides a porous semiconductor-carbon or insulator-carbon nanocomposite mesostructure produced by the above process.

In another embodiment, the invention provides a semiconductor or insulator mesostructure produced by the above process.

A method of preparing a metal-ceramic nanocomposite mesostructure is also provided. In one embodiment, the method comprises:

(a) providing a block copolymer/ligand-stabilized metallic nanoparticle solution, in which nanoparticles are selected from the group consisting of metal, metal alloy, metal mixture, and intermetallic nanoparticles or combinations thereof;

(b) casting said solution resulting in the formation of a metal-rich mesostructured nanoparticle-block copolymer hybrid; and (c) heating said hybrid in an inert atmosphere or air to an elevated temperature resulting in the formation of an ordered metal-ceramic nanocomposite mesostructure.

In another embodiment, the metallic nanoparticle solution comprises metallic nanoparticles made from different metals or from a combination of different metals.

In another embodiment, the block copolymer comprises a hydrophobic portion which transforms upon heating into a ceramic.

In another embodiment, the ordered metal-ceramic nanocomposite mesostructure is porous.

In another embodiment, the metal-ceramic nanocomposite mesostructure has a unit cell size of ≥10 nm.

In another embodiment, the metal-ceramic nanocomposite mesostructure has structural feature sizes of ≥10 nm.

A method of preparing a semiconductor-ceramic or insulator-ceramic nanocomposite mesostructure is also provided. In one embodiment, the method comprises:

(a) providing a block copolymer/ligand-stabilized semiconductor or insulator nanoparticle solution;

(b) casting said solution resulting in the formation of a semiconductor-rich or insulator-rich mesostructured nanoparticle-block copolymer hybrid; and (c) heating said hybrid in an inert atmosphere or air to an elevated temperature resulting in the formation of an ordered semiconductor-ceramic or insulator-ceramic nanocomposite mesostructure.

In another embodiment, the ligand-stabilized nanoparticle solution comprises semiconductor nanoparticles, insulator nanoparticles or combinations thereof.

In another embodiment, the block copolymer comprises a hydrophobic portion which transforms upon heating into a ceramic.

In another embodiment, the ordered semiconductor-ceramic or insulator-ceramic nanocomposite mesostructure is porous.

In another embodiment, the semiconductor-ceramic or insulator-ceramic nanocomposite mesostructure has a unit cell size of ≥10 nm.

In another embodiment, the semiconductor-ceramic or insulator-ceramic nanocomposite mesostructure has structural feature sizes of ≥10 nm.

An ordered semiconductor-ceramic or insulator-ceramic nanocomposite mesostructure produced by the above process is also provided.

The metal of the methods or compositions of the invention can be selected from the group consisting of platinum, palladium, gold, silver, copper, rhodium, ruthenium, iridium and bismuth.

In one embodiment, the metal component comprises at least two distinct metals.

In another embodiment, the at least two metals comprise an alloy, a metal mixture or an intermetallic.

In another embodiment, the ligand comprises N,N-di-2-propoxyethyl-N-3-mercaptopropyl-N-methylammonium chloride or N,N-diethoxyethyl-N-methyl-N-3-mercaptopropyl ammonium chloride.

In another embodiment, the nanoparticle has high solubility in organic solvents.

In another embodiment, the nanoparticle has a metal volume fraction of at least 3%.

In another embodiment, the nanoparticle has a semiconductor or insulator volume fraction of at least 3%.

In another embodiment, the nanoparticle has dispersion in a block of the block copolymer from 5-95 vol. %.

In another embodiment, the diameter of the nanoparticle is equal or below the root mean square end-to-end distance relative to the size of the block of the block copolymer with which it mixes.

Ligands suitable for stabilizing nanoparticles are also provided.

In one embodiment, the ligand comprises N,N-di-2-propoxyethyl-N-3-mercaptopropyl-N-methylammonium chloride.

In another embodiment, the ligand has the following structure:

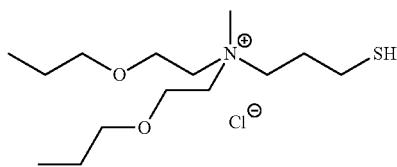 [SMILES: CCCOCC[N+](C)(CCCS)CCOCCC ; [Cl-]]

In another embodiment, the ligand comprises N,N-diethoxyethyl-N-methyl-N-3-mercaptopropyl ammonium chloride.

In another embodiment, the ligand has the following structure:

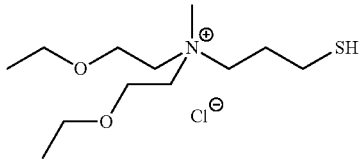 [SMILES: CCOCC[N+](C)(CCCS)CCOCC ; [Cl-]]

In another embodiment, the nanoparticle is selected from the group consisting of metal, metal alloy, metal mixture, intermetallic, semiconductor and insulator nanoparticles or a combination thereof.

In another embodiment, the ligand is attached to the nanoparticle.

In another embodiment, the chloride is replaced fully or partially by the halide anions fluoride, bromide, or iodide.

In another embodiment, the propyl group between the nitrogen and sulfur atoms is replaced with an ethyl, butyl, or pentyl group.

In another embodiment, the thiol is replaced by an amine, phosphine, or selenide.

In another embodiment, the N-methyl group is replaced by N-ethyl, N-propyl, N-butyl, N-2-propoxyethyl, or N-2-ethoxyethyl.

In another embodiment, the ethyl group that connects the oxygen and nitrogen is replaced by methyl, propyl, butyl, or ethoxyethyl.

A composition which comprises a hybrid in the form of a di-block or higher block copolymer is also provided. In one embodiment, the hybrid has a high nanoparticle loading greater than about 15% by volume overall or greater than about 30% by volume in a single domain. In another embodiment, the hybrid has a high degree of structural order (periodicity) as characterized by analysis of said hybrid in reciprocal space.

In another embodiment, the nanoparticle is selected from the group consisting of metal, metal alloy, metal mixture, intermetallic, semiconductor and insulator nanoparticles or combinations thereof.

A composition comprising an ordered porous metal-carbon nanocomposite mesostructure is also provided. In one embodiment, the ordered porous metal-carbon nanocomposite mesostructure has:

a unit cell size in the range of about 10 nm to about 80 nm,
metal nanoparticles in a concentration above 5% by volume,
block copolymer-type morphology, and
a high degree of structural order (periodicity) as characterized by analysis of said nanocomposite mesostructure in reciprocal space.

In another embodiment, the composition has metal nanoparticles in a concentration above 10% by volume.

A composition comprising an ordered metal-ceramic nanocomposite mesostructure is also provided. In one embodiment, the composition has:

a unit cell size in the range of about 10 nm to about 80 nm,
metal nanoparticles in a concentration above 5% by volume,
block copolymer-type morphology, and
a high degree of structural order (periodicity) as characterized by analysis of said nanocomposite mesostructure in reciprocal space.

In another embodiment, the composition has metal nanoparticles in a concentration above 10% by volume.

In another embodiment, the metal-ceramic nanocomposite mesostructure is porous.

An ordered porous metal mesostructure is also provided. In one embodiment, the ordered porous metal mesostructure has:

a pore size in the range of about 5 nm to about 70 nm,
block copolymer-type morphology, and
a high degree of structural order (periodicity) as characterized by analysis of said nanocomposite mesostructure in reciprocal space.

In another embodiment, the compositions of the invention can have block copolymer-type morphology that is selected from the group consisting of cubic micellar, hexagonal cylinder, lamellar, and bicontinuous cubic morphology.

4. BRIEF DESCRIPTION OF THE DRAWINGS

The present invention is described herein with reference to the accompanying drawings, in which similar reference characters denote similar elements throughout the several views. It is to be understood that in some instances, various aspects of the invention may be shown exaggerated or enlarged to facilitate an understanding of the invention:

FIG. 1 illustrates CCM-Pt-6 produced after each stage of the synthesis. (A) shows the chemical structure of ligand N,N-di-2-propoxyethyl-N-3 mercaptopropyl-N methylammonium chloride. (B) shows a true-scale model of a NP with a 1.8-nm diameter metal core and 1.4-nm ligand shell in which part of the metal surface is artificially exposed for illustrative purposes. (C) shows the chemical structure of PI-b-PDMAEMA; PI is depicted in black and PDMAEMA is depicted in grey. (D) to (F) illustrate approximate mesostructure geometries that are based on experimental data. (D) shows that the self-assembly of individual Pt NPs (as shown in (B)) with block copolymer (depicted as grey "strands"), followed by annealing, produces a hybrid with a regularly ordered structure, e.g., inverse hexagonal morphology. (E) shows that pyrolysis of the hybrid under inert atmosphere produces an ordered porous Pt—C nanocomposite mesostructure. (F) shows that Ar—O plasma treatment or acid etch of the Pt—C produces ordered an ordered porous Pt mesostructure. See Section 6.1 for details.

FIG. 2 shows bright-field TEM images (A) and (C) to (I) and photograph (B) of materials produced after each stage of the synthesis. See Example 6.1 for details.

FIG. 3 shows X-ray and physisorption measurements of materials produced after each stage of the synthesis. (A) shows SAXS profiles of mesostructured materials. (B) shows PXRD of samples at various stages of the synthesis. (C) shows that a Barrett-Joyner-Halenda pore size distribution as derived from a N physisorption adsorption isotherm reveals a peak mesopore diameter of 17 nm. See Example 6.1 for details.

FIG. 4 shows (A) Raman spectra of pyrolized CCM-Pt-6 (top) and Ar—O plasma-treated CCM-Pt-6 (bottom). (B) shows EDS of pyrolized CCM-Pt-6. (C) shows EDS of acid-treated CCM-Pt-6. Pt=98 wt %, C=1 wt %, and O=0.5 wt %. (D) shows polarization curves of the $H_2$ oxidation reaction in $H_2$-saturated 0.1 M $H_2SO_4$ solution (at 2000 rpm and 10 mV/s). Dashed line, porous Pt—C nanocomposite mesostructure; grey curve, porous Pt mesostructure; black curve, planar Pt electrode. E, potential; sat., saturated. See Section 6.1.3 for details.

Figure 10:
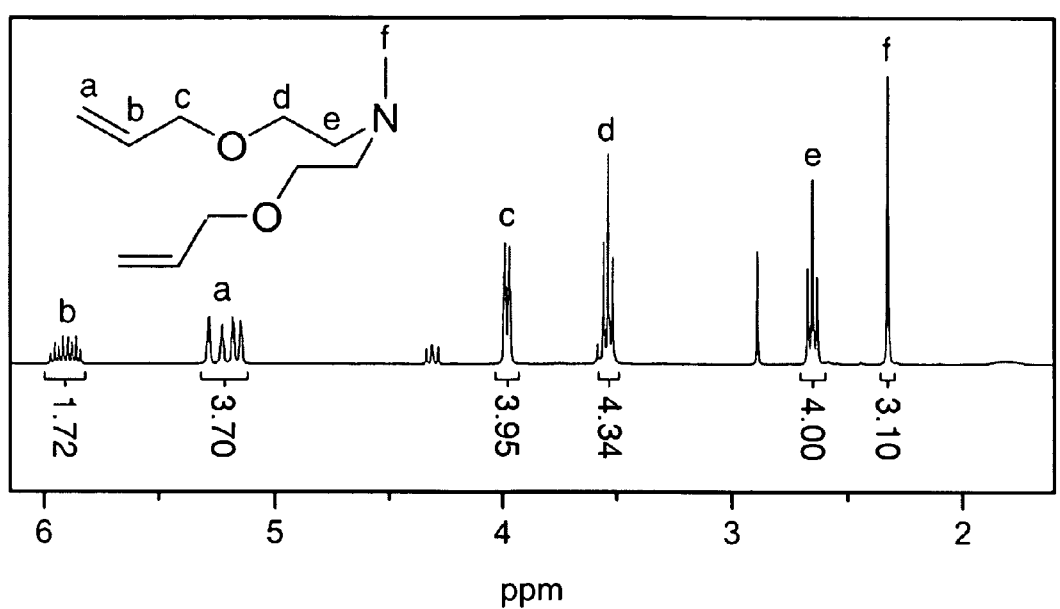

FIG. 10 shows $^1$H NMR of 3. ($CDCl_3$, 300 MHz) δ 5.90 (b, m, 2H), 5.20 (a, m, 4H), 3.98 (c, m, 4H), 3.54 (d, t, 4H, J=5.99 Hz), 2.65 (e, t, 4H, J=5.99 Hz), 2.33 (f, s, 3H). The unlabeled peaks are from unknown contaminants. See Section 6.1.2 for details.

Figure 11:
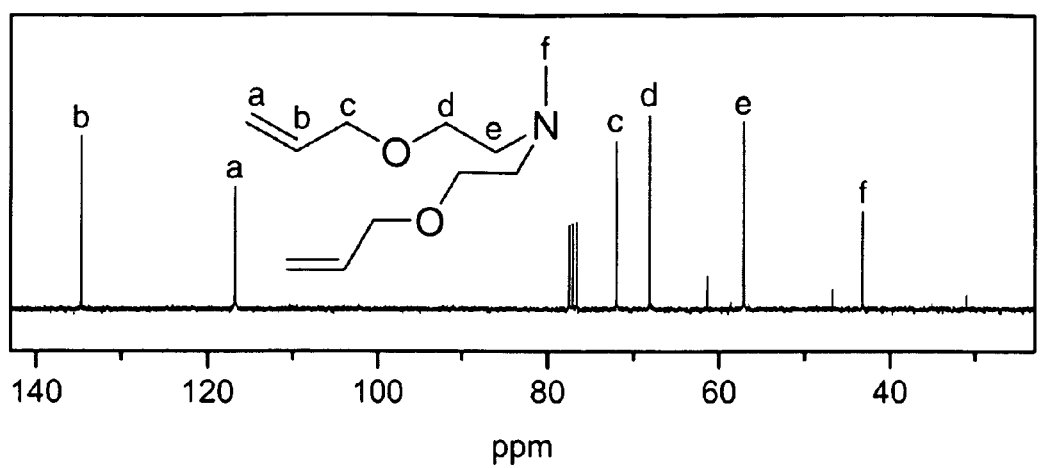

FIG. 11 shows $^{13}$C NMR of 3. ($CDCl_3$, 75 MHz) δ 134.7 (b), 116.8 (a), 71.9 (c), 68.1 (d), 57.1 (e), 43.2 (f). See Section 6.1.2 for details.

Figure 12:
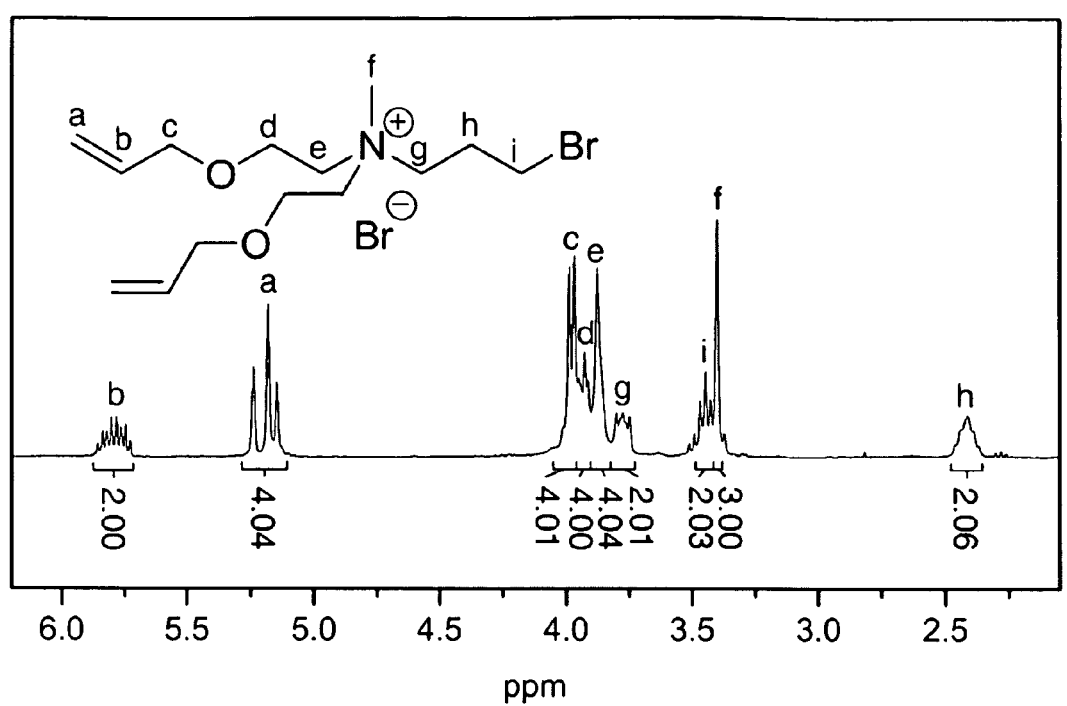

FIG. 12 shows $^1$H NMR of 4. ($CDC_{13}$, 300 MHz) δ 5.79 (b, m, 2H), 5.18 (a, m, 4H), 3.98 (c, m, 4H), 3.93 (d, t, 4H), 3.88 (e, t, 4H), 3.78 (g, t (restricted rotation), 2H), 3.45 (i, t, 2H, J=5.85 Hz), 3.40 (f, s, 3H), 2.41 (h, p, 2H, J=6.91 Hz). See Section 6.1.2 for details.

Figure 13:
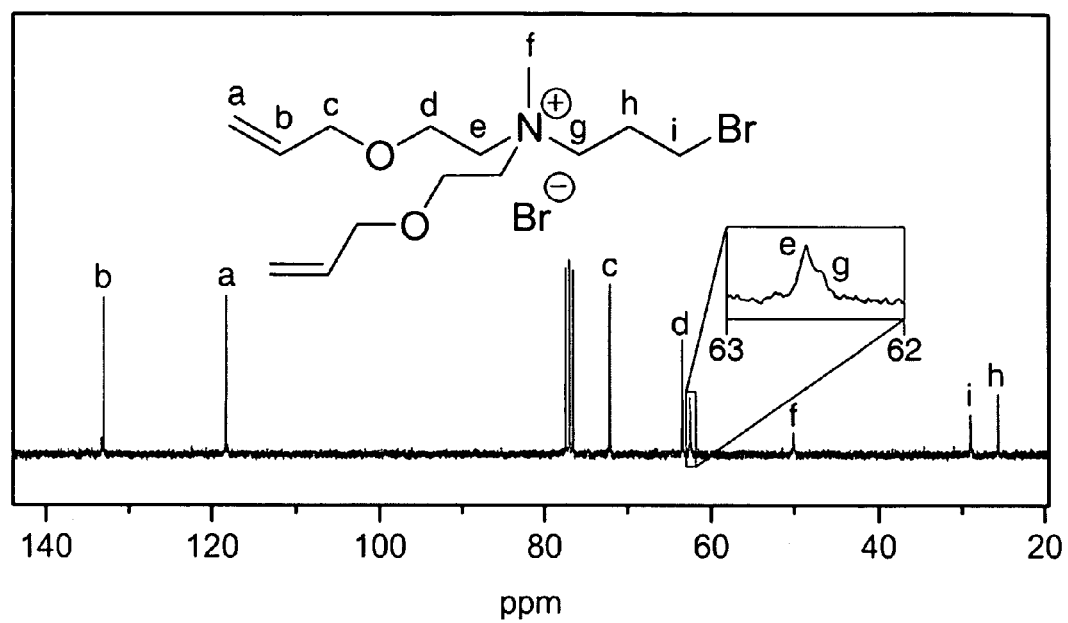

FIG. 13 shows $^{13}$C NMR of 4. ($CDCl_3$, 75 MHz) δ 133.0 (b), 118.4 (a), 72.5 (c), 63.5 (d), 62.6 (e), 62.5 (g), 50.2 (f), 29.0 (i), 25.6 (h). See Section 6.1.2 for details.

Figure 14:
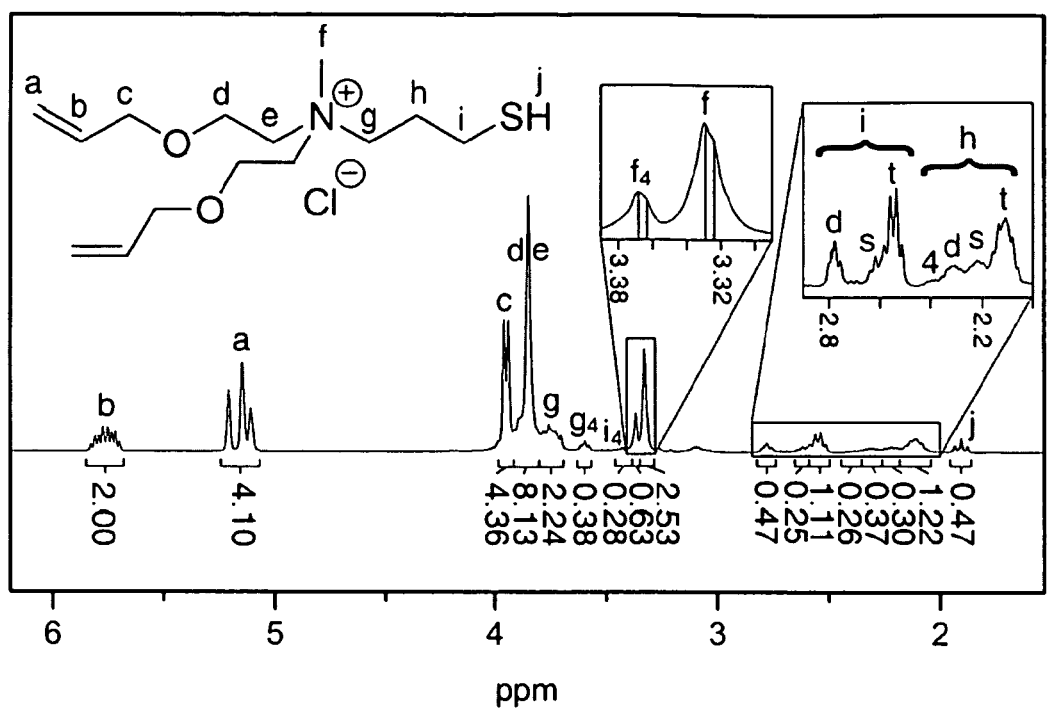

FIG. 14 shows $^1$H NMR of product mixture 5. ($CDC_{13}$, 300 MHz) Thiol 5: δ 5.76 (b, m, 2H), 5.15 (a, m, 4H), 3.95 (c, m, 4H), 3.85 (d, e, t, 8H), 3.75 (g, t, 2H), 3.329 (f, chloride, s, 3H), 3.324 (f, bromide, s, 3H), 2.55 ($i_t$, q, 2H, J=7.3 Hz), 2.11 ($h_t$, p, 2H, J=7.5 Hz), 1.90 (j, t, 1H, J=8.5 Hz). See Section 6.1.2 for details.

Figure 15:
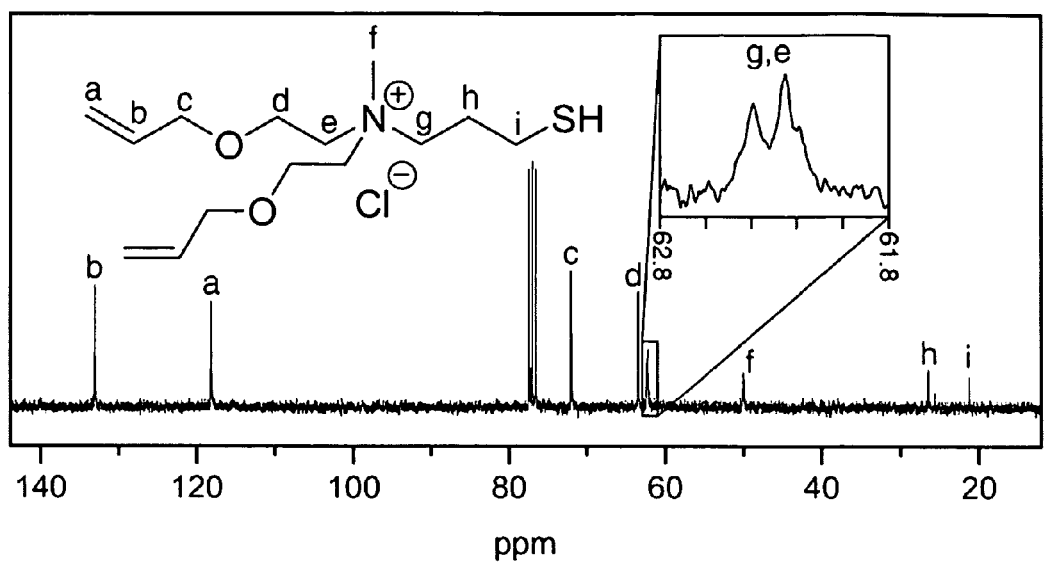

FIG. 15 shows $^{13}$C NMR of 5. ($CDCl_3$, 75 MHz) δ 133.1 (b), 118.1 (a), 72.0 (c), 63.5 (d), 62.4, 62.3 (g, e), 50.0 (f), 26.5 (h), 21.2 (i). See Section 6.1.2 for details.

Figure 16:
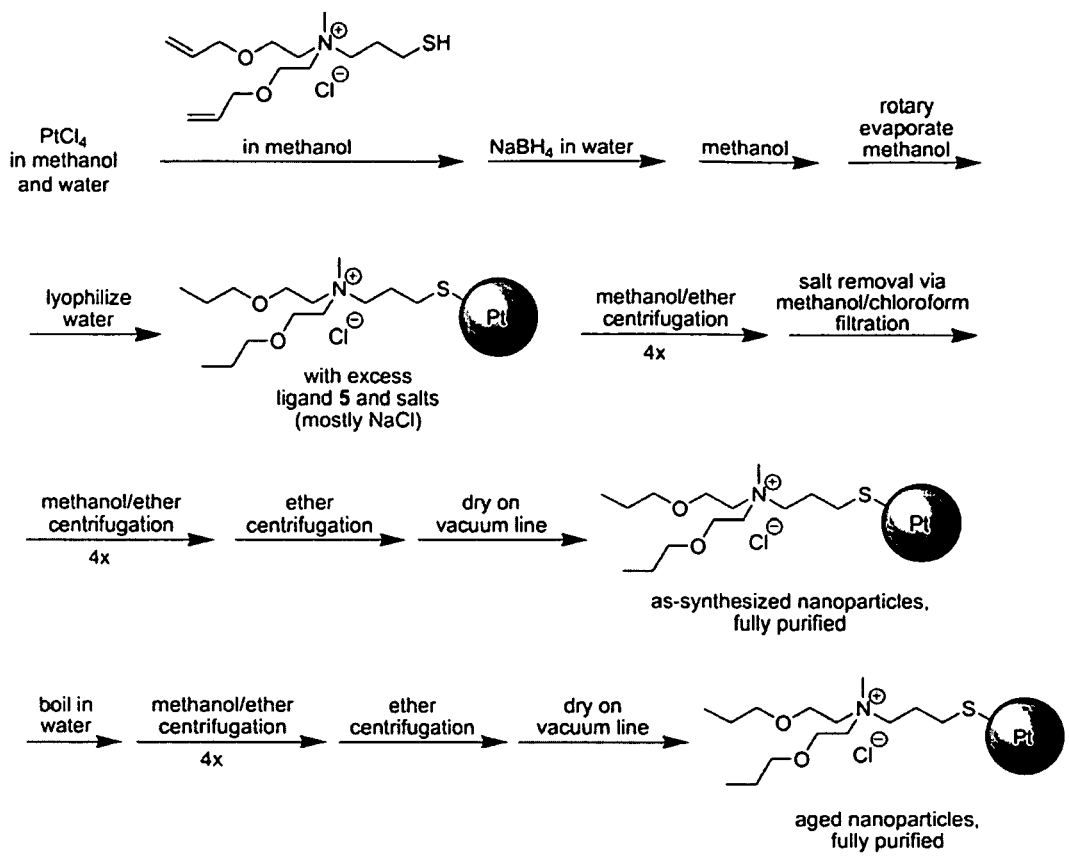

FIG. 16 shows the stages of NP synthesis, purification, and ageing (Scheme S3). See Section 6.1.2 for details.

Figure 17:
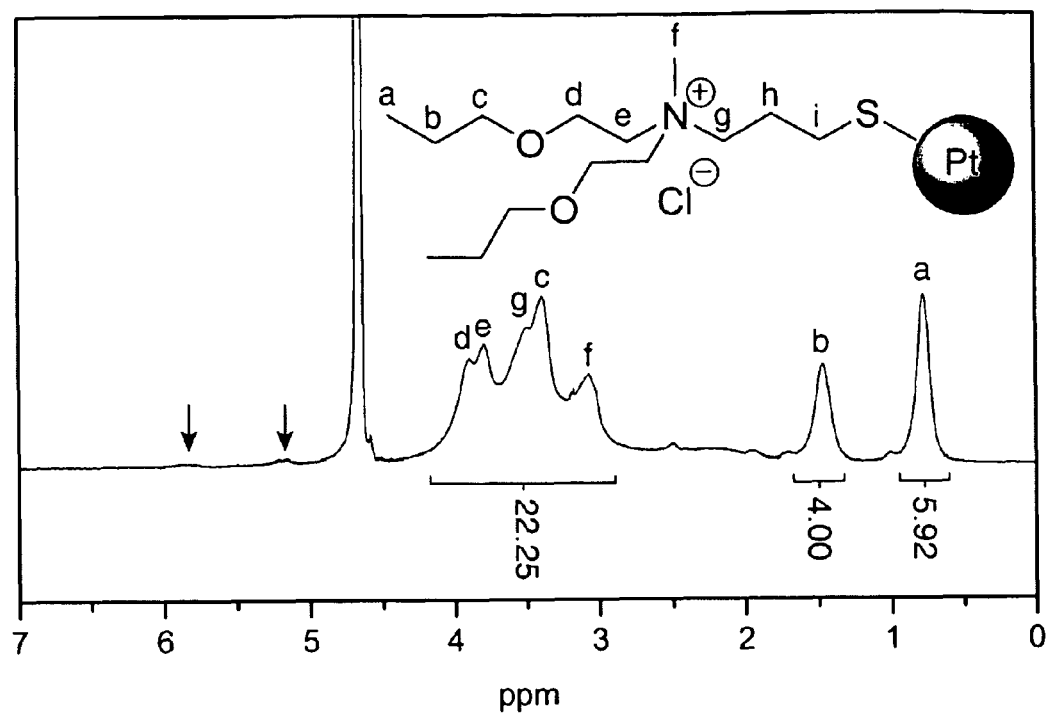

FIG. 17 shows $^1$H NMR of as-synthesized Pt NPs. During the synthesis, the double bond becomes hydrogenated (arrows show a small amount of unhydrogenated ligand). Peaks h and i are not observed because of proximity to the platinum surface (3). Peak assignments for c through g are tentative. ($D_2O$, 300 MHz) δ 3.90 (d, 4H), 3.79 (e, 4H), 3.49 (g, 2H), 3.39 (c, 4H), 3.07 (f, 3H), 1.46 (b, 4H), 0.77 (a, 4H). See Section 6.1.2 for details.

Figure 18:
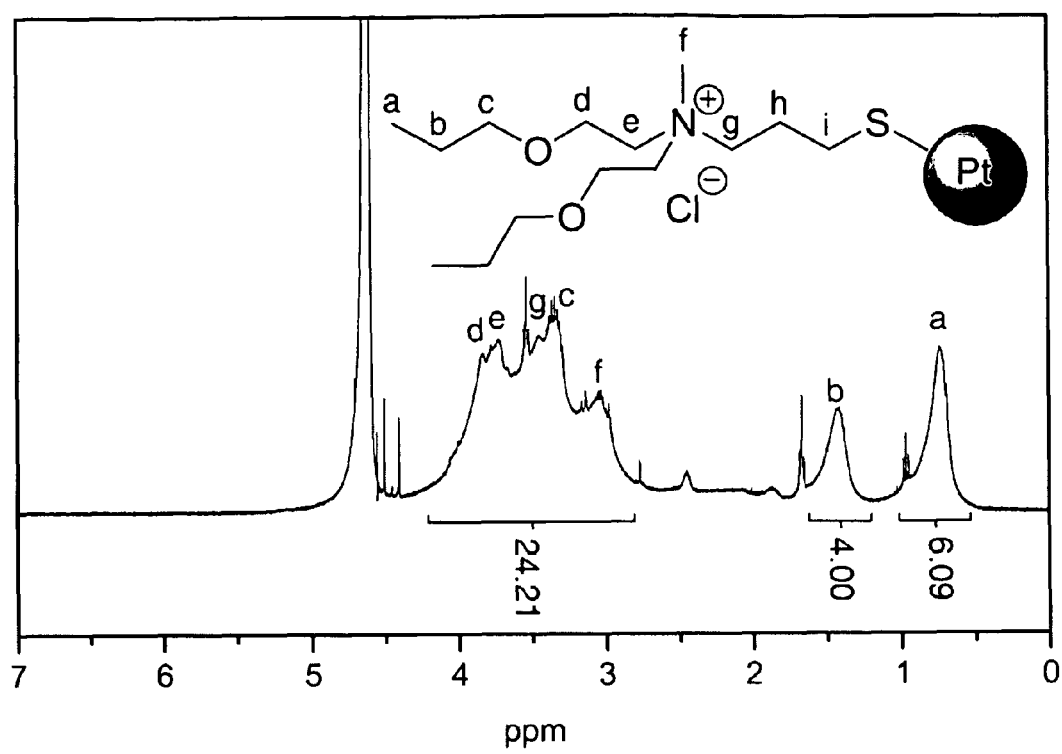

FIG. 18 shows $^1$H NMR of aged Pt NPs. Peak assignments for c through g are tentative. ($D_2O$, 300 MHz) δ 3.87 (d, 4H), 3.74 (e, 4H), 3.49 (g, 2H), 3.38 (c, 4H), 3.08 (f, 3H), 1.46 (b, 4H), 0.78 (a, 4H). See Section 6.1.2 for details.

Figure 19:
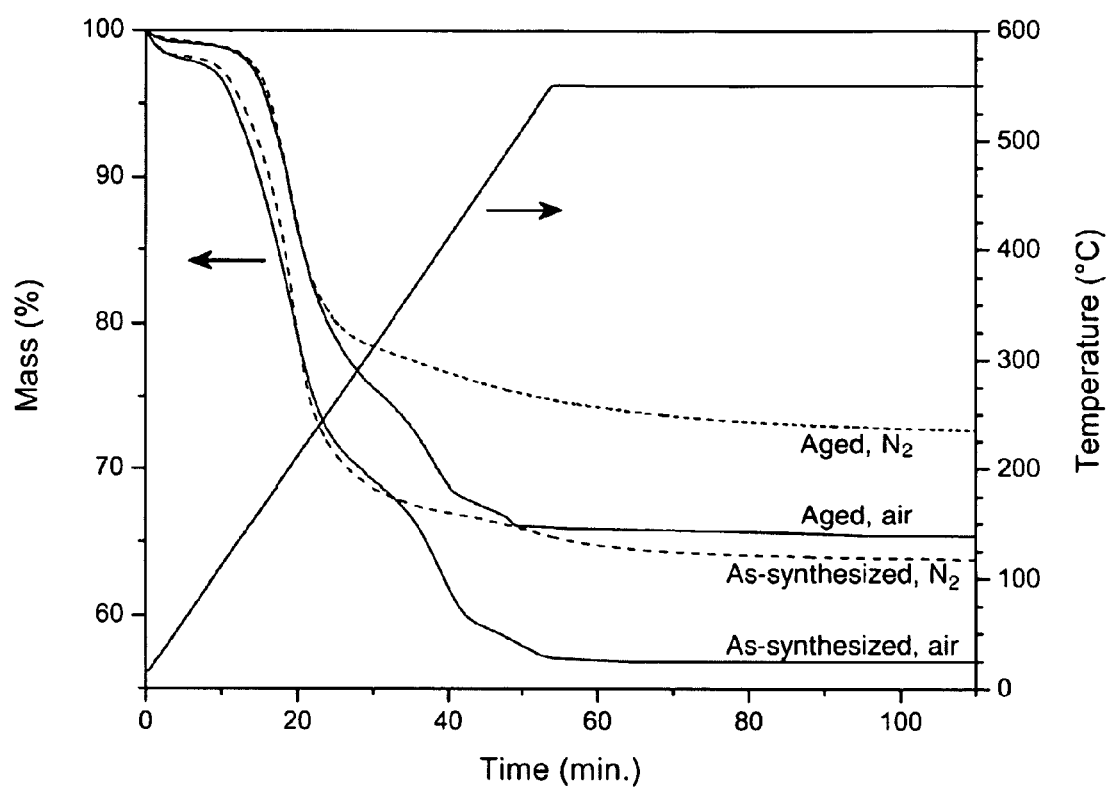

FIG. 19 shows TGA traces of platinum NPs. For all runs, the NPs were heated at 10° C./min. to 550° C. under flowing $N_2$ or air and held at 550° C. for one hour. See Section 6.1.2 for details.

Figure 20:
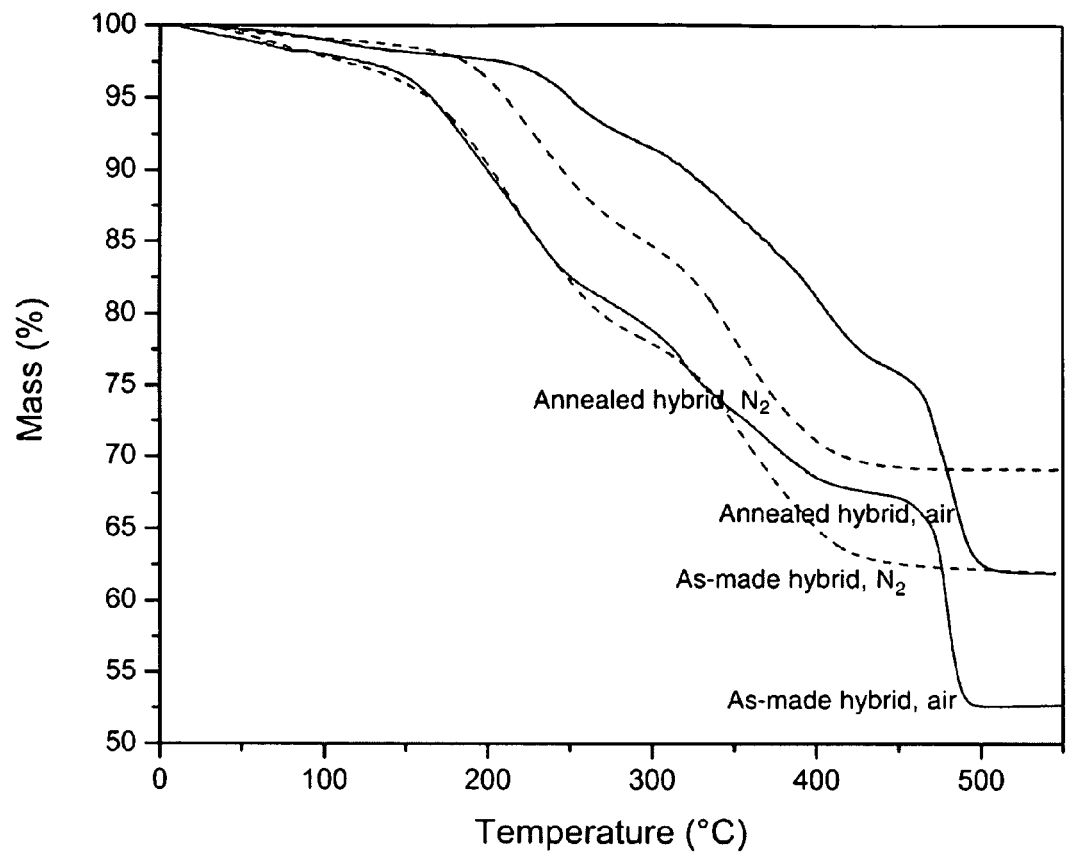

FIG. 20 shows TGA of CCM-Pt-6 hybrids, before and after annealing. For all runs, the hybrids were heated at 10° C./min. to 550° C. See Section 6.1.2 for details.

Figure 21:
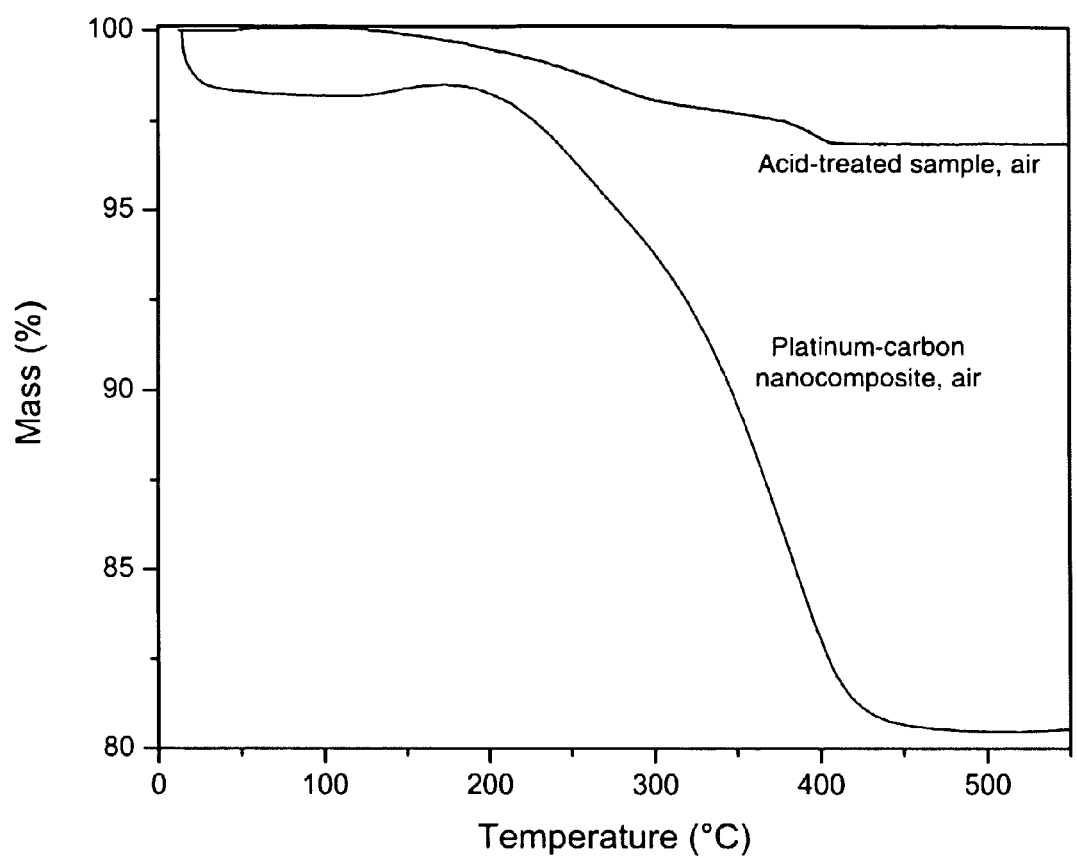

FIG. 21 shows TGA of CCM-Pt-6 platinum-carbon nanocomposite and acid-treated sample. Both samples were heated in air at 10° C./min. to 550° C. See Section 6.1.2 for details.

5. DETAILED DESCRIPTION OF THE INVENTION

The invention provides methods of preparing porous mesostructured materials, including metal-rich (or semiconductor-rich or insulator-rich) mesostructured nanoparticle-block copolymer hybrids, porous metal (or semiconductor or insulator)-nonmetal (e.g., carbon or ceramic) nanocomposite mesostructures, and ordered metal mesostructures with uniform pores. Nanoparticles can be metal, metal alloy, metal mixture, intermetallic, metal-carbon, metal-ceramic, semiconductor-carbon, semiconductor-ceramic, insulator-carbon or insulator-ceramic nanoparticles or combinations thereof. A block copolymer/ligand-stabilized nanoparticle solution is cast, resulting in the formation of a metal-rich (or semiconductor-rich or insulator-rich) mesostructured nanoparticle-block copolymer hybrid. The hybrid is heated in an inert atmosphere to an elevated temperature, resulting in the formation of an ordered porous nanocomposite mesostructure. A nonmetal component (e.g., carbon or ceramic) is then removed to produce an ordered mesostructure with ordered and large uniform pores.

Methods for producing mesostructured metal nanoparticle (NP)-block copolymer hybrids are provided. Porous metal/nonmetal nanocomposite mesostructured compositions based on these hybrids are also provided.

Mesostructured hybrids are produced with high metal volume fractions in one domain of the block copolymer. The metal NP-block copolymer hybrids have exceptionally high NP loadings and tunable phase-separated morphologies with feature sizes≥10 nm. Metal-rich NPs with a thin organic shell made from ionic liquid ligands, combined with NP loadings as high as 95 volume % in the hydrophilic domains of the hybrid, ensure that mesostructure order is retained upon conversion of the hybrid to a porous metal/nonmetal nanocomposite mesostructure.

The metal component is selected from the group consisting of platinum, palladium, gold, silver, copper, rhodium, ruthenium, iridium and bismuth.

A nonmetallic component of the nanocomposite can include, but is not limited to, carbon, ceramic, a semiconductor or an insulator. A nonmetallic component such as carbon or ceramic can be removed from the nanocomposite mesostructure to produce ordered Pt mesostructures with ordered and large (≥5 nm) uniform pores.

Figure 1A:
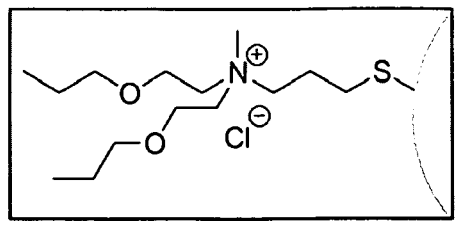
Figure 1B:
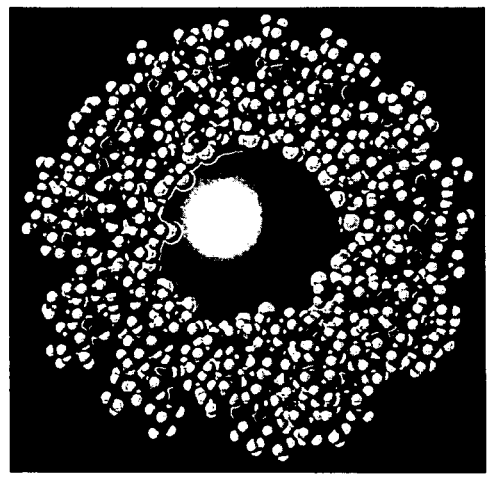
Figure 1C:
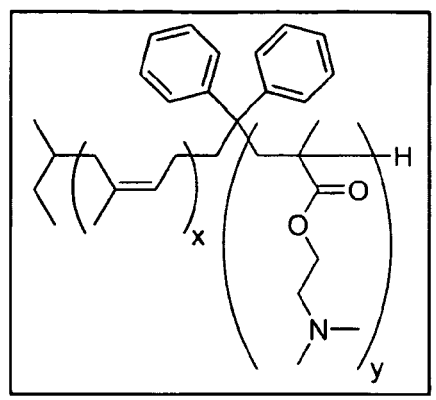
Figure 1D:
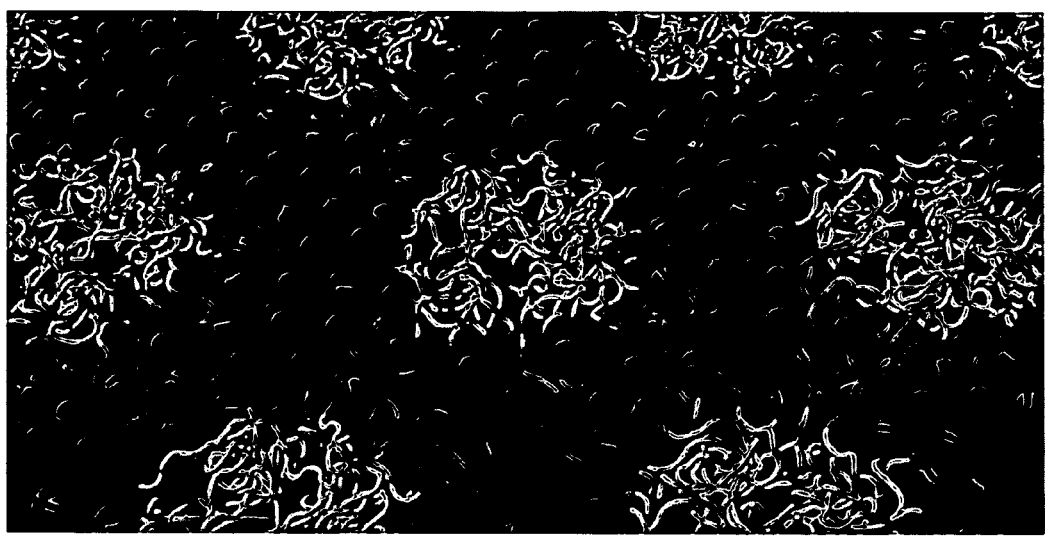
Figure 1E:
Figure 1F:
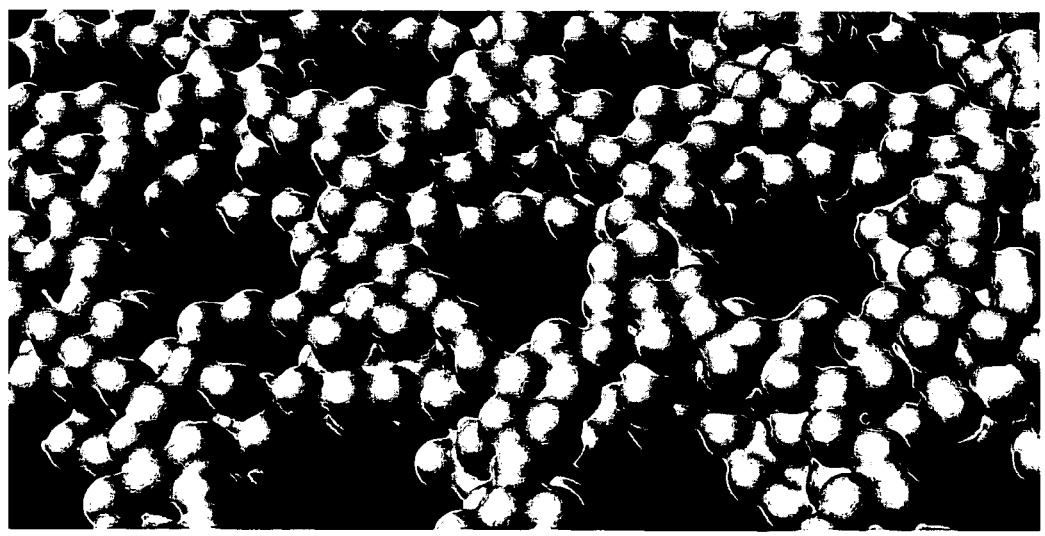

In one embodiment, methods are provided in which ligand-stabilized Pt NPs (FIGS. 1A-1B) coassemble with block copolymers (FIG. 1C) during the evaporation of organic solvents, forming metal-rich mesostructured NP-block copolymer hybrids (FIG. 1D). Hybrids are pyrolized by heating under an inert atmosphere, leaving behind ordered porous Pt—C nanocomposite mesostructures (FIG. 1E). The nonmetal component (C) is removed, e.g., through use of an Ar—O plasma, by acid etch or by heat treatment in air, to produce ordered porous Pt mesostructures (FIG. 1F).

The methods of synthesis provided by the invention provide a new class of ordered porous mesostructures made from NPs of distinct compositions. Such nanoheterogeneous porous mesostructures have a range of exceptional electrical, optical, and catalytic properties. It should be understood that "porous mesostructure," as used herein, is intended to include porosity ranging from about 7 nm to about 70 nm.

For clarity of disclosure, and not by way of limitation, the detailed description of the invention is divided into the subsections set forth below.

5.1 Nanoparticles (NPs)

To synthesize porous nanoparticle (NP)-nonmetal (carbon or ceramic) nanocomposite mesostructures with high metal volume fractions, a block copolymer/ligand-stabilized NP solution is provided. The NP is selected from the group consisting of metal, metal alloy, metal mixture, intermetallic, metal-carbon, metal-ceramic, semiconductor-carbon, semiconductor ceramic, insulator-carbon or insulator-ceramic nanoparticles or combinations thereof. In one embodiment, the semiconductor is selected from the group consisting of a transition metal oxide, a type IV semiconductor, a type III-V semiconductor and a type II-VI semiconductor.

In one domain of the block copolymer, the NPs preferably exhibit the following four characteristics. Any suitable NP that meets the following four criteria can be used according to the methods of the invention.

First, the NPs preferably have high solubility in organic solvents. Preferably, the solubility in organic solvents is greater than 3 wt. %, and more preferably, greater than 10 wt. %. When NPs have low solubility, some fraction of the particles macroscopically precipitates during solvent evaporation and fails to mix with the block copolymer. A ligand for metal NPs based on a thiol-containing ionic liquid (S. C. Warren et al., J. Am. Chem. Soc. 128, 12074 (2006)) imparts liquid-like behavior to the NPs, even in the absence of a solvent. Thus, the use of certain ionic liquids as NP ligands provides a route to high solubility.

Second, the ligand-stabilized NPs preferably have at least a modest metal volume fraction. Although metal NPs with high solubility have been reported (S. C. Warren et al., J. Am. Chem. Soc. 128, 12074 (2006); S. Sivaramakrishnan, P.-J. Chia, Y.-C. Yeo, L.-L. Chua, P. K. H. Ho, Nat. Mater. 6, 149 (2007)), the metal volume fraction was between 0.6 and 3% (S. C. Warren et al., J. Am. Chem. Soc. 128, 12074 (2006)). Higher metal volume fractions, at least 3%, preferably above 3%, and more preferably above 7%, are used to prevent structural collapse upon removal of the organic components. In certain embodiments, conventional short ligands are used to increase the metal volume fraction, although this can sometimes result in insufficient solubility.

Third, the NPs are preferably highly dispersible in a block of the block copolymer. In one embodiment, the NPs are highly dispersible in just one block of the block copolymer (A. C. Balazs, T. Emrick, T. P. Russell, Science 314, 1107 (2006); R. B. Thompson, V. V. Ginzburg, M. W. Matsen, A. C. Balazs, Science 292, 2469 (2001)). For example, dispersions that contain 5-95 vol. % of nanoparticles in a given block of the block copolymer will achieve sufficient metal content for the structure to survive pyrolysis. Mixing is driven by favorable enthalpic interactions between that block and the NPs, which is achieved through ionic interactions, hydrogen bonding, and dipole-dipole interactions, among many possible routes.

Fourth, to promote mixing, the diameter of the NPs is preferably below a critical limit relative to the size of the block with which they mix, approximately the root mean square end-to-end distance (equivalent to 6½ times the radius of gyration for an ideal chain) of the relevant block of the copolymer (S. C. Warren, F. J. DiSalvo, U. Wiesner, Nat. Mater. 6, 156 (2007)). Although the precise cutoff may vary depending on enthalpic considerations and NP concentration, this heuristic provides a guideline for NP size.

NPs can be of any shape, including but not limited to anisotropic NPs, such as rods, platelets, branched, multi-armed or dendritic shapes, rhombohedra, triangular prisms, hexagonal prisms, cubes, and so on.

The NP can be selected from the group consisting of metal, metal alloy, metal mixture; intermetallic, metal-carbon, metal-ceramic, semiconductor-carbon, semiconductor-ceramic, insulator-carbon or insulator-ceramic nanoparticles or combinations thereof. The metal component of a hybrid, nanocomposite mesostructure or porous metal mesostructured composition of the invention can also be selected from the group consisting of the group consisting of metal, metal alloy, metal mixture, intermetallic, metal-carbon, metal-ceramic, semiconductor-carbon, semiconductor-ceramic, insulator-carbon or insulator-ceramic nanoparticles or combinations thereof. In a further embodiment of the invention, ligand-stabilized nanoparticles can include semiconductors or insulators. They can also include mixtures or combinations of metals with semiconductors or metals with insulators or semiconductors with insulators. This also includes mixtures or combinations of semiconductors with semiconductors, insulators with insulators, and so on. Metals, semiconductors, and insulators are defined herein according to their electrical conductivities. Some examples of insulators are silica ($SiO_2$), alumina ($Al_2O_3$) and zirconia (undoped) ($ZrO_2$). Some examples of semiconductors are silicon (Si), bismuth oxide ($Bi_2O_3$), molybdenum sulfide ($MoS_2$), gallium indium phosphide ($GaInP_2$). These definitions or insulator and semiconductor also extend to materials that contain have only partial inorganic content or no inorganic content at all (such as conjugated polymers or DNA).

In another embodiment, the block copolymer/ligand-stabilized nanoparticle solution can further comprise ligand-stabilized semiconductor nanoparticles, ligand-stabilized insulator nanoparticles, or nanoparticles comprising a combination of semiconductor and insulator.

In another embodiment, the block copolymer/ligand-stabilized nanoparticle solution can further comprise ligand-stabilized metal nanoparticles selected from the group consisting of metal, metal alloy, metal mixture, intermetallic nanoparticles, and nanoparticles comprising a combination of metal, metal alloy, metal mixture, or intermetallic compound.

NPs are used with at least one dimension that is approximately of the same size as the polymer used. The number of dimensions (1, 2, or 3) of the NP that are similar in size to that of the polymer depends in part on the targeted mesostructure. For example, for a lamellar mesostructure only one dimension of the NP must be similar to that of the polymer, while for hexagonal and inverse hexagonal mesostructures at least two dimensions of the NP must be similar to that of the polymer, and for bicontinuous mesostructures or bcc spheres morphologies all three of the NP dimensions must be similar to that of the polymer.

The above guidelines for NP size represent the minimum requirements to mix NPs with a block copolymer. To achieve high loading of NPs for mesostructure formation, it is preferred that all three dimensions of the NP be below the size of the block copolymer. As discussed elsewhere, the size of the block copolymer is represented approximately as the root-mean-square (RMS) end-to-end distance of the block of the block copolymer with which the NP mix. It is also significant to note that this criterion is approximate; that is, there will be some variation depending on the surface chemistry of the NPs. Specifically, NPs that have more enthalpically favorable interactions with the block copolymer will tend to have a larger critical size at which they begin demixing from the block copolymer.

Because a suitable size for the NP depends on the size of the block copolymer, particles greater than 0 nm and as large as 30 nm in diameter are used simply by using large block copolymers. Preferably, particles are greater than 0 nm and as large as 15 nm in diameter.

Furthermore, because the NPs suitable for use in the invention are not completely covered by ligand, and because the polymer can access the metal surface of the NP, the effective size of the particle is neither the diameter of the metal particle nor the diameter of the metal particle plus the two times the radial extension of the ligand. Instead, it is somewhere in between these two values because the polymer can interpenetrate the ligand shell of the NP.

5.2 Design and Synthesis of Ligands for Metal Nanoparticles (NPs).

As discussed above, NPs suitable for use in the invention preferably have (1) high solubility, (2) high metal content, (3) highly favorable chemical interactions with one or more blocks of the block copolymer but not all blocks, and (4) controlled NP size. To achieve these properties, the NP can have ligand(s), the design of which is described below. Any suitable ligand that confers these four properties on the NP is included in the scope of the invention.

With respect to interacting with just one block of the block copolymer, a multi-block copolymer can be used, and ordered porous materials are made provided that the nanoparticles have highly favorable interactions with one or more (but not all) blocks of the block copolymer.

In one embodiment, the NP ligand is N,N-di-2-propoxyethyl-N-3-mercaptopropyl-N-methylammonium chloride. In another embodiment, a derivative of this ligand is used, such as N,N-di-2-propoxyethyl-N-3-mercaptopropyl-N-methylammonium bromide and mixtures of the chloride and bromide. Other derivatives are possible, including the unhydrogenated form of the ligand, N,N-di-2-allyloxyethyl-N-3-mercaptopropyl-N-methylammonium chloride, N,N-di-2-allyloxyethyl-N-3-mercaptopropyl-N-methylammonium bromide, and mixtures of the halides. Furthermore, mixtures of any of the above-mentioned ligands can be used, i.e., mixtures of the hydrogenated and unhydrogenated forms with various halide anions. Other derivations of the ligand are also possible and can be used, such as modification in the length (number of carbons and oxygens) in each of the substituents attached to the ammonium.

Furthermore, any single ligand or combinations of ligands with the following properties represents suitable candidate ligands for use according to the methods of the invention.

5.2.1 Ligand Metal-Binding Characteristics

The ligand must form a stable bond to the metal surface. Optimally, bond strengths will be greater than 15 kcal/mol. Less optimally, bond strengths will be greater than 5 kcal/mol. To achieve these stable bonds, the ligand must contain one or more functional groups that can form bonds of sufficient strength. This can be a thiol, sulfide, disulfide, amine, phosphine, phosphine oxide, selenide, telluride, alkoxide, carboxylate, or carbide. Ligand-stabilized metal NPs with these functional groups have been synthesized and therefore the extension of the ligand structure to include these functional groups represents a straightforward extension of the design concept.

5.2.2 Ligand Solubility Characteristics

The ligand preferably imparts high solubility to the NP. The solubility is preferably higher than 10 wt. %; less preferably higher than 5 wt. %, and least preferably higher than 3%. To achieve these solubilities, the ligand must incorporate several structural characteristics and functional groups.

Preferably, the ligand incorporates a charged functional group, such as an ammonium salt. The charged functional group may be either cationic or anionic and innumerable functionalities and combinations are possible; the same types of anions and cations employed in ionic liquids are also useful in this application. Anions include (but are not limited to) halides, sulfonates, phosphonates, and acetates. Cations include (but are not limited to) ammonium, imidazolium, alkali metals, alkaline earth metals, phosphonium, pyridinium, guanidinium, pyrrolidinium. Mixtures of several anions or cations in the same ligand or mixtures of different ligand are possible; for example, the ligand employs a mixture of both bromide and chloride anions.

Preferably, the ligand incorporates additional organic or organometallic structures which further enhance or tune solubility characteristics. Innumerable functional groups or combinations of functional groups are useful in tuning the solubility characteristics, as well as controlling the interactions with the block copolymer. Such groups include, but are not limited to, acids, alcohols, aldehydes, alkanes, alkenes, alkyl halides, alkynes, amides, amines, aryls, azides, bases, carbonyls, carbonates, cyanate, diimides, disulfides, ethers, esters, imines, isocyanates, ketones, nitrates, nitriles, nitrites, nitros, nitrosos, pyridines, peroxides, phosphines, phosphodiesters, phosphonic acids, phosphates, sulfones, sulfonic acids, sulfoxides, thiocyanates, thioethers, and thiols, as well as complexes of any of these or similar functional groups or multiple of these functional groups with inorganic species (atoms, clusters, NPs). Aside from organic/organometallic functional groups, other types of species are possible as constituents of the ligand. These include, but are not limited to, amino acids, hydroxyl acids, peptides, polymers, dendrimers, and DNA, RNA. All of these species and similar species can serve to modify or tune the solubility characteristics (absolute solubility, hydrophilicity, hydrophobicity) of the NPs or alter the interaction of the NP with the block copolymer.

Preferably, the ligand is capable of having favorable interactions with one block of the block copolymer, such as ionic interactions, hydrogen bonding, dipole-dipole interactions, among many possible routes. Less preferably, the ligand will have weaker interactions with the block copolymer (e.g., relying solely on van der Waals interactions). In this case, it is preferable that the ligand have a low areal density on the NP surface (described more below) such that the block copolymer has favorable interactions with the exposed metal surface. In a preferred embodiment, (1) the ligand is capable of favorable interactions with the block copolymer, and (2) the block copolymer has access to the metal surface such that favorable interactions occur between the block copolymer and ligand and the block copolymer and metal surface. In another preferred embodiment, interactions between the ligand and block copolymer are sufficiently strong such that interactions between the block copolymer and metal surface are unnecessary or do not occur.

5.2.3 Ligand Volume Fraction

Preferably, the ligand will occupy less than 90% of the volume of the NP; less preferably, less than 94%; least preferably, less than 97%. Various and/or multiple strategies known in the art can be employed for achieving this volume fraction. For example, the ligand molecular weight can be limited. Preferably, the ligand will have a molecular weight under 1000 g/mol. Less preferably, the ligand will have a molecular weight under 3000 g/mol. Least preferably, the ligand will have a molecular weight under 10,000 g/mol. Another way to achieve preferred organic volume fractions is by controlling the ligand areal density on the NP surface, i.e., the number of ligands per square nanometer on the metal surface. By decreasing the ligand areal density, higher molecular weight ligands can be employed while still achieving the preferred ligand volume fraction.

5.2.4 Ligand Thermal Stability

The ligand should preferably have modest thermal stability. Preferably, it is stable below 80° C.; less preferably, below 40° C.; and least preferably, below 20° C. The ligand should also decompose on heating to higher temperatures. Preferably, the ligand will begin decomposition at or above 500° C.; preferably, above 300° C.; and more preferably, above 80° C.

5.3 Ligand Synthesis

In one embodiment, N,N-di-2-propoxyethyl-N-3-mercaptopropyl-N-methylammonium chloride (FIG. 1A) is used as a ligand for the Pt NPs. In another embodiment, the synthesis of this ligand, as well as the ligand-stabilized Pt NPs, is carried out as described herein (see Example 6.1).

Figure 5:
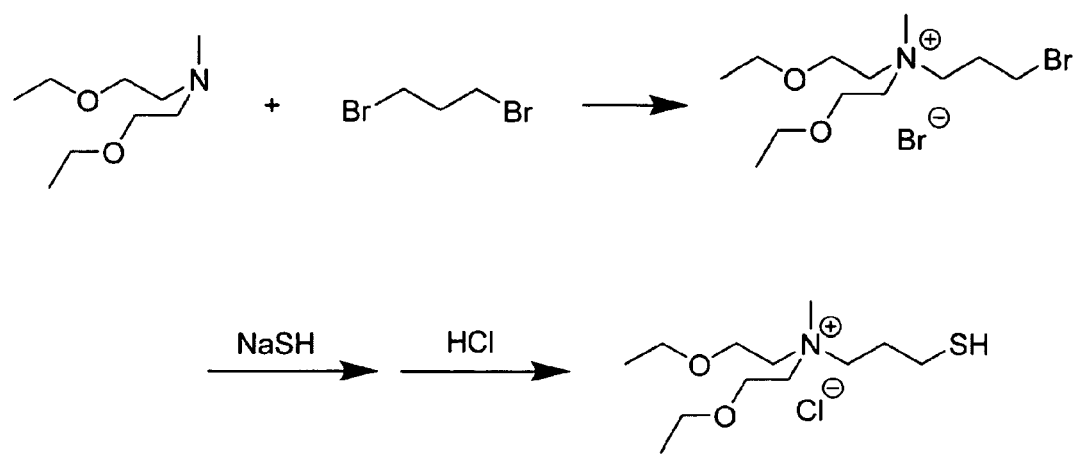
FIG. 5 shows the synthesis of ligand N,N-diethoxyethyl-N-methyl-N-3-mercaptopropyl ammonium chloride. See Section 5.3 for details.

A second ligand that exhibits properties similar to N,N-di-2-propoxyethyl-N-3-mercaptopropyl-N-methylammonium chloride is N,N-diethoxyethyl-N-methyl-N-3-mercaptopropyl ammonium chloride (FIG. 5).

The synthesis of N,N-diethoxyethyl-N-methyl-N-3-mercaptopropyl ammonium chloride can be carried out using the identical procedure for synthesizing N,N-di-2-propoxyethyl-N-3-mercaptopropyl-N-methylammonium chloride, modified only by the substitution of an amine with a slightly altered structure. This ligand is used in the same way as N,N-di-2-propoxyethyl-N-3-mercaptopropyl-N-methylammonium chloride and also enables the synthesis of ordered metal NP-block copolymer hybrids, ordered metal-carbon nanocomposites, and ordered porous mesostructured metals.

5.4 Porous Mesostructured Materials

A composition which comprises a hybrid in the form of a di-block or higher block copolymer is provided. In one embodiment, the hybrid has a high nanoparticle loading greater than about 15% by volume overall or greater than about 30% by volume in a single domain. In another embodiment, the hybrid has a high degree of structural order (periodicity) as characterized by analysis of said hybrid in reciprocal space.

In another embodiment, the nanoparticle is selected from the group consisting of metal, metal alloy, metal mixture, intermetallic, semiconductor and insulator nanoparticles or combinations thereof.

A composition comprising an ordered porous metal-carbon nanocomposite mesostructure is also provided. In one embodiment, the ordered porous metal-carbon nanocomposite mesostructure has:

a unit cell size in the range of about 10 nm to about 80 nm, metal nanoparticles in a concentration above 5% by volume, block copolymer-type morphology, and a high degree of structural order (periodicity) as characterized by analysis of said nanocomposite mesostructure in reciprocal space.

In another embodiment, the composition has metal nanoparticles in a concentration above 10% by volume.

A composition comprising an ordered metal-ceramic nanocomposite mesostructure is also provided. In one embodiment, the composition has:

a unit cell size in the range of about 10 nm to about 80 nm, metal nanoparticles in a concentration above 5% by volume, block copolymer-type morphology, and a high degree of structural order (periodicity) as characterized by analysis of said nanocomposite mesostructure in reciprocal space.

In another embodiment, the composition has metal nanoparticles in a concentration above 10% by volume.

In another embodiment, the metal-ceramic nanocomposite mesostructure is porous.

An ordered porous metal mesostructure is also provided. In one embodiment, the ordered porous metal mesostructure has:

a pore size in the range of about 5 nm to about 70 nm, block copolymer-type morphology, and a high degree of structural order (periodicity) as characterized by analysis of said nanocomposite mesostructure in reciprocal space.

In another embodiment, the compositions of the invention can have block copolymer-type morphology that is selected from the group consisting of cubic micellar, hexagonal cylinder, lamellar, and bicontinuous cubic morphology.

5.4.1 Hybrid Materials

Mesostructured nanoparticle-block copolymer hybrids are provided. Methods for making mesostructured nanoparticle-block copolymer hybrids are also provided. Hybrids are recovered after casting the block copolymer/ligand-stabilized nanoparticle solution, which results in the formation of the mesostructured nanoparticle-block copolymer hybrid.

Hybrid porous mesostructured materials preferably have (1) high metal content (volume fraction of metal) and (2) ordered mesophases similar to block copolymers (e.g., lamellar, inverse hexagonal, bcc spheres, gyroid, plumber's nightmare, etc.). The NP content in the hydrophilic domain can be as high as 95 vol. %. The metal content in the hydrophilic domains can therefore be as high as 9.9 vol. % in the as-made hybrid. The annealed hybrid can have a higher metal content, i.e., as high as about 12 vol. %. If nanoparticles with higher metal content are used, then metal content can be greater than 12 vol. %.

The hybrids provided by the invention combine high metal nanoparticle loadings with high degrees of structural order. In one embodiment, the hybrids comprise a block copolymer (diblock or higher) that have metal nanoparticle loadings in excess of 15 vol. % overall or in excess of 30 vol. % in a single domain and as high as 95 vol. % in a single domain or 85 vol. % overall and that have a high degree of structural order (periodicity), as characterized by analyses of the sample in reciprocal space, such as fast Fourier transform (FFT) of transmission electron microscopy (TEM) images and/or small angle x-ray scattering (SAXS) profiles. As measured by SAXS, the samples must have, preferably, one first-order scattering peak and one or more higher order scattering peaks, or, less preferably, one first-order scattering peak. FFT of TEM images should provide, preferably, one first-order scattering peak and two or more higher order scattering peaks or, less preferably, one first-order scattering peak and one higher order scattering peak.

In another embodiment, the ordered hybrids have lower metal nanoparticle loadings (5-15 vol. % overall; 5-30% in a single domain) composed of metal nanoparticles with high metal content, i.e., a metal content in the nanoparticle that exceeds 9 vol. %.

In a specific embodiment, the ordered hybrid has greater than 15 vol. % and overall, greater than 30 vol. %, in a single domain.

In one embodiment, the as-made hybrid has a metal content between 3 and 5 vol. %. Preferably, the as-made hybrid has a metal content between 5 and 6 vol. %. More preferably, the as-made hybrid has a metal content in the hydrophilic domain higher than 6 vol. %. In one embodiment, the hybrid has electrical conductivity of about 2.5 mS/cm. Depending on choice of metal, metal loading, distance between nanoparticles, and the composition of the non-metal component, a large range electrical conductivity, from about $10^{-12}$ to about $10^6$ S/cm, can be obtained. In another embodiment, the range of electrical conductivity is about $10^{-2}$ to about $10^4$ S/cm.

5.4.2 Composite Materials

The porous mesostructured materials provided by the invention possess combined characteristics of high metal content, carbon content, access to the ordered structures produced by block copolymers (inverse hexagonal, etc.), and porosity. The high electrical conductivity (about $10^{-2}$ to about $10^4$ S/cm) represents an advantageous physical property of these porous mesostructured materials.

In one embodiment, to produce a porous metal-carbon nanocomposite mesostructure, a block copolymer with $sp^2$- or sp-hybridized carbons can be used, as these efficiently generate large quantities of carbon upon pyrolysis. Alternatively, a block copolymer with $sp^3$-hybridized carbons can be employed, since, during pyrolysis, dehydrogenation reactions can occur on metal surfaces, transforming $sp^3$ carbons to $sp^2$ or sp. The ligand represents an additional source of carbonaceous material and can similarly assist in stabilizing the material during the pyrolysis process.

To produce a porous mesostructured metal from the nanocomposite mesostructure, the metal content in the nanocomposite is higher than 5 vol. %, preferably higher than 10 vol. %, and more preferably 15 vol. %. In another embodiment, the metal content in the nanocomposite can be higher than 90% (taking into account porosity and presence of non-metal components such as carbon or silica). In a specific embodiment, the metal content is greater than 50 wt. % (or about 9 vol. %).

The methods of the invention can also easily produce nanocomposites with lower metal content, although the prospects for conversion to an ordered porous metal mesostructure are not as favorable.

The pore sizes of the ordered porous metal-carbon nanocomposite mesostructures can range from about 7 nm to 70 nm. In one embodiment, the pore sizes are larger than 6.9 nm. The ordered porous nanocomposite mesostructures are similar to a block copolymer or nanoparticle-block copolymer mesophase. In a specific embodiment, the unit cell size is ≥10 nm.

Ordered metal-ceramic nanocomposite mesostructures (e.g., metal-silica nanocomposites) are also provided by the invention. In one embodiment, mesostructured metal-ceramic nanocomposites have periodicities of 10 nm of greater. Mesostructured metal-ceramic nanocomposites of the invention have morphologies similar to block copolymers or block copolymer-nanoparticle hybrids. The structure is also ordered (as described for hybrids above) and the structural order (i.e., unit cell size) is between 10 and 80 nm. In a specific embodiment, the unit cell size is ≥10 nm.

A method for producing mesostructured metal-ceramic nanocomposites is also within the scope of the invention. In one embodiment, the block copolymer poly(dimethylaminoethylmethacrylate)-block-poly(vinylsilazane) (PDMAEMA-b-PVSZ) is prepared using RAFT polymerization following known protocols (Q. D. Nghiem, D. Kim, D. Kim, Adv. Mater., 19, 2351 (2006)). The block copolymer molecular weight varies from 15 kg/mol to 50 kg/mol with the PDMAEMA being the minority block (weight fractions between 10 and 30 wt. %). The block copolymer and metal nanoparticles are cast from a solvent mixture comprised of methanol and chloroform or more preferably pure chloroform in a manner similar to the hybrid based on PI-b-PDMAEMA. Pyrolysis yields a non-porous metal (e.g., platinum)-ceramic (SiCN or SiC) nanocomposite in which the metal and ceramic occupy distinct parts of the mesostructure. Heat treatment in air yields a metal-ceramic but now the ceramic is silica.

In another embodiment of the invention rather than forming a carbonaceous material upon heating, the hydrophobic block is chosen such that it disintegrate's into another inorganic/ceramic material. In this embodiment the inorganic material plays the same role as the carbonaceous material formed from sp or $sp^2$ hybridized carbon containing hydrophobic blocks, i.e., it will act as a scaffold to keep the structure intact upon crystallization of the transition metal oxide. At the same time this embodiment leads to the formation of a nanostructured inorganic/ceramic-transition metal oxide nanocomposite which in of itself can be of value. Examples for such hydrophobic blocks include but are not limited to polynorbornene-decarborane which transforms under heat into boron carbonitride and boron nitride and polysilazanes which transform under heat into silicon carbonitride and silicon carbide.

Alternate block copolymers can be employed to achieve varied ceramic compositions. Polyferrocenylsilane yields iron oxides and silica. Polydimethylsiloxane yields silica. Polymers that coordinate heteroatoms in side chains also enable a variety of metals to be incorporated. Porosity can be generated in the nanocomposite when the percent shrinkage of the metal nanoparticle-containing domain differs from that of the metal oxide, which is a function of the relative organic contents of the two domains in the starting material.

Numerous synergistic effects have been observed for metal-metal oxide nanocomposite catalysts. Compared to the metal-carbon and metal-only materials, the metal-ceramic materials will exhibit higher temperature stability, especially in air. This is relevant for many applications, especially in fuel cells and catalysis. Other applications include plasmonics, where periodic arrays of nanostructured metals need to be supported and arranged in a transparent medium in order to achieve non-linear optical effects, altered light absorption properties, and local site enhancements for Raman scattering.

5.4.3 Ordered Porous Metal Mesostructures

The invention provides methods for structuring of a pure metal with the same structure as a block copolymer mesophase (inverse hexagonal, etc.), while achieving porosity in the structure. Ordered porous metal mesostructures are also included within the scope of the invention. In addition, ordered porous metal mesostructures produced by the methods of the invention are included within the scope of the invention. The electrical conductivity of these metal-only materials can be even higher than the nanocomposite materials.

The ordered porous metal mesostructures provided by the invention have similar structural order and morphology to the block copolymers or block copolymer-nanoparticle hybrids of the invention. Typically, block copolymers, block copolymer-nanoparticle hybrids, nanocomposite mesostructures or metal mesostructures with ordered mesostructured morphologies will exhibit at least one first order scattering peak and at least one higher order scattering peak.

In one embodiment, the ordered porous metal mesostructures have pore sizes from 7 nm to 70 nm. In another embodiment, the ordered porous metal mesostructures have pore sizes 7 nm or above. In another embodiment, the ordered porous metal mesostructures have pore sizes 70 nm or below. In another embodiment, ordered porous metal mesostructures are provided with pore sizes from 5 nm to 50 nm or from 50 nm to 70 nm. In another embodiment, the porous metal mesostructure has a unit cell size of $\geq 10$ nm.

5.4.4 Palladium-Containing Compositions

Very few modifications of the methods described herein for producing platinum-containing compositions are needed for synthesizing palladium-containing compositions. Changes that can be made include use of a different salt (palladium (II) chloride) in the NP synthesis. Additionally, approximately half as much sodium borohydride is required. Unlike platinum, the carbon in the palladium-carbon nanocomposite cannot be removed with a nitric acid/sulfuric acid mixture because the palladium is also oxidized. Instead, carbon removal via an oxygen-argon plasma is necessary.

5.4.5 Ordered Porous Metal Mesostructure Compositions and Combinations

Numerous useful compositions of matter can be produced through methods provided by the invention. In one embodiment, a hybrid is made with two or more distinct NPs in which each type of NP has a single metal. Here, "distinct" refers to NPs made in different processes, whether they are of the same or different metal. If the NPs are made of the same metal, the particles can be made distinct by their shape or size, or by the chemical composition of the ligand or its density on the NP surface. Multiple metals are incorporated via the simple mixing of NPs made from different metals.

A hybrid can be made from a single kind or multiple kinds of alloyed or ordered intermetallic NPs. Use of ordered intermetallic NPs, in particular, enables a broader range of metals to be utilized for porous nanocomposite mesostructure or porous metal mesostructure formation. In particular, metals can be used that might otherwise oxidize because the intermetallic's enthalpy of formation makes the reaction with oxygen less thermodynamically favorable. Using this strategy, metals are used with reduction potentials that are 100 to 300 mV more negative than the criteria cited above.

A hybrid is made from several (two or more) distinct NPs in which one or more of the NPs comprises a core-shell NP in which the core and shell each have distinct compositions. Using this method enables more electropositive metals to be protected as a core, more noble metals to form a protective shell, and a broader spectrum of metals to be incorporated. While this approach cannot be applied to alkali or alkaline earth metals, this approach can be applied to a broad spectrum of transition metals (which would be the core) when paired with more noble metals (such as those listed above: Cu, Ru, Rh, Pd, Ag, Ir, Au, and Bi).

The above-described bi-metallic, tri-metallic and higher (or more generally, poly-metallic) hybrids and the respective annealed hybrids, porous nanocomposite mesostructures and porous metal mesostructures can be processed in several ways. The processing method can greatly influence the local (nanoscale) distribution of metal, alloy, or nanocomposite. At one extreme, the materials can be processed at lower temperatures to make annealed hybrids, nanocomposite mesostructures, and porous metal mesostructures that are heterogeneous on the nanoscale (that is, they have local variations in the ratio of the metals employed). At the other extreme, the materials can be processed at higher temperatures to make annealed hybrids, nanocomposites mesostructures, and porous metal mesostructures in which the two or more metals comprising the hybrid have homogenized (that is, there average ratio of the metals over the entire nanocomposite is the same as the local ratio, where "local" means of a distance of approximately 1 nm). As described, these two cases represent extremes and between the two extremes, numerous variations are possible.

5.4.6 Locally Heterogeneous Porous Metal Mesostructure Compositions

A locally heterogeneous porous metal mesostructure composition and methods for making the composition are provided. In one embodiment of the method, a hybrid with a hydrophilic volume fraction of 65% is cast at 50° C. from a mixture comprising 50 mg of platinum NPs, 50 mg of ruthenium NPs, 28 mg of block copolymer, 1040 mg of chloroform, and 100 mg of methanol. Casting can be accomplished under any suitable conditions, including in air or in an inert environment such as $N_2$ or Ar.

Prior to annealing, the resulting mesostructured hybrid has two types of NPs (platinum and ruthenium) that are randomly dispersed throughout the hydrophilic domain. The sample is annealed at low temperatures (100° C. for 1 day). The order of the hybrid improves such that the mesostructure is clearly inverse hexagonal. By annealing at this relatively low temperature, aggregation of NPs is limited, whether that aggregation occurs between platinum particles, ruthenium particles, or platinum and ruthenium particles. Thus, following annealing, the vast majority of NPs are still composed exclusively of either platinum or ruthenium.

Subsequently, thin films of this hybrid are treated with an argon-oxygen plasma, which removes the organic components while maintaining the metal mesostructure. The polymer and ligand shell separating the NPs is removed and the platinum and ruthenium NPs come into physical contact. Because the plasma treatment is performed at relatively low temperatures, the extent of diffusion of platinum into ruthenium and ruthenium into platinum is minimal. Thus, this ordered porous platinum-ruthenium mesostructure consists of distinct areas of small regions of platinum, small regions of ruthenium, and very thin interfacial regions between the platinum and ruthenium that have a sharp concentration gradient from platinum to ruthenium.

5.4.7 Locally Homogeneous Porous Metal Mesostructure Composition

In another embodiment, a locally homogeneous porous metal mesostructure composition is made. A hybrid with a hydrophilic volume fraction of 65% is cast at 50° C. from a mixture comprising 50 mg of platinum NPs, 50 mg of ruthenium NPs, 28 mg of block copolymer, 1040 mg of chloroform, and 100 mg of methanol. Casting is performed, e.g., in air or in an inert environment such as $N_2$ or Ar.

Prior to annealing, the resulting mesostructured hybrid has two types of NPs (platinum and ruthenium) that are randomly dispersed throughout the hydrophilic domain.

The sample is annealed at 130° C. for 2 days, which both improves mesostructure order (well-ordered inverse hexagonal) and causes significant aggregation among the NPs. Annealing at this temperature for 2 days causes, a growth in NP size from about 1.8 nm to 2.3 nm. This reflects a doubling, on average, of NP volume, meaning that, on average, during the annealing process two NPs merged to form a single NP. When equal amounts of platinum and ruthenium are used, this means that the composition of NPs following annealing is, on average, 25% platinum, 25% ruthenium, and 50% platinum-ruthenium, at a 1:1 ratio. Other compositions are also present, resulting from the aggregation of, e.g., 3 or more particles.

Next, the sample is pyrolized, preferably at a temperature between 410° C. and 700° C. Any suitable time or temperature combination or range for pyrolysis that produces an ordered porous metal-nonmetal (carbon or ceramic) nanocomposite mesostructure can be used in the methods of the invention. For example, pyrolysis can be performed under a wide range of temperatures up to 1200° C. and for a wide range of durations from minutes to weeks or longer.

During the pyrolysis, NPs grow in diameter to between 3 nm and 12 nm, on average, depending on pyrolysis temperature. Because these NPs result from the collision of many smaller NPs, the larger particles all have compositions that are essentially identical to the bulk composition of the sample. Thus, this material is a homogeneous platinum-ruthenium nanocomposite in which each NP in the nanocomposite has almost exactly a 1:1 ratio of platinum to ruthenium. For such a nanocomposite, the carbon can be removed, e.g., via an oxygen-argon plasma or nitric acid/sulfuric acid etch.

The two embodiments described above represent two extremes. The methods of the invention can be easily applied to mixed compositions comprising two or more metals.

There are many embodiments in between the two extremes, depending on how the samples are processed. In the case of platinum-ruthenium, for example, processing at temperatures between the two extremes can lead to platinum-rich areas and ruthenium-rich areas with a gradient in composition between the two regions. The extent to which platinum-rich (or platinum-only), ruthenium-rich (or ruthenium-only), gradient regions, and homogeneous regions dominate the composition depend largely on processing temperature, but also on the amount of time spent at that particular temperature. The distinct metals comprising the polymetallic porous hybrid mesostructure, nanocomposite mesostructure, or metal mesostructure can have distinct crystalline phases. For example, platinum has a face-centered cubic atomic structure, whereas ruthenium is hexagonally closest packed. Thus, not only can the material have regions with varying metal ratios, but it can also have regions with varying crystal structure.

While platinum and ruthenium alloy with each other, other pairs of metals that form intermetallics compounds can also be used according to the methods of the invention. In the case of more homogeneous nanocomposites and metals, a single distinct phase can be produced. For example, combining platinum with bismuth in a one-to-one molar ratio produces the ordered intermetallic PtBi (which has the NiAs crystal structure). Alternatively, combining platinum with bismuth in a two-to-one molar ratio produces the ordered intermetallic $PtBi_2$.

In embodiments having more heterogeneous nanocomposites and metals, multiple distinct phases can be produced. Again, taking the example of Pt and Bi, a hybrid made from Pt and Bi NPs can be processed in such a way (at relatively low temperatures) so that, for example, distinct regions of Pt, PtBi, $PtBi_2$, and Bi exist within the nanocomposite.

Some materials, such as FePt, can form both alloys and intermetallics. The alloy is typically stable below 500° C., whereas the ordered intermetallic forms above 500° C. (but can be reconverted to the alloy above 1300° C.). Thus it is possible to produce some materials, such as FePt, as alloys or ordered intermetallics.

Furthermore, some metals have such high melting points that forming very high temperatures may be needed to form crystalline materials. Below that temperature, the metals will have a significant amorphous character. This may occur to some extent for metals with melting points above 2200° C., such as Ru and Ir.

5.5 Methods for Synthesizing Porous Mesostructured Materials from Nanoparticle-Block Copolymer Self-Assembly A method of preparing a porous metal-carbon nanocomposite mesostructure is provided. In one embodiment, the method comprises:

(a) providing a block copolymer/ligand-stabilized metallic nanoparticle solution, in which nanoparticles are selected from the group consisting of metal, metal alloy, metal mixture, and intermetallic nanoparticles or combinations thereof;

(b) casting said solution resulting in the formation of a metal-rich mesostructured nanoparticle-block copolymer hybrid; and (c) heating said hybrid in an inert atmosphere to an elevated temperature resulting in the formation of an ordered porous metal-carbon nanocomposite mesostructure.

In one embodiment, the metallic nanoparticle solution comprises metallic nanoparticles, semiconductor nanoparticles, insulator nanoparticles or combinations thereof.

In another embodiment, the block copolymer includes a hydrophobic portion which comprises sp or $sp^2$ hybridized carbon atoms.

In another embodiment, the ligand-stabilized metallic nanoparticle further comprises a nonmetallic component selected from the group consisting of a semiconductor and an insulator.

In another embodiment, the semiconductor is selected from the group consisting of a transition metal oxide, a type IV semiconductor, a type III-V semiconductor and a type II-VI semiconductor.

In another embodiment, following step (c), carbon is removed to produce an ordered porous metal mesostructure.

In another embodiment, the carbon is removed by the use of a plasma, by acid etch or by heat treatment in air.

In another embodiment, the ordered porous metal-carbon nanocomposite mesostructure has a unit cell size of ≥10 nm In another embodiment, the ordered porous metal-carbon nanocomposite mesostructure has structural features sizes of ≥10 nm.

In another embodiment, the porous metal mesostructure has a unit cell size of ≥10 nm.

In another embodiment, the porous metal mesostructure has structural features sizes of ≥10 nm.

In a specific embodiment, the invention provides a method for synthesizing porous Pt-containing metal mesostructures from ligand-stabilized Pt NPs and a block copolymer (see also Example 6.1).

N,N-di-2-propoxyethyl-N-3-mercaptopropyl-N-methylammonium chloride (FIG. 1A) can be used as the ligand for the Pt NPs. These Pt NPs can have a metal core diameter of 1.8±0.5 nm (FIG. 2A), and a maximum radial extension of 1.4 nm (FIG. 1B). The metal content can be about 56.9% by weight, or 7.5% by volume.

The NPs exhibit hydrophilic properties. They are highly soluble in methanol, modestly soluble in water and acetone, poorly soluble in chloroform, and insoluble in tetrahydrofuran and ether.

FIG. 2 shows bright-field TEM images (A) and (C) to (I) and a photograph (B) of materials produced after each stage of the synthesis of the porous Pt-containing mesostructured material. (A) shows ligand-capped Pt NPs. (B) shows pieces of unannealed CCM-Pt-6 inverse hexagonal hybrid film. The grid paper has 5-mm markings. (C) shows unannealed inverse hexagonal hybrid. (D) shows an annealed inverse hexagonal hybrid. (E) shows examination of the hybrid from (D) at higher magnification resolved individual Pt NPs, seen as dark spots in the bright-field image. (Inset) shows a typical convergent-beam electron diffraction pattern (seen with an ultrahigh-vacuum scanning transmission electron microscope) from a single Pt NP, demonstrating its crystallinity. (F) shows an annealed CCM-Pt-4 lamellar hybrid. (G) shows pyrolysis of an annealed inverse hexagonal hybrid yields a porous Pt—C nanocomposite mesostructure. (Inset) shows selected area electron diffraction, showing Pt expected face-centered cubic scattering profile. (H) shows HRTEM of the pyrolyzed sample resolved the Pt's lattice fringes. (I) shows that removal of carbon with an Ar—O plasma yielded porous inverse hexagonal Pt metal mesostructures.

FIG. 3 shows X-ray and physisorption measurements of materials produced after each stage of the synthesis. (A) shows SAXS profiles of mesostructured materials. Q, scattering wave vector. Solid curves correspond to data consistent with an inverse hexagonal mesostructure (CCM-Pt-6), and the dashed curve corresponds to data consistent with a lamellar mesostructure (CCM-Pt-4). For hybrids with inverse hexagonal morphology, the (1,0) reflections of the unannealed, annealed, and pyrolized samples correspond to d-spacings of 30.3, 30.0, and 23.7 nm, respectively. The first-order reflection of the lamellar sample corresponds to 33.1 nm. Tick marks indicate positions of expected reflections. (B) shows PXRD of samples at various stages of the synthesis. The Pt domain size increases after each stage of processing, from 1.2 nm (starting NPs) to 1.4 nm (aged NPs) to 1.5 nm (annealed hybrid) to 4.1 nm (pyrolized nanocomposite), as determined by Scherrer analysis. (C) shows Barrett-Joyner-Halenda pore size distribution as derived from a N physisorption adsorption isotherm reveals a peak mesopore diameter of 17 nm.

A solvent combination of chloroform and methanol [9:1 weight/weight (w/w)] can be used in which both the block copolymer and NPs exhibit high solubility. The NPs are nearly insoluble in the absence of methanol, and the polymer precipitates in solutions with >20% methanol. The as-synthesized NPs are too hydrophilic to form macroscopically homogeneous hybrids with PI-b-PDMAEMA when films recast from a chloroform:methanol 9:1 (w/w) solution, but become less hydrophilic upon aging. In particular, boiling the NPs for 5 hours in water decreases their hydrophilicity to the extent that they became more soluble in solvents of moderate or low polarity, such as tetrahydrofuran and chloroform.

After aging, the NPs can be centrifuged to remove the organic byproducts of the aging process. The metal content in the aged NPs can be about 65.4% by mass or 10.4% by volume. The Pt particle size remains unchanged at 1.8 nm and the Pt domain size increases from 1.2 to 1.4 nm, which can be determined by peak-width analysis of powder x-ray diffraction (PXRD, FIG. 3B). NMR spectra of the aged NPs will be nearly identical to those of as-synthesized NPs. On average, a single aged NP has 65 ligands, a decrease from 93 in the as-synthesized NP (see Example 6.1 for calculation).

A macroscopically homogeneous solution of aged NPs and block copolymer (a) can be prepared by combining 98 mg of NPs, 28 mg of block copolymer, 1040 mg of chloroform, and 110 mg of methanol. The hydrophilic volume fraction [the volume fraction of PDMAEMA and NPs; see Example 6.1 for calculations] can be 65%, which yields a hybrid with an inverse hexagonal mesostructure (CCMPt-6). The solution contents are transferred to an aluminum dish 1 cm in diameter and heated at 50° C. beneath a hemispherical dish that is designed to slow solvent evaporation.

Because chloroform's vapor pressure is greater than that of methanol, and because the solvent composition is maintained near 9:1 chloroform:methanol, a 20-ml vial containing 4 g of chloroform can be placed beneath the hemispherical dish, thereby slowing the evaporation of chloroform from the NP-block copolymer solution. After 1 hour of heating at 50° C., nearly all the solvent will evaporate. The sample will be a homogeneous, shiny black solid in which a mesostructure has formed, and will be weak and brittle (FIG. 2B). The order can be increased, however, by annealing CCM-Pt-6 at 130° C. for 2 days under vacuum. The annealing process improves hybrid order and also decomposes the ligands to the extent that the NPs merge and grow.

The average grain size of the mesostructure does not increase substantially with longer annealing times.

Any suitable time or temperature combination or range for annealing that produces a homogeneous mesostructured solid can be used. Such combinations and ranges can be easily determined by the skilled artisan. Annealing temperatures between 50° C. and 300° C. are preferably used. For a given material, the annealing period becomes shorter as the annealing temperature is increased. For example, annealing can be performed for 1 week at 100° C. or for 2 hours at 160° C.

Besides a method for producing an inverse hexagonal mesostructures (e.g., CCM-Pt-6), in another embodiment, a method for producing a mesostructure with lamellar morphology (e.g., CCM-Pt-4) is provided. PI-b-PDMAEMA copolymers (a) or (b) can be used to cast hybrids from solution with a hydrophilic volume fraction of 56%. Casting can be performed, e.g., in air or in an inert environment such as $N_2$ or Ar.

Figure 2A:
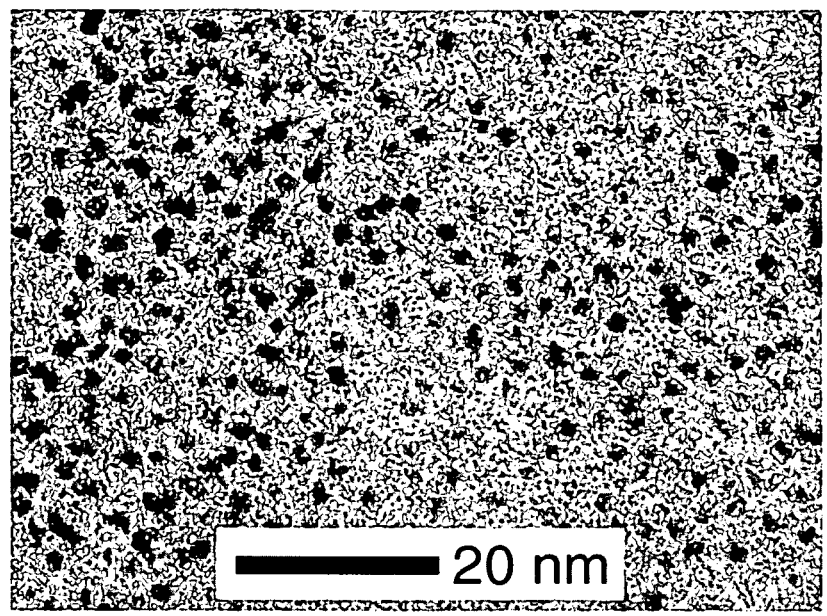
Figure 2B:
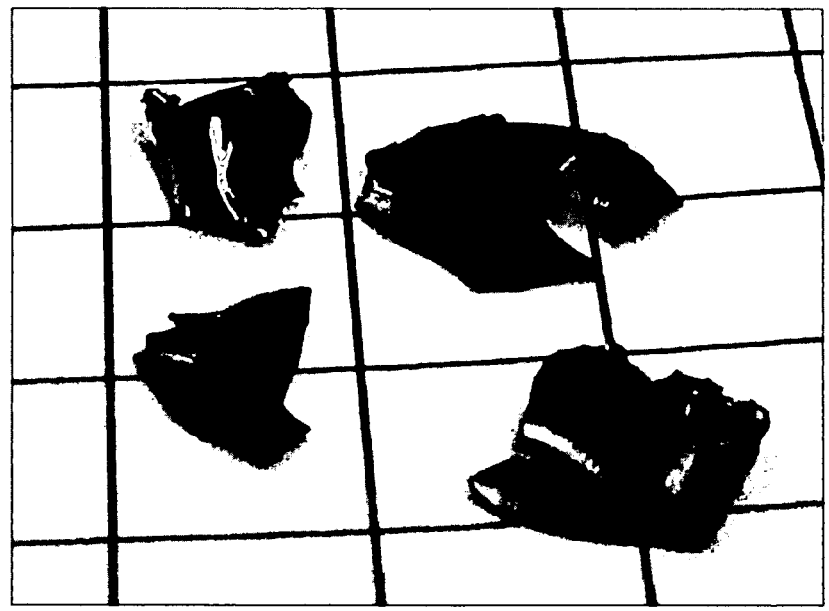
Figure 2C:
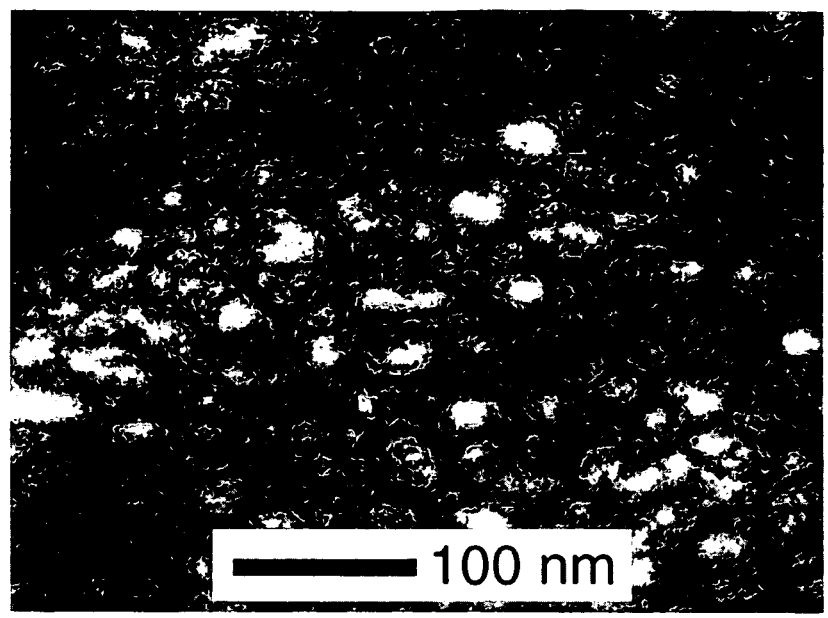
Figure 2D:
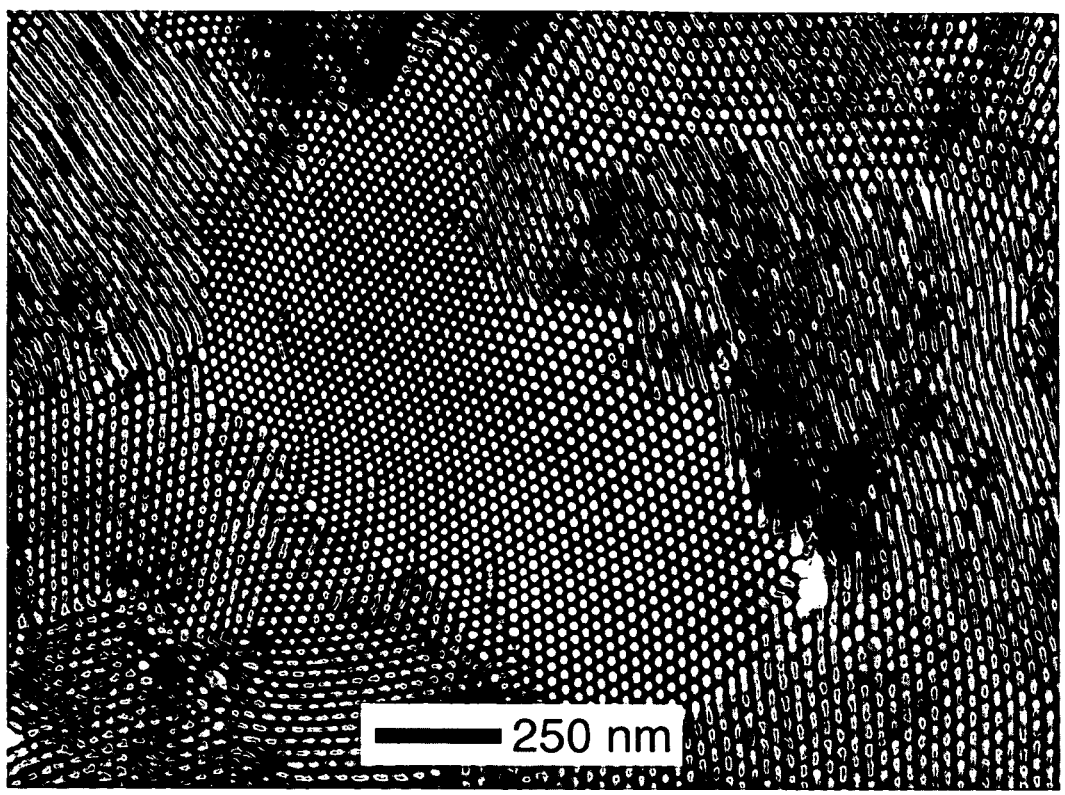
Figure 2E:
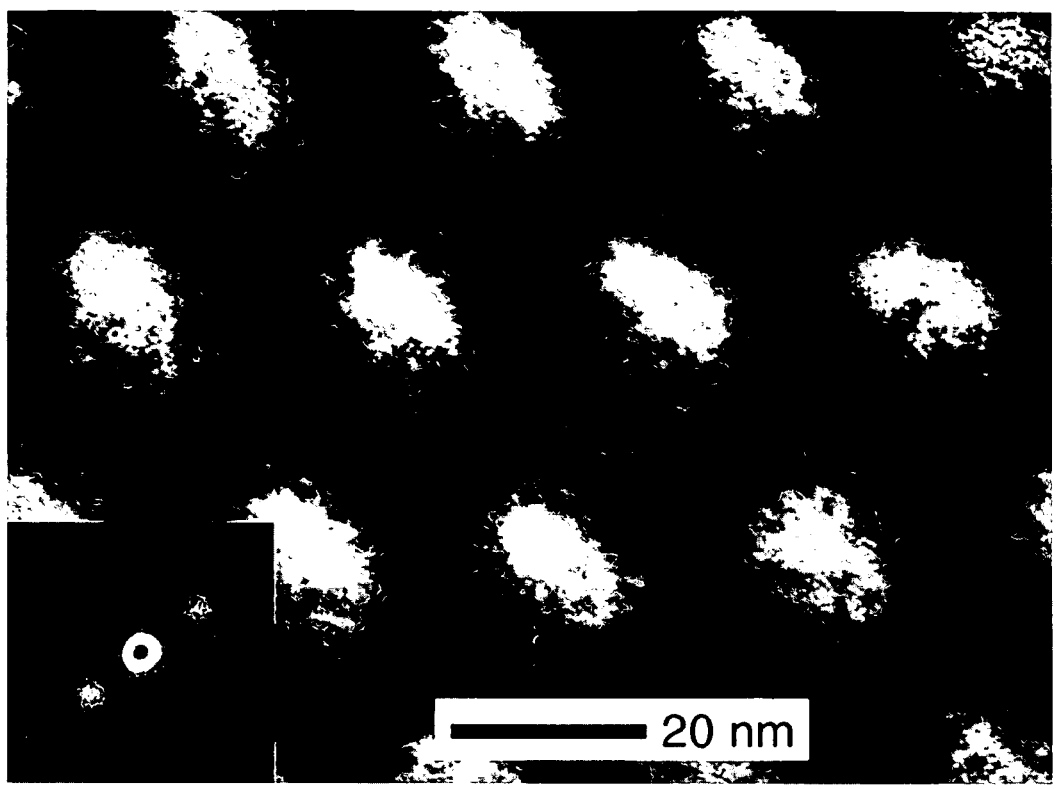
Figure 2F:
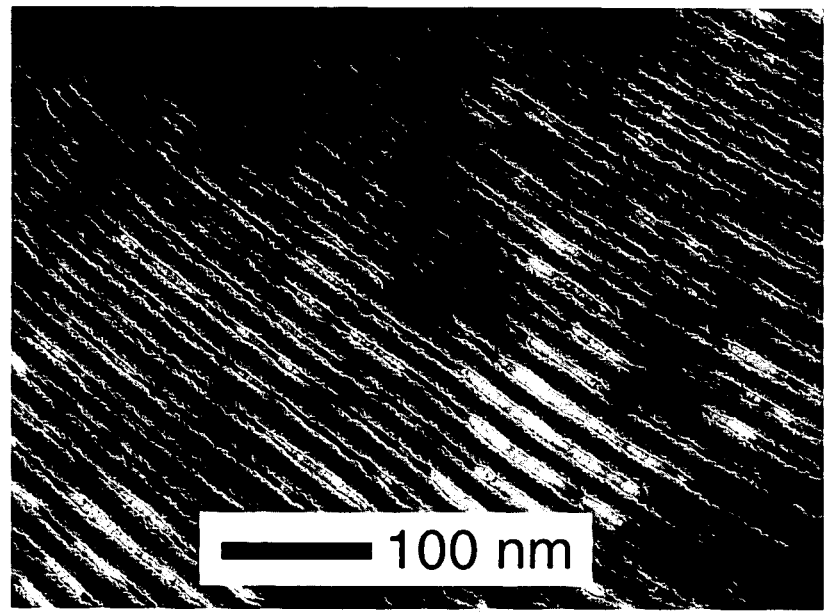
Figure 3A:
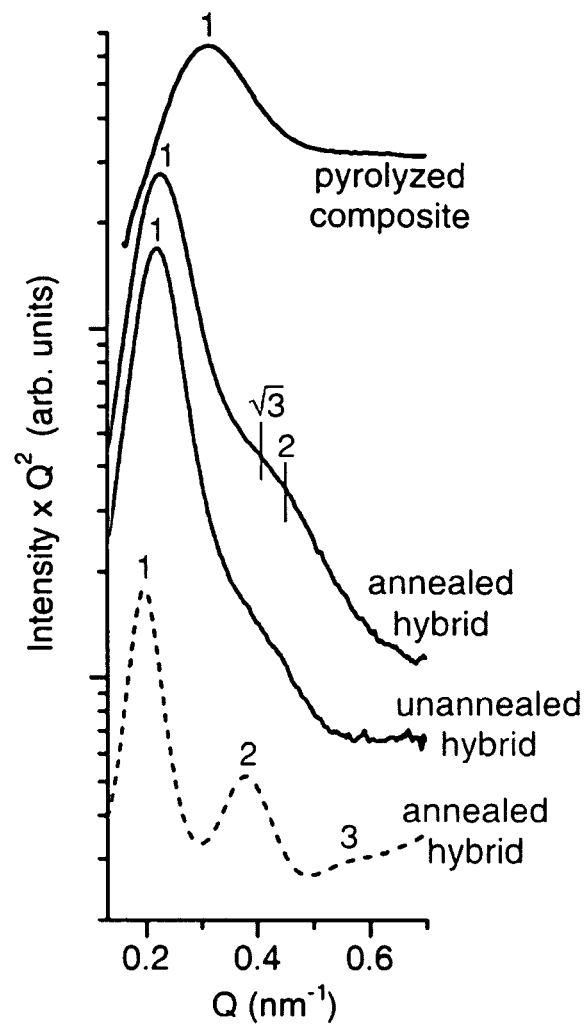

Similarly to the CCM-Pt-6 hybrid, annealing at 130° C. will lead to a well-developed mesostructure as confirmed by SAXS and corroborated by TEM (FIGS. 2F and 3A). Thus, like oxide structures, metal NP-block co-polymer hybrid morphologies can be tailored by simply adjusting the NP volume fraction (M. Templin et al., Science 278, 1795 (1997)).

Any suitable time or temperature combination or range for pyrolysis that produces an ordered porous metal-nonmetal (carbon or ceramic) nanocomposite mesostructure can be used in the methods of the invention. For example, pyrolysis can be performed under a range of temperatures from 150° C. to 1200° C. and for a range of durations from minutes to weeks or longer.

For example, a rapid pyrolysis process (C. Liang, K. Hong, G. A. Guiochon, J. W. Mays, S. Dai, Angew. Chem. Int. Ed. 43, 5785 (2004); J. Lee et al., Nat. Mater. 7, 222 (2008)) can be used to convert the inverse hexagonal hybrid CCM-Pt-6 to an ordered porous Pt—C nanocomposite mesostructure. The sample is heated at 10° C./min under N or Ar to at least 410° C., followed by immediate cooling. Under these conditions, the sp2-hybridized carbons of the PI block decompose into an amorphous C-rich material with slight graphitic character (FIG. 4A) (J. Lee et al., Nat. Mater. 7, 222 (2008)). The pyrolysis leads to a mass loss of 28%. Heating the material to temperatures as high as 550° C. will not result in further mass loss. The pyrolysis can be accompanied by a decrease in the (1,0) d-spacing from 30.0 to 23.7 nm, as revealed by analysis of the SAXS patterns (FIG. 3A). The inverse hexagonal structure will be preserved (FIG. 2G) and the Pt interface will roughen, because of the growth of the NPs to 3.3±0.9 nm in diameter. Examination by high-resolution TEM (HRTEM) will reveal lattice fringes throughout the Pt walls (FIG. 2H), showing that the walls are composed of crystalline Pt. Analysis by PXRD and application of the Scherrer equation can be used to determine the Pt nanocrystals' domain size (4.1±0.4 nm, FIG. 3B), representing a substantial increase from the aged NPs. Together, SAXS, PXRD, and TEM analyses provide a consistent picture of a metal-C nanocomposite that is macroscopically homogeneous and uniformly mesostructured.

The C plays an important role in maintaining open, uniform pores of CCM-Pt-6 during pyrolysis (J. Lee et al., Nat. Mater. 7, 222 (2008)). If the hybrid is heated in air instead of an inert atmosphere, the C is removed (a mass loss of 38% occurs) and the mesostructure is lost. The mesopores are open (FIG. 3C) and 26% of the sample's volume (micropores and mesopores) is open space, as expected for an inverse hexagonal nanocomposite that has pores lined with C. The Brunauer-Emmett-Teller surface area of CCMPt-6 is 18 m$^2$/g, and the pore diameter is 17 nm.

For many applications, such as fuel cells, it is desirable for the metal surface to be completely exposed. To remove the C from the CCM-Pt-6 nanocomposite, the C can be removed from microtomed thin films (~50 nm thick) of the CCM-Pt-6 nanocomposite using an Ar—O plasma. Alternatively, for thicker films (10 to 100 mm thick), a sulfuric acid:nitric acid 3:1 (v/v) etch at 70° C. (J. Liu et al., Science 280, 1253 (1998)) can successfully remove most C.

Figure 4A:
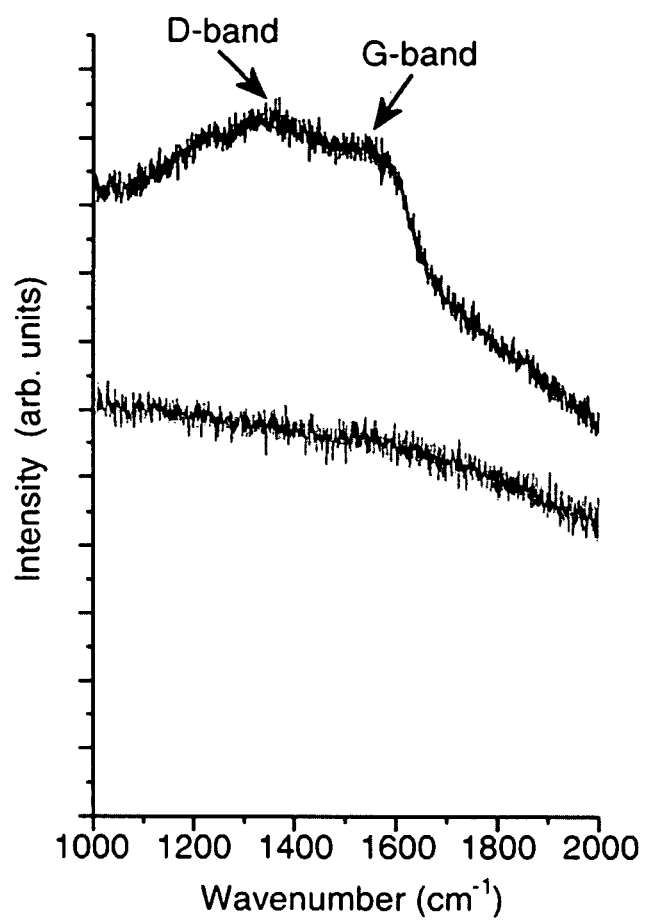
Figure 4B:
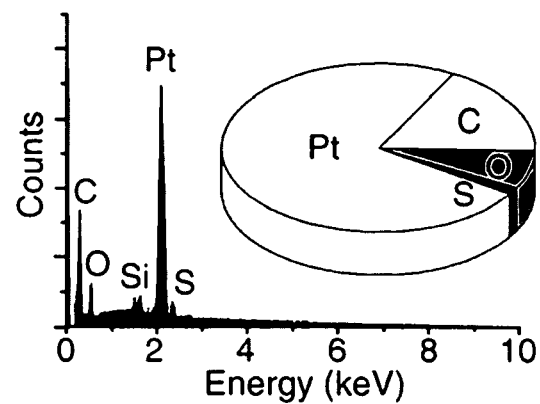

To characterize the metal-C nanocomposites, energy-dispersive spectroscopy (EDS) can be performed (FIG. 4B). In FIG. 4B, a composition of 74 wt % Pt, 18 wt % C, 7 wt % O, and 1 wt % S is shown. C removal can be further confirmed by TGA. Pyrolized samples will retain about 80% of the original mass when heated to 550° C. in air, whereas C-etched samples will retain about 97% of their original mass.

The NP-polymer hybrid can have electrical conductivity of about $10^{-12}$ to about $10^3$ S/cm. In a specific embodiment, NP-polymer hybrid has electrical conductivity of about $10^{-2}$ to about $10^4$S/cm. For example, if the NP-polymer hybrid has electrical conductivity of 2.5 mS/cm, this can increase to about 400 S/cm upon pyrolysis.

Because polymer-NP interactions are largely mediated via the NP ligands, this method can be extended to other metals for which similarly sized ligand-stabilized NPs can be synthesized. Thus, ordered porous metal mesostructures of other elements, disordered alloys, or even ordered intermetallics can be prepared.

In another embodiment, a method of preparing a porous semiconductor-carbon or insulator-carbon nanocomposite mesostructure is provided. In one embodiment, the method comprises:

(a) providing a block copolymer/ligand-stabilized semiconductor or insulator nanoparticle solution;

(b) casting said solution resulting in the formation of a semiconductor-rich or insulator-rich mesostructured nanoparticle-block copolymer hybrid; and (c) heating said hybrid in an inert atmosphere to an elevated temperature resulting in the formation of an ordered porous semiconductor-carbon or insulator-carbon nanocomposite mesostructure.

In another embodiment, the ligand-stabilized nanoparticle solution comprises semiconductor nanoparticles, insulator nanoparticles or combinations thereof.

In another embodiment, the block copolymer includes a hydrophobic portion which comprises sp or sp$^2$ hybridized carbon atoms.

In another embodiment, the semiconductor is selected from the group consisting of a transition metal oxide, a type IV semiconductor, a type III-V semiconductor and a type II-VI semiconductor.

In another embodiment, the following step (c), carbon is removed to produce an ordered porous semiconductor or insulator mesostructure.

In another embodiment, the carbon is removed by the use of a plasma, by acid etch or by heat treatment in air.

In another embodiment, the porous semiconductor-carbon or insulator-carbon nanocomposite mesostructure has a unit cell size of ≥10 nm.

In another embodiment, the porous semiconductor-carbon or insulator-carbon nanocomposite mesostructure has structural features sizes of ≥10 nm.

A method of preparing a metal-ceramic nanocomposite mesostructure is also provided. In one embodiment, the method comprises:

(a) providing a block copolymer/ligand-stabilized metallic nanoparticle solution, in which nanoparticles are selected from the group consisting of metal, metal alloy, metal mixture, and intermetallic nanoparticles or combinations thereof;

(b) casting said solution resulting in the formation of a metal-rich mesostructured nanoparticle-block copolymer hybrid; and (c) heating said hybrid in an inert atmosphere or air to an elevated temperature resulting in the formation of an ordered metal-ceramic nanocomposite mesostructure.

In another embodiment, the metallic nanoparticle solution comprises metallic nanoparticles made from different metals or from a combination of different metals.

In another embodiment, the block copolymer comprises a hydrophobic portion which transforms upon heating into a ceramic.

In another embodiment, the ordered metal-ceramic nanocomposite mesostructure is porous.

In another embodiment, the metal-ceramic nanocomposite mesostructure has a unit cell size of ≥10 nm.

In another embodiment, the metal-ceramic nanocomposite mesostructure has structural feature sizes of ≥10 nm.

A method of preparing a semiconductor-ceramic or insulator-ceramic nanocomposite mesostructure is also provided. In one embodiment, the method comprises:

(a) providing a block copolymer/ligand-stabilized semiconductor or insulator nanoparticle solution;

(b) casting said solution resulting in the formation of a semiconductor-rich or insulator-rich mesostructured nanoparticle-block copolymer hybrid; and (c) heating said hybrid in an inert atmosphere or air to an elevated temperature resulting in the formation of an ordered semiconductor-ceramic or insulator-ceramic nanocomposite mesostructure.

In another embodiment, the ligand-stabilized nanoparticle solution comprises semiconductor nanoparticles, insulator nanoparticles or combinations thereof.

In another embodiment, the block copolymer comprises a hydrophobic portion which transforms upon heating into a ceramic.

In another embodiment, the ordered semiconductor-ceramic or insulator-ceramic nanocomposite mesostructure is porous.

In another embodiment, the semiconductor-ceramic or insulator-ceramic nanocomposite mesostructure has a unit cell size of ≥10 nm.

In another embodiment, the semiconductor-ceramic or insulator-ceramic nanocomposite mesostructure has structural feature sizes of ≥10 nm.

An ordered semiconductor-ceramic or insulator-ceramic nanocomposite mesostructure produced by the above process is also provided.

The metal of the methods or compositions of the invention can be selected from the group consisting of platinum, palladium, gold, silver, copper, rhodium, ruthenium, iridium and bismuth.

In one embodiment, the metal component comprises at least two distinct metals.

In another embodiment, the at least two metals comprise an alloy, a metal mixture or an intermetallic.

5.6 Uses for Mesostructured Materials

The hybrids (metal NP-block copolymer and metal NP-ceramic NP-block copolymer), the nanocomposites (metal-carbon and metal-ceramic carbon), and the porous metal mesostructures or porous metal-ceramic nanocomposite mesostructures can have numerous applications.

5.6.1 Fuel Cells, Electrocatalysis, and Heterogeneous Catalysis

One of the most compelling applications for the nanocomposites and metal-only materials is fuel cell electrodes. The materials provided by the invention exhibit good conductivity and present a high surface area for the metal. Typical electrodes have carbon as the conducting phase, which presents a long-term challenge to electrode stability because the carbon is oxidized during operation. Therefore, the use of the metal as both catalyst and electron conductor opens up a new class of materials for fuel cell electrodes.

Of particular relevance is the ability to easily incorporate a wide range of metals into the fuel cell. This synthetic route gives access, for the first time, to a class of ordered, polymetallic porous mesostructured electrodes with controlled heterogeneity. The local (~1 nm) proximity of two or more metals can enhance catalysis in which each metal plays a specific role in the catalysis. This is known to be of relevance for, e.g., fuel cells, but also more generally for electrocatalysis and heterogeneous catalysis. The ability to control the local heterogeneity by through processing temperature enables the production of novel catalysts with novel properties. Furthermore, the ability to control NP size via processing temperature opens up other routes for enhancing catalysis based on particle size effects. Similar concepts are equally interesting for other porous mesostructured electrocatalysts and, more generally, for heterogeneous catalysts.

In certain embodiment, the porous metal mesostructures or porous metal-ceramic nanocomposite mesostructures of the invention can be ground to make porous powders. In other embodiment, they can be used in thin-film geometry so as to be incorporated into applications such as fuel cell applications. Powdered materials of the invention can be used as thin films on a substrate, or can be applied as a thin film layer (or as a series of layers) to a substrate and then removed from substrate.

5.6.2 Electronic Circuitry for Data Transmission, Storage, and Computation

The ability to construct nanoscale wires, sheets, cylinders and other structures can provide a route to nanoscale electronic circuitry. When combined with top-down approaches such as block copolymer lithography, mesoporous or mesostructured metals can be fabricated in controlled geometries with relevant architectures for building electronic circuits. Patterning of magnetic materials, such as FePt, is also possible, which has particular relevance for hard drives and other data storage media.

5.6.3 Combinatorial Studies

The ability to produce several phases simultaneously in one material enables the examination not only of several distinct phases but also their synergistic behavior in, e.g., catalysis. The method can be made particularly amenable to combinatorial studies because the same or similar protocol can be used for producing hybrids. Therefore numerous hybrids can be produced rapidly with varying compositions, simply by mixing the constituent NPs in varying ratios.

5.6.4 Separation

The controlled pore sizes in, e.g., inverse hexagonal hybrids of the invention, enables physical separation to be employed. Separation of gasses via chemisorption and diffusion through the porous metal mesostructures, hybrids or porous metal-ceramic nanocomposite mesostructures of the invention may provide other routes for separation and purification. Pore sizes can readily be controlled between 5 nm and 100 nm by using block copolymers of various sizes. The ability to make thin films of these materials can further assist separation—the membranes made in this approach are both selective (because of the uniformity of the pore sizes) and minimize resistance to flow (because of the films' thinness).

5.6.5 Power Generation and Conversion

Porous metal-ceramic nanocomposite mesostructures are interesting materials for photovoltaic applications, hydrogen production via photoelectrochemical water splitting. The ability to precisely control the spatial positions of metal oxide and metal leads to synergistic effects in catalysis. The tunability of metals and metal oxides for these nanocomposites provides particular flexibility in these materials. Such porous, thin metal films can become optically transparent, thus providing alternative routes for making efficient electrical contacts in systems where optical transparency is important, such as a variety of solar cells. In fact, such porous, optically transparent metals present an intriguing alternative to ITO and other expensive collector electrodes that are used commonly in solar cells.

5.6.7 Optics, Plasmonics and Raman Processes

Metal mesostructures and metal-ceramic nanocomposite mesostructures are interesting from a perspective of optics, plasmonics, and enhanced Raman processes. In certain embodiments, porous metal-ceramic nanocomposite mesostructures can have better mechanical and optical properties than some porous pure metal mesostructure compositions. The presence of metals dispersed in a ceramic matrix enhances the absorption of light in nearby dyes, which has particular relevance for dye-sensitized solar cells. It is also possible to transmit information in the form of plasmons along the surface of metals. Mesostructured and mesoporous metals provide a unique form for this method of information transmission.

5.6.8 Uses for Hybrid, Metal-Carbon Nanocomposite, Metal-Insulator Nanocomposite, And Metal-Semiconductor Nanocomposite Mesostructures Hybrid and nanocomposite mesostructures can be employed for optical applications, especially optical applications where a periodic pattern of nanoparticles can exhibit unique plasmonic behavior that does not occur for individual nanoparticles. For example, light can be guided through nanoscopic holes (i.e., regions that do not contain metal and have a low dielectric constant, like air or a polymer) in porous metals where classical physics would suggest that light should not be able to propagate. More generally, these materials can be useful for applications where a modest electrical conductivity, high metal content, and unique optical behavior are useful. The nanocomposite mesostructures can, likewise, be employed for unique optical properties, especially those of the metal-semiconductor type, where the plasmonic effect leads to enhanced absorption by the semiconductor. The incorporation of semiconductors and insulators is also useful from a standpoint of catalysis, fuel cells, and electrocatalysis, where the dispersion of metal must be carefully controlled and the presence of secondary phases can enhance the catalytic performance of the metal (or the metal of the secondary phase).

The following examples are offered by way of illustration and not by way of limitation.

6. EXAMPLES

6.1 Example 1

Ordered Porous Mesostructured Materials from Metal Nanoparticle-Block Copolymer Self-Assembly

6.1.1 Introduction

The synthesis of ordered porous metal nanocomposite mesostructures and ordered porous metal mesostructures is a challenge because metals have high surface energies that favor low surface areas. This example presents results from the self-assembly of block copolymers with ligand-stabilized platinum NPs, leading to lamellar CCM-Pt-4 and inverse hexagonal (CCM-Pt-6) hybrid mesostructures with high NP loadings. Pyrolysis of the CCM-Pt-6 hybrid produced an ordered porous platinum-carbon nanocomposite mesostructure with open and large pores (≥5 nm). Removal of the carbon lead to ordered porous platinum mesostructures. The platinum-carbon nanocomposite had very high electrical conductivity (400 siemens per centimeter) for an ordered porous mesostructured material fabricated from block copolymer self-assembly.

6.1.2 Materials and Methods

Block Copolymer Synthesis.

Isoprene (Aldrich, 99%), cyclohexane (J. T. Baker, 99%), THF (J. T. Baker, 99%) and 1,1-diphenylethylene (97%, Aldrich) were distilled from n-butyl lithium (Sigma-Aldrich, 1.6 M in hexanes) before use. DMAEMA (Aldrich, 98%) was distilled from $CaH_2$ (Aldrich, 90-95%). Methanolic HCl (Supelco, 3 N) was freeze-pump-thawed three times prior to use. Lithium chloride (Aldrich, 99.99%) was evacuated on a vacuum line overnight prior to usage. Sec-butyl lithium (Aldrich, 1.4 M in cyclohexane) were used as received.

Ligand and NP Synthesis.

2-allyloxyethanol (Aldrich, 98%) was distilled from $CaH_2$ (Aldrich, 90-95%) under nitrogen prior and freeze-pump-thawed once prior to use. 1,3-dibromopropane (Sigma-Aldrich, 99%) was distilled from potassium carbonate (Sigma-Aldrich, 98%) before use. Pyridine (Aldrich, anhydrous 99.8%), phosphorus tribromide (Aldrich, 99%), 33 wt. % methylamine in ethanol (Aldrich), sodium carbonate (Sigma-Aldrich, 98%), methanol (J. T. Baker, anhydrous, for reaction to make 3 and the NP synthesis), methanol (Aldrich, anhydrous, 99.8%, for reaction to make 5), sodium hydrosulfide hydrate (Aldrich), concentrated HCl (Sigma-Aldrich), sodium hydroxide (Sigma-Aldrich, 97%), chloroform (J. T. Baker, 99%), magnesium sulfate (Sigma-Aldrich, anhydrous, 99%), deuterated chloroform (Aldrich, 99.8 atom % D), deuterated water (Aldrich, 99.8 atom % D), platinum (IV) chloride (Aldrich, 99.9%), sodium borohydride (Sigma-Aldrich, 99%), and ether (J. T. Baker, anhydrous) were used as received.

Hybrid Synthesis.

Methanol (J. T. Baker, anhydrous), and chloroform (J. T. Baker) were used as received. Fisher brand aluminum weighing dishes (Fisher, 08-732-100, 1¹/₁₆ fl. oz. capacity) were formed into aluminum dishes with a 1 cm diameter by bending the aluminum dish around a cylindrical object with a 1 cm diameter. The walls of the dish were typically bent at a ~45° with respect to the bottom of the dish.

NMR, EM, X-Ray and Physics Methods.

Standard Schlenk line techniques were used for the synthesis of the ligand. NMR spectra were acquired on a Mercury 300 at 300 MHz ($^1H$) and 75 MHz ($^{13}C$). Films were cast beneath a hemispherical dish made from the bottom half of a 1-L flask. Heating was controlled using a IKA RET control vise IKAMAG digital hotplate. Samples were prepared for TEM by sectioning at 60 nm with a Leica Ultracut UCT at −50° C. The samples were collected on a water/DMSO eutectic solution and transferred to 300 mesh copper grids (no carbon film was used).

Most TEM was performed on a Tecnai T12 at 120 kV and high resolution energy filtered (zero loss) TEM was performed on a Tecnai F20 with a Gatan Tridium Spectrometer at 200 kV. Single particle electron diffraction was performed on a UHV-STEM. PXRD was performed on a Scintag XDS 2000, with a scan rate of 0.1°/minute, and the full width at half maximum determined using curve fitting within Jadé. Energy dispersive spectroscopy (EDS) was performed on a LEO 1550 FE-SEM at 10 kV.

TGA was performed using a TA Instruments Q500 instrument equipped with an autosampler.

SAXS experiments were performed on a Rigaku RU-H3R copper rotating anode ($\lambda$=1.54 Å) for CCM-Pt-6 and on the G1 station at the Cornell High Energy Synchrotron Source (CHESS) for CCM-Pt-4. The Rigaku RU-H3R setup was operated at 40 kV and 50 mA. X-rays were monochromated with a Ni filter and focused using orthogonal Franks mirrors. SAXS patterns were collected with a homebuilt 1 K×1 K pixel CCD detector. The SAXS data obtained at CHESS were collected with a CCD 2-D detector operating at X-ray energy of 1.223 Å. Nalgene Oakridge Teflon centrifuge tubes were employed for purifying NPs.

Centrifugation was performed using an Eppendorf 5810.

Physisorption was performed on a Micromeritics ASAP 2020 using nitrogen as the physisorption gas.

Raman spectroscopy was performed on a confocal Raman microscope using a Nd:YAG laser at 532 nm.

Statistics about the NP core diameters were taken from measurement of over 100 particles using intensity profiles drawn in Gatan DigitalMicrograph. The NP platinum (core) diameter was 1.83±0.5 nm for both as-synthesized and aged particles.

Block Copolymer Synthesis.

Figure 6:
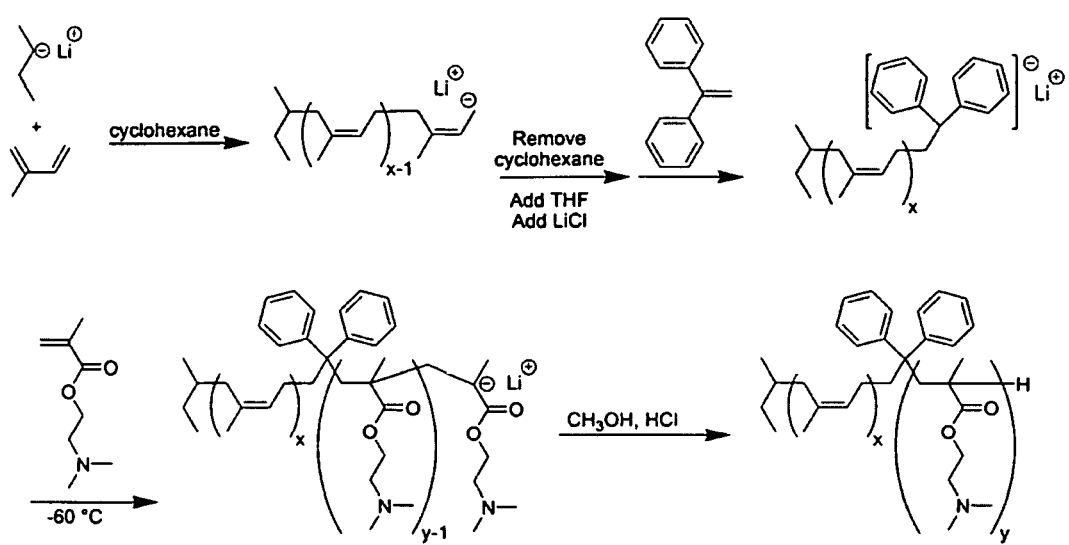
FIG. 6 shows the synthesis of PI-b-PDMAEMA (scheme S1). See Section 6.1.2 for details.

Scheme S1 (FIG. 6) outlines the steps of the polymer synthesis. The synthesis of poly(isoprene-block-dimethylaminoethyl methacrylate) (PI-b-PDMAEMA) has been previously reported (S. Creutz, P. Teyssie, R. Jerome, Macromolecules 30, 6-9 (1997); S. Renker, Dissertation, Max Planck Institute for Polymer Research (2003)). The PI-h-PDMAEMA block copolymers were synthesized by anionic polymerization under anhydrous and air-free conditions using a glovebox and Schlenk line techniques.

Sec-butyl lithium was used to initiate isoprene in cyclohexane. After 8 hours of polymerization, cyclohexane was removed on a vacuum line and anhydrous THF and LiCl were subsequently added to the PI in a glovebox. A small amount of the PI was removed via syringe, terminated with methanolic HCl, and subjected to GPC to determine the PI MW. The polyisoprene was end-capped with a 5-fold excess of diphenylethylene and stirred for 30 min. The polymer solution was cooled to −60° C. before the addition of DMAEMA. The polymerization was allowed to proceed for several hours before the reaction was terminated with methanolic HCl. To purify the polymer, it was precipitated in cold methanol and dried on a vacuum line for several days. The polymers were characterized by GPC to give the final polydispersity and NMR was used to determine PDMAEMA weight fraction. The polymer (a) used to make a lamellar and inverse hexagonal mesostructure had a polydispersity of 1.05 and a molecular weight of 31.1 kg/mol of which 33 wt. % PDMAEMA. A second polymer (b) used to make a lamellar mesostructure had a polydispersity of 1.04 and a molecular weight of 27.8 kg/mol of which 15 wt. % was PDMAEMA.

Ligand Synthesis.

Figure 7:
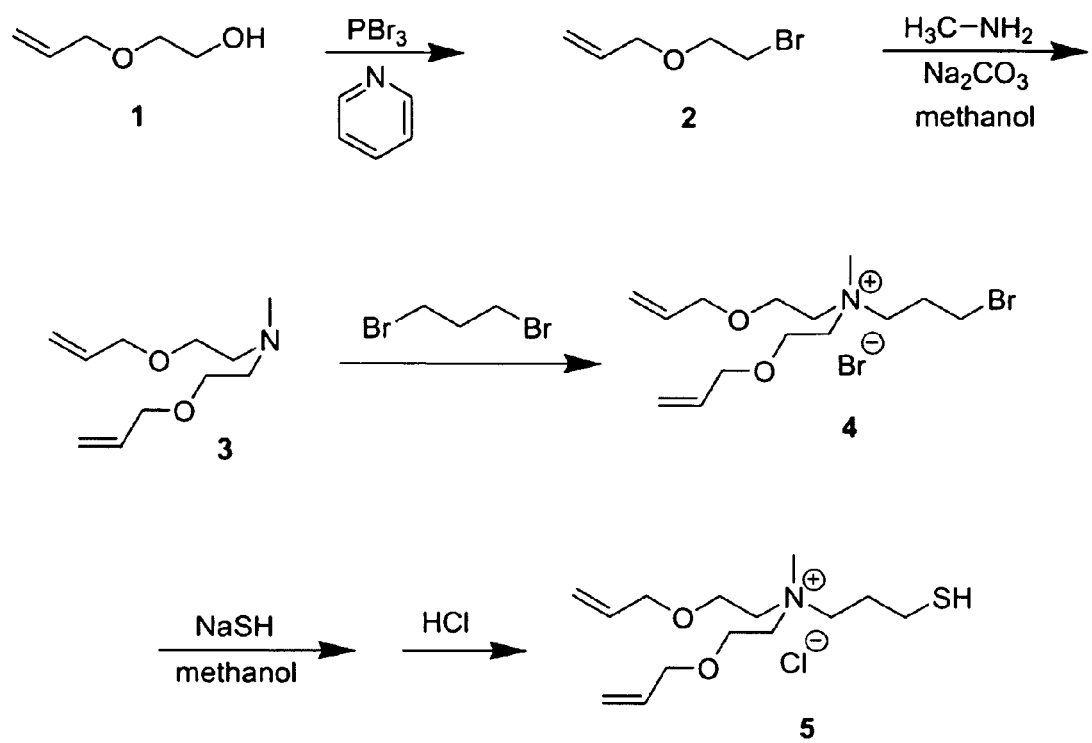
FIG. 7 shows the synthesis of ligand N,N-di-2-propoxyethyl-N-3-mercaptopropyl-N-methylammonium chloride (scheme S2). See Section 6.1.2 for details.

The steps of the synthesis of the ligand N,N-di-2-propoxyethyl-N-3-mercaptopropyl-N-methylammonium chloride, 5, are shown in Scheme S2 (FIG. 7).

Figure 8:
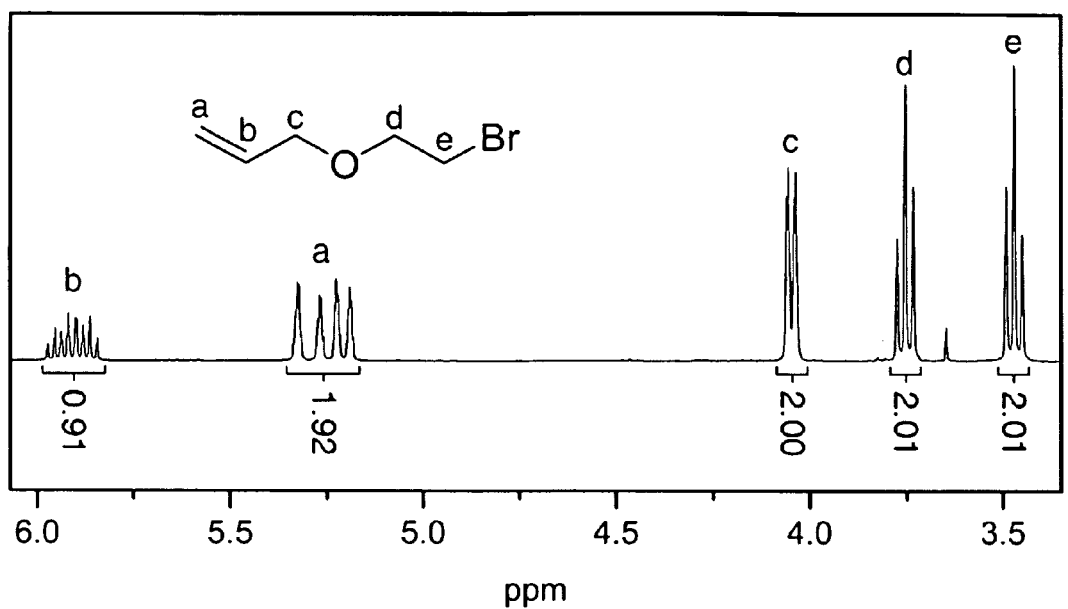
FIG. 8 shows $^1$H NMR of 2. ($CDCl_3$, 300 MHz) δ 5.91 (b, m, 1H), 5.25 (a, m, 2H), 4.04 (c, m, 2H), 3.75 (d, t, 2H, J=6.21 Hz), 3.47 (e, t, 2H, J=6.13 Hz). See Section 6.1.2 for details.
Figure 9:
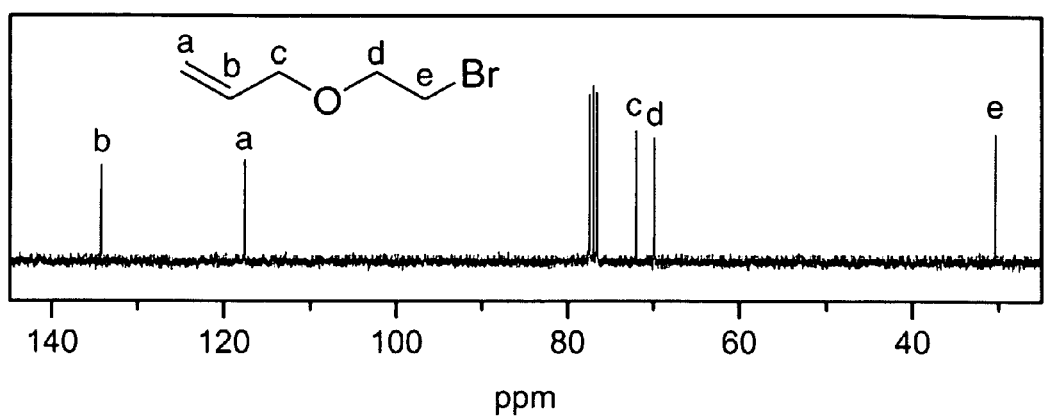
FIG. 9 shows $^{13}$C NMR of 2. ($CDCl_3$, 75 MHz) δ 134.2 (b), 117.6 (a), 72.0 (c), 69.9 (d), 30.4 (e). See Section 6.1.2 for details.

Allyloxyethylbromide (2, FIG. 7) was produced as follows. In a glovebox, 200 g of $PBr_3$ (0.739 mol) was added to a 1 L round bottom flask containing a large stirbar. Separately, 54 g of anhydrous pyridine (0.683 mol) and 209 g of anhydrous 2-allyloxyethanol, 1, (2.05 mol) were mixed in a beaker and transferred to a large pressure-equalizing addition funnel. The flask with $PBr_3$ and the addition funnel were removed from the glovebox, quickly assembled, and maintained beneath an atmosphere of nitrogen. The flask with $PBr_3$ was cooled in an ice bath with salt to −10° C. The contents of the addition funnel were delivered to the $PBr_3$ over the course of 4 hours. Part way through the addition, a white precipitate accumulated in the flask, making stirring difficult. From this point on, the flask was manually swirled every 10 minutes or so to maintain good mixing. After the addition, the reaction was allowed to come to room temperature overnight. The product was distilled out of this mixture under dynamic vacuum, at approximately 0.05 mbar and between 25 and 28° C. The distillate typically consisted of a mixture of 1 and 2. A second distillation was used to separate the two; the boiling point of 2 is slightly higher than that of 1. The reaction afforded 89 g of 2 (0.54 mol), a 26% yield. $^1H$ and $^{13}C$ NMR spectra are shown in FIGS. 8 and 9.

N,N-di-(2-(allyloxy)ethyl)-N-methylamine (3, FIG. 7) was produced as follows. To a 1-L flask with a stirbar was added 89 g of 2 (0.54 mol), 440 g of methanol, 25.4 g of 33 wt. % methylamine in ethanol (0.270 mol), and 57.2 g of $Na_2CO_3$ (0.54 mol). The flask was equipped with a reflux condenser and heated at 36° C. in an oil bath under flowing nitrogen. After one day the temperature was increased to 58° C. After one day at the elevated temperature the flask was removed from heat. The methanol was removed via rotary evaporation. The slurry was dumped into filter paper and washed with chloroform. The amine was extracted into an aqueous HCl solution from the chloroform solution, followed by extraction into chloroform by lowering the pH to between 12 and 14 with NaOH. The chloroform was dried over $MgSO_4$ for 5 minutes, tittered through Whatman filter paper, and the chloroform was rotary evaporated. The amine was distilled under dynamic vacuum at 51° C. and 0.1 mbar. Often, the amine was fractionally distilled a second time to improve purity. The product was a colorless, transparent liquid. Approximately 8.50 g of 3 (0.0427 mol) was isolated from the reaction, a yield of 8%. The low yield was due to the preferential formation of the N,N,N-tri-(2-(allyloxy)ethyl)-N-methylammonium bromide. $^1H$ and $^{13}C$ NMR spectra are shown in FIGS. 10 and 11.

N-3-bromopropyl-N,N-di-(2-(allyloxy)ethyl)-N-methylammonium bromide (4, FIG. 7) was produced as follows. A 250 mL flask with stirbar was weighed. To this flask was added 8.50 g of 3 (0.0427 mol) and 274.74 g of 1,3-dibromopropane (1.361 mol). The reaction was heated in an oil bath at 50° C. for 16 hours. The excess 1,3-dibromopropane was removed from the reaction via distillation under vacuum. During the distillation, the flask was immersed in an oil bath at 50° C.; heating for prolonged periods at higher temperatures could decompose the product. The 1,3-dibromopropane could be re-used. The flask was connected directly to the vacuum line and evacuated overnight to remove the residual 1,3-dibromopropane. Finally, the flask was brought immediately into a glovebox to prevent the absorption of water. The contents of the flask, 4, weighed 16.44 g (0.0410 mol), nominally a yield of 96%. The starting material 3 is not entirely pure (see FIGS. 10 and 11), so the actual yield of this reaction is probably close to 100%. $^1H$ and $^{13}C$ NMR spectra are shown in FIGS. 12 and 13.

N,N-di-(2-(allyloxy)ethyl)-N-3-mercaptopropyl-N-methylammonium chloride (5, FIG. 7) was produced as follows. To the same flask with 16.44 g of 4 (0.0410 mol) was added 2.490 g of sodium hydrosulfate hydrate in a glovebox (water content varies from bottle to bottle and slowly decreases upon storage in an anhydrous environment; water content is typically less than 35 wt. % and may get as low as a few percent upon lengthy storage). 55 g of dry, degassed methanol was added to solvate the reagents, and assembled the flask with a reflux condenser under flowing nitrogen outside the glovebox. The reaction was heated at 65° C. for 8 hours. The reaction was cooled to room temperature and concentrated HCl was added (in air) until the pH stabilized at <2. Usually at least several mL of concentrated HCl were needed. During the addition NaCl precipitated from solution. The solution was then stirred for at least an hour in a well ventilated fume hood so that any excess NaSH would react with the HCl and be removed as gaseous, toxic $H_2S$. The solution was then rotary evaporated to remove the methanol. The flask with product mixture 5 was attached to a vacuum line for several hours to remove water and HCl. The product mixture was dissolved in chloroform and filtered through Whatman filter paper to remove remaining NaCl or NaBr. The chloroform was rotary evaporated and the product attached to a vacuum line overnight to remove residual solvent and water. The product mixture 5 was initially a viscous, yellow-orange liquid. Upon sitting for several weeks, the product began to solidify. As determined by NMR, there was no detectable change upon sitting. The reaction afforded 12.23 g of the product mixture, a yield of 96% assuming exclusive production of 5. The product was immediately brought into the glovebox to prevent absorption of water. As determined by NMR, the product mixture contained the thiol, disulfide and sulfide of 5 and a small amount of residual 4. The relative proportions of each varied from synthesis to synthesis and a typical product distribution is shown in FIGS. 14 and 15. The variation in the product distribution was related to variations in the ratio of 4 and NaSH that are initially combined. An excess of NaSH promoted sulfide formation because NaSH deprotonates thiol 5 to form a thiolate that can nucleophilically substitute for the bromide of 4. An excess of NaSH may promote disulfide formation via deprotonation of the thiol followed by oxidation, possibly by adventitious oxygen. Across five syntheses, thiol content varied between 13% and 45%, sulfide varied between 10 and 18%, disulfide varied between 19 and 43%, and 4 content varied between 20% and 26%. Variation in the product distribution did not seem to influence the synthesis of the NPs. No further purification was performed. $^1H$ and $^{13}C$ NMR spectra of a typical product mixture are shown in FIGS. 14 and 15.

FIG. 14 shows $^1H$ NMR of product mixture 5. Letters without subscripts (a through j) correspond to 5 as shown in the figure. Letters d, s, and t indicate the disulfide, sulfide, and thiol, respectively, for protons i and h. Letters with a subscript ($f_4$, $g_4$, $h_4$ and $i_4$) label peaks from residual 4. Peaks f and $f_4$ are the superposition of two smaller peaks. This arises from the presence of both the chloride salt (as drawn in the figure) and the bromide salt (not shown). In peaks f and $f_4$, the left, higher line (peak) corresponds to molecules with a chloride anion and right, lower line (peak) corresponds to molecules with a bromide anion. The chloride salt predominates, so this form is what is drawn herein.

Nanoparticle Synthesis.

The stages of NP synthesis, purification, and ageing are depicted in Scheme S3 (FIG. 16).

NP synthesis was performed on a variety of scales, using between 100 mg of $PtCl_4$ and 2.0 g of $PtCl_4$ and scaling the other reagents proportionally. Because of the precise timing required in the synthesis, batches made with more than 2.0 g of $PtCl_4$ were less reproducible, largely because of the challenge in transferring large quantities of reagents in the short times required. Following the timing described below, Pt NPs with a 1.83 nm diameter were obtained. Variations from this process tended to give low yields or smaller particles (as small as 1.0 nm).

Three solutions were prepared immediately prior to the NP synthesis. The first solution was prepared in a one-neck 1-L round bottom flask with a large joint (at least 24/40) and a large stirbar. To this flask was added 2.000 g of $PtCl_4$ (5.937 mmol), 100.0 g of water, and 100.0 g of methanol. The second solution was prepared in a 125 mL Erlenmeyer flask. To this flask was added 1.50 g of 5 and 30.0 g of methanol. The third solution was prepared in a 125 mL Erlenmeyer flask by combining 2.272 g of $NaBH_4$ and 45.0 g of water.

Over a period of about 2 to 3 seconds, the second solution (5) was poured into the first solution ($PtCl_4$), while stirring rapidly. About 1 to 2 seconds later, the third solution ($NaBH_4$) was added to the first two solutions over a period of less than 5 seconds. About 10 minutes later, 200 mL of methanol was added to the solution. The solution was stirred for 10 more minutes before the stirbar was removed and the methanol rotary evaporated.

Careful timing in the above steps arose from the tendency of $Pt^{4+}$ to form an insoluble complex with 5 within 3 to 5 seconds. If too much time proceeded between the addition of 5 and $NaBH_4$, large chunks of precipitate can form that renders the $Pt^{4+}$ inaccessible to $NaBH_4$. When this happened, the yield of NPs was low. Rapid addition of the $NaBH_4$ solution was made difficult by the rapid production of hydrogen bubbles. This difficulty was overcome using a large flask with a large opening. Despite careful addition of 5 and $NaBH_4$, a small amount of precipitate usually formed. Adding methanol 10 minutes after the reduction solvated the precipitate and completes the reduction. Adding the methanol sooner than this was detrimental because changing the water:methanol ratio yielded smaller NPs.

After removal of methanol via rotary evaporation, the water was lyophilized (freeze dried) by cooling the solution and attaching the flask to a vacuum line. If the solution was above about 5° C., a foam formed that made further removal of water difficult. Thus the water did not need to be completely frozen during the evacuation and typically a bath of lukewarm water was placed beneath the flask to expedite water removal.

The black solid was transferred by spatula to 50 mL centrifuge tubes (Nalgene Oakridge PTFE tubes). Residual NPs were transferred by dissolution in a small volume of methanol. For a synthesis on the scale described above (2.0 g of $PtCl_4$), distributing the solid into four 50 mL centrifuge tubes was necessary to allow for efficient centrifugation. To each of the centrifuge tubes, approximately 4 mL of methanol was added and the tubes were shaken for several minutes to dissolve most of the solid. Ether was added to the fill mark. The tubes were centrifuged at 10,000 rpm for 2 minutes. The faintly colored (dark) supernatant was decanted. The centrifugation with methanol and ether was repeated three more times.

To remove NaCl, the solid was dissolved in a solution of 3 g of methanol and 97 g of $CHCl_3$. The solution was poured through Whatman filter paper. The remaining solid in the filter was washed four more times with 50 mL of 3 wt. % methanol and 97 wt. % $CHCl_3$. The solvent was rotary evaporated from the NPs. The NPs were centrifuged four more times in methanol/ether as before and one last time in ether. The black solid was broken into a fine powder using a mortar and pestle (note that dry NPs should always be handled in a fume hood to prevent inhalation). Finally, the powder was transferred to a round bottom flask and evacuated on a vacuum line for about an hour to remove remaining solvent. A $^1H$ NMR spectrum is shown in FIG. 17 (FIG. S9).

FIG. 17 shows $^1H$ NMR of as-synthesized Pt NPs. During the synthesis, the double bond became hydrogenated (arrows show a small amount of unhydrogenated ligand). Peaks h and i were not observed because of proximity to the platinum surface (R. H. Terrill et al., J. Am. Chem. Soc. 117, 12537-12548 (1995)). Peak assignments for c through g are tentative. ($D_2O$, 300 MHz) δ 3.90 (d, 4H), 3.79 (e, 4H), 3.49 (g, 2H), 3.39 (c, 4H), 3.07 (f, 3H), 1.46 (b, 4H), 0.77 (a, 4H).

The purified, as-synthesized NPs were subjected to an ageing process in boiling water. To a 500 mL flask with stirbar was added 0.68 g of as-synthesized Pt NPs and 230 g of water. A reflux condenser was attached and the flask was heated in an oil bath held at 115° C. Five hours after first placing the flask in the pre-heated oil bath, the flask was removed and allowed to cool naturally to room temperature. Following this, the water was lyophilized and the resulting black solid was centrifuged four times in methanol/ether and once in ether as described above. The solid was pulverized in a mortar and pestle and dried on a vacuum line for several hours. A $^1$H NMR spectrum is shown in FIG. 18. The NMR shows that there were a very small number of impurities (integration of the impurities accounts for 1.8% of the total integrated area in the spectrum) and the fact that these appeared as sharp peaks indicated that they were not directly associated with the NP. Thus NMR shows that ageing the particles caused minimal changes in the composition of the organic material that is bound to the NPs (although TGA measurements, shown later, demonstrated that there are fewer ligands per particle).

TGA.

TGA was performed in air and nitrogen on as-synthesized and aged NPs (FIG. 19), on as-synthesized and annealed CCM-Pt-6 hybrids (FIG. 20), and on the CCM-Pt-6 pyrolized and acid-treated films (FIG. 21).

Only platinum metal remained after performing TGA in air. The resulting material was shiny and silvery like bulk Pt. Thus the aging process leads to a loss of ligand from the NP. Comparison of aged particles heated in air with those heated in nitrogen show that 18 wt. % of the ligand remained after pyrolysis. Also noteworthy is the fact that most of the mass loss occurs between 150° C. and 250° C. when heating under nitrogen. In contrast, pyrolysis of the PI-b-PDMAEMA block copolymer by itself (data not shown) occurs mostly between 320° C. and 420° C. Thus, two clearly defined mass loss steps are observed in the CCM-Pt-6 nanoparticle-block copolymer hybrids when heated under nitrogen (FIG. 20). FIG. 20 shows TGA of CCM-Pt-6 hybrids, before and after annealing. For all runs, the hybrids were heated at 10° C./min. to 550° C.

When heated in air, the mass loss is greater and the difference in mass loss reflects the approximate mass of carbonaceous material that remains in the pyrolyzed samples. In FIG. 20, it is also evident that the annealed hybrids have less organic material than the as-made hybrids. Presumably during the annealing process (2 days at 130° C. under vacuum) the ligands partially decompose and volatilize. Indeed, comparison of the as-made and annealed hybrids show that the differences in mass loss occur primarily at temperatures below 275° C., which was assigned to ligand decomposition (as noted above).

The CCM-Pt-6 platinum-carbon nanocomposite apparently absorbs a significant quantity of water or other volatile species from the atmosphere; these species rapidly evaporate during TGA (FIG. 21). FIG. 21 shows TGA of CCM-Pt-6 platinum-carbon nanocomposite and acid-treated sample. Both samples were heated in air at 10° C./min. to 550° C.

Figure 4C:
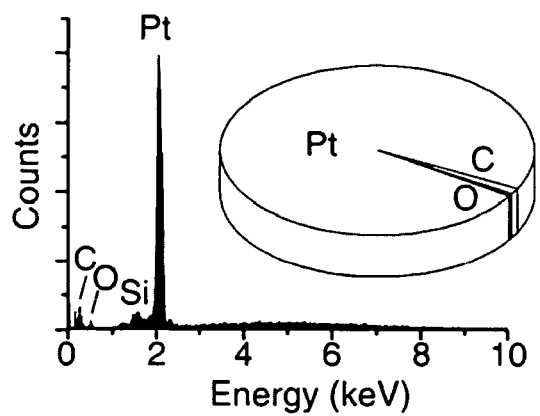

There is a small increase in mass at 200° C. which may arise from the partial oxidation of the carbonaceous matrix. TGA shows that the acid treatment removes nearly all combustible and volatile compounds from the platinum-carbon nanocomposite, consistent with EDS (FIG. 4C). The absence of a significant mass loss at temperatures below 150° C. (as occurs with the platinum-carbon nanocomposite) shows that the carbonaceous matrix is where the adsorbed water and other volatile species primarily reside.

Calculations.

To calculate the platinum and organic volume fraction in the NPs, it was assumed that the platinum NPs were spherical and that the platinum core had the density of bulk platinum (21.09 g/cm$^3$). It was assumed the mass loss observed when performing TGA in air corresponded to the total mass of ligand and that only platinum remained after combustion. It was also assumed that the composition of the ligand on the NP was the same as ligand 5 prior to the NP synthesis (see FIG. S7), which consisted of a mixture of chloride salt (313.9 g/mol, ~60%) and bromide salt (358.4 g/mol, ~40%) and thus has an averaged molecular weight of 331.7 g/mol.

A spherical platinum NP (metal core diameter of 1.83 nm) had a volume of 3.21 nm$^3$. This volume of metal weighed 67.7 zg (z=zepto=$10^{-21}$) and contained 209 platinum atoms. The as-synthesized platinum NPs had a mass loss in TGA of 43.1%. From this, it was calculated that the mass of ligands attached to each NP was 51.3 zg, which shows that approximately 93 ligands were attached to each NP, on average.

$$\text{mass of Pt} = \frac{4}{3}\cdot\pi\cdot\left(\frac{1.83\text{ nm}}{2}\right)^3\cdot\left(\frac{1\text{ cm}^3}{10^{21}\text{ nm}^3}\right)\cdot\frac{21.09\text{ g}}{\text{cm}^3} = 67.7\cdot 10^{-21} \text{ g} = 67.7 \text{ zg} \quad [1]$$

$$\text{\# of Pt atoms} = \frac{67.7\cdot 10^{-21}\text{ g}}{195\text{ g/mol}}\cdot\frac{6.022\cdot 10^{23}\text{ atoms}}{\text{mol}} = 209 \text{ atoms} \quad [2]$$

$$\text{\# of ligands per particle} = \frac{\left(\frac{67.7\cdot 10^{-21}\text{ g}}{1-0.431}\right)-67.7\cdot 10^{-21}\text{ g}}{331.7\text{ g/mol}}\cdot\frac{6.022\cdot 10^{23}\text{ ligands}}{\text{mol}} = 93 \text{ ligands} \quad [3]$$

A similar calculation for the aged NPs shows that there are 65 ligands per NP.

The calculation of platinum or ligand volume fraction in the NPs can be performed in several ways. One method known in the art involves finding the molar volume of the ligand, which can be done via bulk density measurements or by computational approaches. Both approaches were used and gave very similar results. Optimizing the molecular structure using a variety of packages (MM2, Mopac) and calculation of the atomic volume yielded approximately 0.440 nm$^3$ for the bromide salt of 5 and 0.430 nm$^3$ for the chloride salt of 5. Conversion to a bulk density yielded 1.3 g/cm$^3$, which was identical to the measured bulk density. Using this density, the TGA data can be used to calculate platinum and ligand volume fractions. Thus it was calculated that the platinum volume fraction was 7.5% and 10.4% in the as-synthesized and aged particles, respectively.

$$\text{molar volume} = \left(\frac{0.440\text{ nm}^3}{\text{ligand}}\cdot 0.4 + \frac{0.430\text{ nm}^3}{\text{ligand}}\cdot 0.6\right)\cdot \frac{\text{cm}^3}{10^{21}\text{ nm}^3}\cdot\frac{6.022\cdot 10^{23}\text{ ligands}}{\text{mol}} = \frac{261\text{ cm}^3}{\text{mol}} \quad [4]$$

$$\text{ligand density} = \frac{331.7\text{ g/mol}}{261\text{ cm}^3/\text{g}} = 1.3\text{ g/cm}^3 \quad [5]$$

$$\text{platinum volume fraction} = \frac{\frac{56.9\text{ wt. \%}}{21.09\text{ g/cm}^3}}{\frac{43.1\text{ wt. \%}}{1.3\text{ g/cm}^3}+\frac{56.9\text{ wt. \%}}{21.09\text{ g/cm}^3}} = 7.5 \text{ vol. \%} \quad [6]$$

To calculate the volume fraction of the hydrophilic and hydrophobic components in the CCM-Pt-4 and CCM-Pt-6 hybrids, the weights of the PI, PDMAEMA, and NPs were converted into volume fractions. It was assumed that the PI and PDMAEMA in the hybrid had densities similar to their bulk values, i.e., 0.91 g/cm$^3$ and 1.15 g/cm$^3$, respectively. Table 1 outlines the quantities and volumes for the CCM-Pt-6 inverse hexagonal hybrid and Table 2 displays those of the CCM-Pt-4 lamellar hybrid. Lamellar hybrids were made from both PI-b-PDMAEMA block copolymers described in the polymer synthesis section, above.

Hybrids self-assembled into an ordered structure during annealing and the annealing process also lead to loss of ligand. This decreased the hydrophilic volume fraction and was accounted for in the second set of columns of Tables 1 and 2. To determine the mass loss during annealing (15%), it was assumed that both samples (as-synthesized and annealed) consisted solely of platinum following heat-treatment in air (FIG. 19). FIG. 19 shows TGA traces of platinum NPs. For all runs, the NPs were heated at 10° C./min. to 550° C. under flowing N$_2$ or air and held at 550° C. for one hour (black line).

Thus the masses of the two samples at the end of the TGA run could be calculated and their relative starting masses back-calculated (prior to the TGA analysis). The as-synthesized hybrid retained 52.6% of its original mass and the annealed hybrid retained 62.0%. Compared to the starting mass of the annealed hybrid (100%), the as-synthesized hybrid had a mass of 100%·62.0%/52.6%=118%. With respect to the as-synthesized hybrid, the annealed hybrid lost 100%−(100%/118%)=15% during annealing.

6.1.3 Results and Discussion

Ligand-stabilized Pt NPs (FIGS. 1, A and B) and a block copolymer (FIG. 1C) were designed that met the four criteria set forth in Section 5 above. Two poly(isoprene-block-dimethylaminoethyl methacrylate), PI-b-PDMAEMA block copolymers (a and b) were synthesized by anionic polymerization (S. Creutz, P. Teyssie, R. Jerome, Macromolecules 30, 6 (1997)) and had a polydispersity of 1.05 (a) or 1.04 (b) and molecular weights of 31.1 (a) or 27.8 (b) kg/mol, of which 33 (a) or 15 (b) weight % (wt %) was PDMAEMA.

FIG. 1 illustrates the CCM-Pt-6 produced after each stage of the synthesis. FIG. 1A shows the chemical structure of N,N-di-2-propoxyethyl-N-3 mercaptopropyl-N methylammonium chloride, the ligand used to produce moderately hydrophilic Pt NPs with high solubility.

FIG. 1B shows a true-scale model of a NP with a 1.8-nm diameter metal core and 1.4-nm ligand shell in which part of the metal surface is artificially exposed for illustrative purposes. The model has the same areal density of ligands as the aged NPs, with about 65 ligands per NP.

FIG. 1C shows the chemical structure of PI-b-PDMAEMA. PI is depicted in black and PDMAEMA is depicted in grey.

After examining a series of possible ligands for the Pt NPs, the ligand N,N-di-2-propoxyethyl-N-3-mercaptopropyl-N-methylammonium chloride (FIG. 1A) was selected. The synthesis of this ligand as well as of the ligand-stabilized Pt NPs is described herein.

FIGS. 1D to 1F illustrate approximate mesostructure geometry and are based on experimental data.

TABLE 1

Volume fraction calculations for CCM-Pt-6. The mass of PI-b-PDMAEMA is 27.6 mg, of which 33 wt. % is PDMAEMA. The mass of the aged platinum NPs is 97.5 mg, of which 65 wt. % is Pt.

|  | As-made | | | | Annealed | | | |
| --- | --- | --- | --- | --- | --- | --- | --- | --- |
|  | Density | Mass (mg) | Volume (mL) | Volume % | Density | Mass (mg) | Volume (mL) | Volume % |
| PI | 0.91 | 18.4 | 20.2 | 35.5 | 0.91 | 18.4 | 20.2 | 47.6 |
| PDMAEMA | 1.15 | 9.1 | 7.9 | 13.8 | 1.15 | 9.1 | 7.9 | 18.6 |
| Pt | 21.09 | 63.8 | 3.0 | 5.3 | 21.09 | 63.8 | 3.0 | 7.1 |
| Ligand | 1.3 | 33.7 | 25.9 | 45.4 | 1.3 | 14.7 | 11.3 | 26.7 |
| Hydrophilic | 2.89 | 106.6 | 36.8 | 64.5 | 3.94 | 87.6 | 22.3 | 52.4 |

TABLE 2

Volume fraction calculations for CCM-Pt-4. The mass of PI-b-PDMAEMA is 33.7 mg, of which 33 wt. % is PDMAEMA. The mass of the aged platinum NPs is 73.2 mg, of which 65 wt. % is Pt.

|  | As-made | | | | Annealed | | | |
| --- | --- | --- | --- | --- | --- | --- | --- | --- |
|  | Density | Mass (mg) | Volume (mL) | Volume % | Density | Mass (mg) | Volume (mL) | Volume % |
| PI | 0.91 | 22.6 | 24.8 | 44.1 | 0.91 | 22.6 | 24.8 | 56.7 |
| PDMAEMA | 1.15 | 11.1 | 9.7 | 17.2 | 1.15 | 11.1 | 9.7 | 22.1 |
| Pt | 21.09 | 47.9 | 2.3 | 4.0 | 21.09 | 47.9 | 2.3 | 5.2 |
| Ligand | 1.3 | 25.3 | 19.5 | 34.6 | 1.3 | 9.1 | 7.0 | 16.0 |
| Hydrophilic | 2.69 | 84.3 | 31.4 | 55.9 | 3.60 | 68.1 | 18.9 | 43.3 |

FIG. 1D shows that self-assembly of Pt NPs with block copolymer followed by annealing produced a hybrid with a regularly ordered structure, such as the inverse hexagonal morphology.

FIG. 1E shows that pyrolysis of the hybrid under inert atmosphere produced a porous Pt—C nanocomposite mesostructure.

FIG. 1F shows that an Ar—O plasma treatment or acid etch of the Pt—C produced an ordered porous Pt mesostructure.

Transmission electron microscopy (TEM) revealed that the NPs had a metal core diameter of 1.8±0.5 nm (FIG. 2A), and a model of the ligand shows a maximum radial extension of 1.4 nm (FIG. 1B).

FIG. 2 shows bright-field TEM images (A) and (C) to (I) and photograph (B) of materials produced after each stage of the synthesis.

FIG. 2A shows ligand-capped Pt NPs.

FIG. 2B shows pieces of unannealed CCM-Pt-6 inverse hexagonal hybrid film. The grid paper has 5-mm markings.

FIG. 2C shows unannealed inverse hexagonal hybrid.

FIG. 2D shows an annealed inverse hexagonal hybrid.

FIG. 2E shows that examination of the hybrid from FIG. 2D at higher magnification resolved individual Pt NPs, seen as dark spots in the bright-field image. The inset shows a typical convergent-beam electron diffraction pattern (seen with an ultra-high-vacuum scanning transmission electron microscope) from a single Pt NP, demonstrating its crystallinity.

FIG. 2F shows an annealed CCM-Pt-4 lamellar hybrid.

Figure 2G:
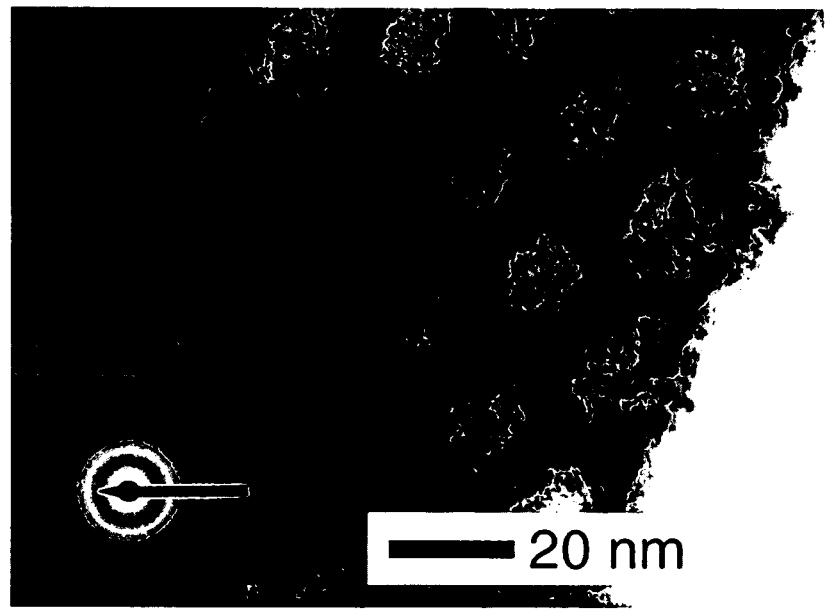

FIG. 2G shows that pyrolysis of an annealed inverse hexagonal hybrid yielded a porous Pt—C nanocomposite mesostructure. The inset shows selected area electron diffraction, revealing a Pt expected face-centered cubic scattering profile.

Figure 2H:
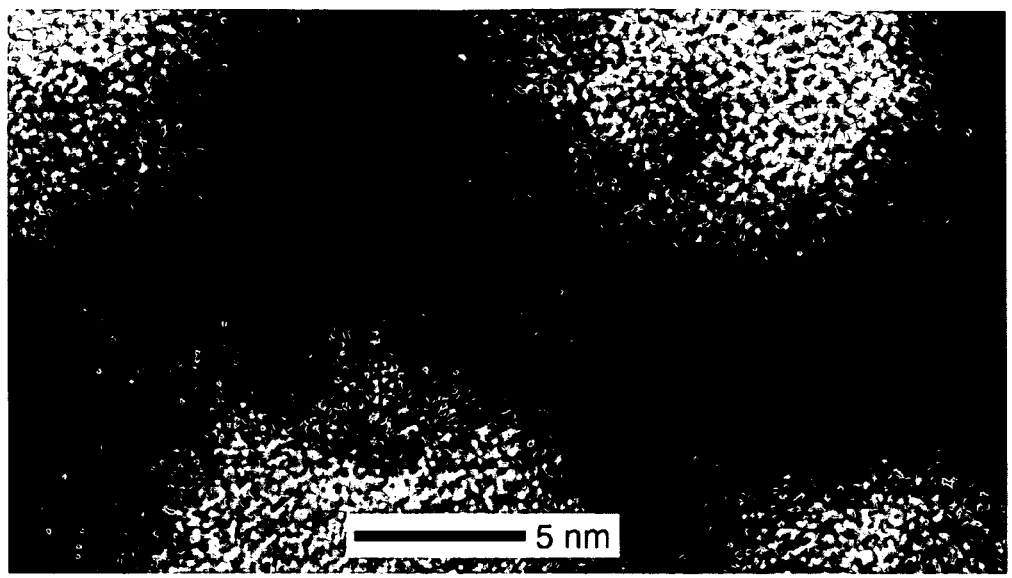

FIG. 2H shows that HRTEM of the pyrolyzed sample resolved the Pt's lattice fringes.

Figure 2I:
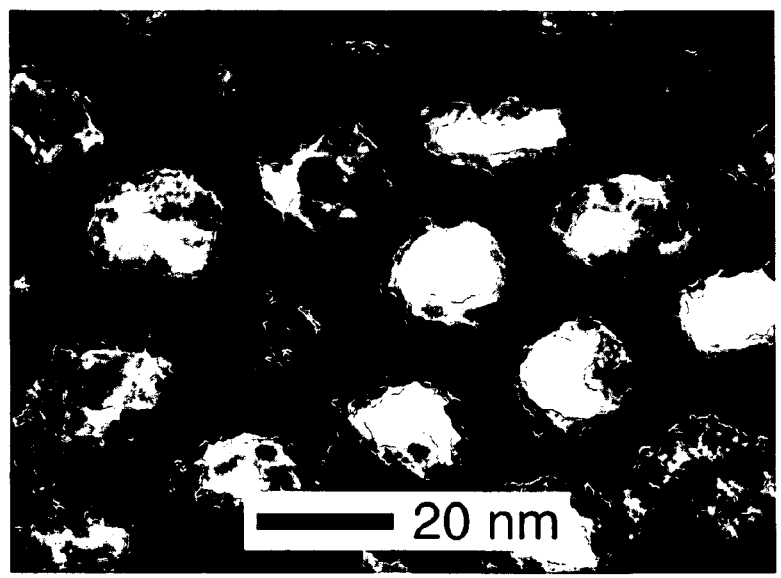

FIG. 2I shows that removal of carbon with an Ar—O plasma yielded a porous inverse hexagonal Pt mesostructure.

Nuclear magnetic resonance (NMR) confirmed the chemical structure of the ligand on the NPs, and thermogravimetric analysis (TGA) revealed a metal content of 56.9% by weight, or 7.5% by volume. The NPs exhibited hydrophilic properties. They were highly soluble in methanol, modestly soluble in water and acetone, poorly soluble in chloroform, and insoluble in tetrahydrofuran and ether. A solvent combination of chloroform and methanol [9:1 weight/weight (w/w)] was selected in which both the block copolymer and NPs exhibited high solubility. The NPs were nearly insoluble in the absence of methanol, and the polymer precipitated in solutions with >20% methanol. The as-synthesized NPs were too hydrophilic to form macroscopically homogeneous hybrids with PI-b-PDMAEMA when films were cast from a chloroform:methanol 9:1 (w/w) solution. The NPs became less hydrophilic upon aging. In particular, boiling the NPs for 5 hours in water decreased their hydrophilicity to the extent that they became more soluble in solvents of moderate or low polarity, such as tetrahydrofuran and chloroform.

After aging, the NPs were centrifuged to remove the organic byproducts of the aging process. The metal content in the aged NPs was typically 65.4% by mass or 10.4% by volume. The Pt particle size remained unchanged at 1.8 nm, as measured by TEM, and the Pt domain size increased from 1.2 to 1.4 nm, as determined by peak-width analysis of powder x-ray diffraction (PXRD, FIG. 3B).

FIG. 3 shows X-ray and physisorption measurements of materials produced after each stage of the synthesis.

FIG. 3A shows SAXS profiles of mesostructured materials. Q, scattering wave vector. Solid curves correspond to data consistent with an inverse hexagonal mesostructure (CCM-Pt-6), and the dashed curve corresponds to data consistent with a lamellar mesostructure (CCM-Pt-4). For hybrids with inverse hexagonal hybrid morphology, the (1,0) reflections of the unannealed, annealed, and pyrolized samples corresponded to d-spacings of 30.3, 30.0, and 23.7 nm, respectively. The first-order reflection of the lamellar sample corresponded to 33.1 nm. Tick marks indicate positions of expected reflections.

Figure 3B:
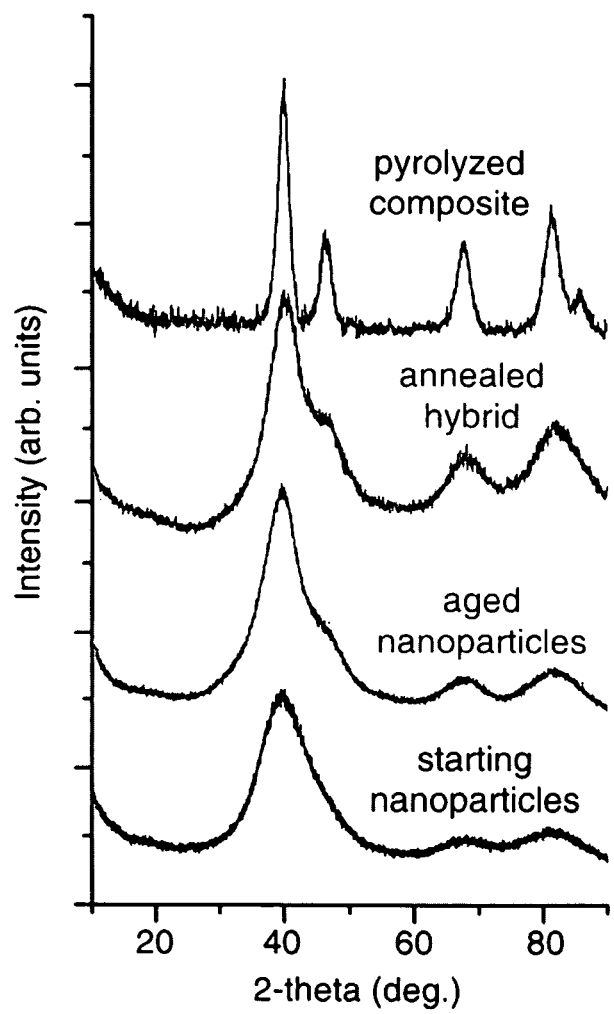

FIG. 3B shows PXRD of samples at various stages of the synthesis. The Pt domain size increased after each stage of processing, from 1.2 nm (starting NPs) to 1.4 nm (aged NPs) to 1.5 nm (annealed hybrid) to 4.1 nm (pyrolized nanocomposite), as determined by Scherrer analysis.

Figure 3C:
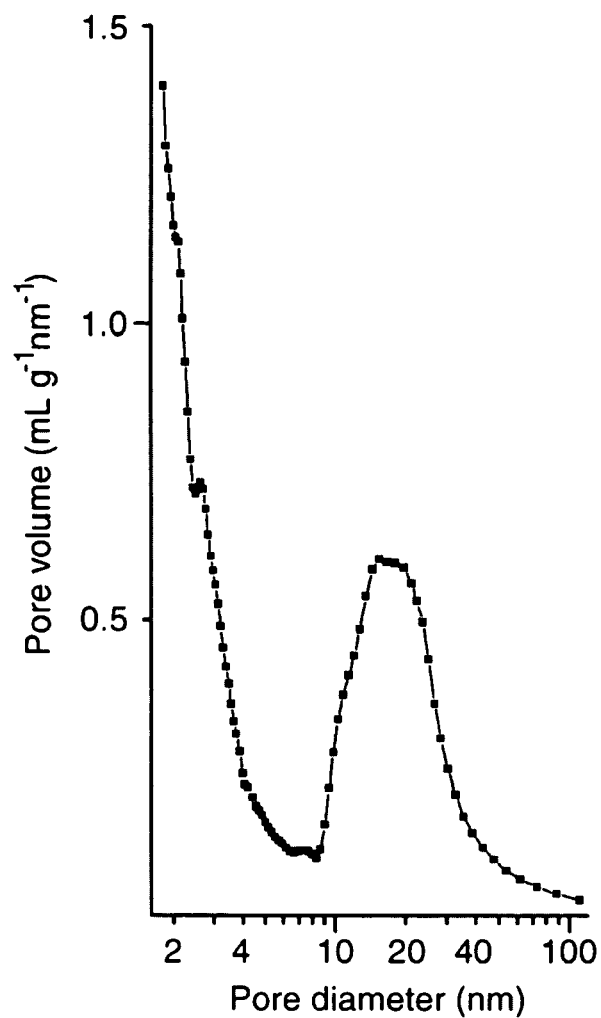

FIG. 3C shows that a Barrett-Joyner-Halenda pore size distribution as derived from a N physisorption adsorption isotherm revealed a peak mesopore diameter of 17 nm. NMR of the aged NPs showed a spectrum nearly identical to that of the as-synthesized particles. On average, a single aged NP had 65 ligands, a decrease from 93 in the as-synthesized NP. The loss of ligands upon heating has been previously documented for planar gold surfaces (E. Delamarche, B. Michel, H. Kang, C. Gerber, Langmuir 10, 4103 (1994)) and gold NPs (M. J. Hostetler, A. C. Templeton, R. W. Murray, Langmuir 15, 3782 (1999)). Interactions among polymer, ligands, metal surface, and solvents are complex, and the relative contribution of each to NP dispersibility is difficult to determine precisely. The substantial decrease in the number of charges per NP (as inferred from the loss of ligands) may be responsible for the NPs' diminished hydrophilicity. Furthermore, the loss of ligand may enhance polymer-NP interactions because the PDMAEMA's amine may chemisorb onto the more exposed Pt surface (B. J. Kim, J. Bang, C. J. Hawker, E. J. Kramer, Macromolecules 39, 4108 (2006)), thereby preventing the macrophase separation of NPs from block copolymer. Finally, the loss of ligand from the NPs increased the volume fraction of Pt in the NPs by 39%, improving the ability of the mesostructure to survive pyrolysis.

A macroscopically homogeneous solution of aged NPs and block copolymer (a) was prepared by combining 98 mg of NPs, 28 mg of block copolymer, 1040 mg of chloroform, and 110 mg of methanol. The hydrophilic volume fraction (the volume fraction of PDMAEMA and NPs) was 65%, which was anticipated to yield a hybrid with an inverse hexagonal mesostructure (CCMPt-6).

The solution contents were transferred to an aluminum dish 1 cm in diameter and heated at 50° C. beneath a hemispherical dish that was designed to slow solvent evaporation. Because chloroform's vapor pressure is greater than that of methanol, and because the solvent composition needed to be maintained near 9:1 chloroform:methanol, a 20-ml vial containing 4 g of chloroform was placed beneath the hemispherical dish, thereby slowing the evaporation of chloroform from the NP-block copolymer solution. After 1 hour of heating at 50° C., nearly all the solvent had evaporated. The sample was a homogeneous, shiny black solid and was weak and brittle (FIG. 2B). Analysis of the sample by TEM (FIG. 2C) revealed that a mesostructure had formed. The order could be improved, however, by annealing CCM-Pt-6 at 130° C. for 2 days under vacuum, as confirmed by small-angle x-ray scattering (SAXS) (FIG. 3A) and TEM (FIG. 2D). Comparison of representative SAXS patterns showed an increased intensity at higher-order reflections for the annealed sample, consistent with a hexagonal lattice (tick marks in FIG. 3A).

This structural assignment was corroborated by TEM. The representative TEM image in FIG. 2D revealed an inverse hexagonal mesostructure with grain sizes on the order of a few micrometers. Examination of the mesostructure at higher magnification (FIG. 2E) revealed that individual Pt NPs composed the walls of the CCM-Pt-6 mesostructure, with three to five NPs spanning the thickness of the wall.

Comparison of TGA profiles before and after annealing indicated a mass loss of 15% that arose from the loss of ligand. Annealing the sample also caused the diameter of the Pt NPs to increase to 2.3±0.3 nm, as measured by TEM (FIG. 2E). The annealing process thus improves hybrid order and also decomposes the ligands to the extent that the NPs merged and grew. The average grain size of the mesostructure did not increase substantially with longer annealing times, showing that ligand decomposition and NP growth were accompanied by a loss in NP mobility. Besides inverse hexagonal mesostructures (CCM-Pt-6), samples with lamellar morphology (CCM-Pt-4) were produced. PI-b-PDMAEMA copolymers (a) or (b) were used to cast hybrids from solution with a hydrophilic volume fraction of 56%. Similarly to the CCM-Pt-6 hybrid, annealing at 130° C. led to a well-developed mesostructure as confirmed by SAXS and corroborated by TEM (FIGS. 2F and 3A). These results show that like oxide structures, metal NP-block copolymer hybrid morphologies can be tailored by simply adjusting the NP volume fraction (M. Templin et al., Science 278, 1795 (1997)).

A rapid pyrolysis process (C. Liang, K. Hong, G. A. Guiochon, J. W. Mays, S. Dai, Angew. Chem. Int. Ed. 43, 5785 (2004); J. Lee et al., Nat. Mater. 7, 222 (2008)) was used to convert the inverse hexagonal hybrid CCM-Pt-6 to an ordered porous Pt—C nanocomposite mesostructure. The sample was heated at 10° C./min under N or Ar to at least 410° C., followed by immediate cooling. Under these conditions, the sp2-hybridized carbons of the PI block decompose into an amorphous C-rich material with slight graphitic character (FIG. 4A) (J. Lee et al., Nat. Mater. 7, 222 (2008)).

FIG. 4A shows Raman spectra of pyrolyzed CCM-Pt-6 (top) and Ar—O plasma-treated CCM-Pt-6 (bottom).

FIG. 4B shows EDS of pyrolyzed CCM-Pt-6. The pie chart displays elemental weight fractions. The sample was on a Si substrate and the primary energy was 10 keV. Pt=74 wt %, C=18 wt %, O=7 wt %, and S=1 wt %.

FIG. 4C shows EDS of acid-treated CCM-Pt-6. Pt= 98 wt %, C=1 wt %, and O=0.5 wt %.

Figure 4D:
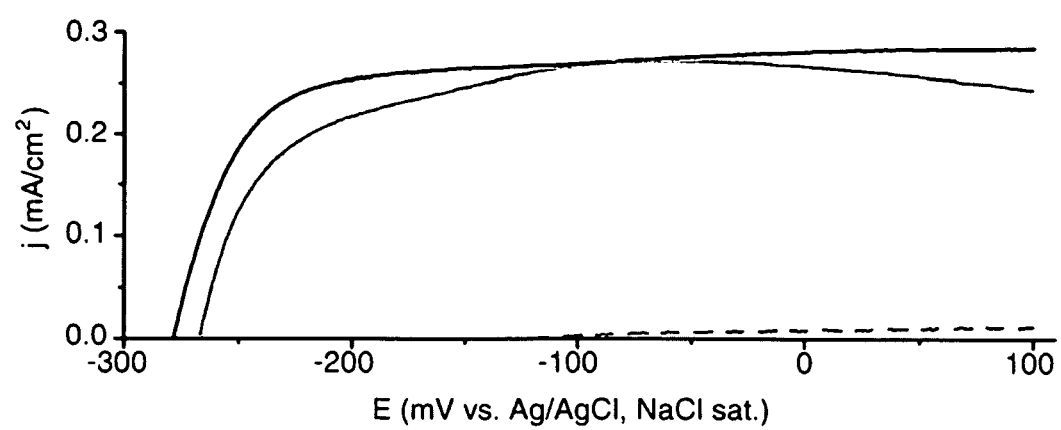

FIG. 4D shows polarization curves of the $H_2$ oxidation reaction in $H_2$-saturated 0.1 M $H_2SO_4$ solution (at 2000 rpm and 10 mV/s). Dashed line, porous Pt—C nanocomposite mesostructure; grey curve, porous Pt mesostructure; black curve, planar Pt electrode. E, potential; sat., saturated.

As determined by TGA, the pyrolysis led to a mass loss of 28%. Heating the material to temperatures as high as 550° C. did not result in further mass loss. The pyrolysis was accompanied by a decrease in the (1,0) d-spacing from 30.0 to 23.7 nm, as revealed by analysis of the SAXS patterns (FIG. 3A). Characterization of the resulting material by TEM (FIG. 2G) indicated that the inverse hexagonal structure was preserved. At the same time, the Pt interface had roughened, because of the growth of the NPs to 3.3±0.9 nm in diameter. A roughened interface upon pyrolysis is consistent with the loss of higher-order peaks observed in the SAXS profile.

Examination of the structure by high-resolution TEM (HR-TEM) revealed lattice fringes throughout the Pt walls (FIG. 2H), showing that the walls were composed of crystalline Pt. Analysis by PXRD and application of the Scherrer equation indicated that the Pt nanocrystals' domain size was 4.1±0.4 nm (FIG. 3B), representing a substantial increase from the aged NPs. Together, SAXS, PXRD, and TEM analyses provide a consistent picture of a metal-C nanocomposite that is macroscopically homogeneous and uniformly mesostructured.

The C plays an important role in maintaining open, uniform pores of CCM-Pt-6 during pyrolysis (J. Lee et al., Nat. Mater. 7, 222 (2008)). If the hybrid is heated in air instead of an inert atmosphere, the C is removed (a mass loss of 38% occurs) and the mesostructure is lost. This shows that the Pt NPs experienced reduced mobility and aggregation within the carbonaceous matrix. In contrast, in the absence of C, the NPs sinter in an uncontrolled fashion. The grainy texture in the TEM images after sintering indicated C with a low graphite content (FIG. 2, G and H, for TEM and FIG. 1E for illustration), which was confirmed by Raman spectroscopy (FIG. 4A). Graphitic C has signature D and G bands around 1350 cm−1 and 1550 cm−1, respectively (A. C. Ferrari, J. Robertson, Phys. Rev. B 61, 14095 (2000)). The weak Raman signature of the C in the hybrid was probably caused by the relatively low temperature (410° C.) reached during pyrolysis.

Finally, N physisorption indicated that the mesopores are open (FIG. 3C) and that 26% of the sample's volume (micropores and mesopores) was open space, as expected for an inverse hexagonal nanocomposite that has pores lined with C. The Brunauer-Emmett-Teller surface area of CCMPt-6 was 18 m2/g, and the pore diameter was 17 nm.

For many applications, such as fuel cells, it is desirable for the metal surface to be completely exposed. A route was thus sought to remove the C from the CCM-Pt-6 nanocomposite. Heating the pyrolized sample in air to 500° C. removed the C but also caused the mesostructure to collapse. Instead, the C from microtomed thin films (~50 nm thick) of the CCM-Pt-6 nanocomposite was removed using an Ar—O plasma. The porous Pt mesostructure was structurally similar to the Pt—C nanocomposite mesostructure, as determined by TEM (FIG. 2I). Close inspection of the pores in TEM images revealed that the grainy texture indicative of the C had disappeared. Furthermore, Raman spectra showed the absence of the D and G bands, showing that the C material had been successfully removed (FIG. 4A). Alternatively, for thicker films (10 to 100 mm thick), a sulfuric acid:nitric acid 3:1 (v/v) etch at 70° C. (J. Liu et al., Science 280, 1253 (1998)) successfully removed most C.

Electrochemical data from acid-etched samples indeed confirmed that the metal surface was exposed, showing current densities nearly identical to that of bulk Pt (FIG. 4D). Energy-dispersive spectroscopy (EDS) on the CCM-Pt-6 metal-C nanocomposites (FIG. 4B) showed a composition of 74 wt % Pt, 18 wt % C, 7 wt % O, and 1 wt % S. By contrast, after the plasma treatment, EDS revealed that >98 wt % of the sample was Pt, with only trace contributions from C and O (FIG. 4C). C removal was further confirmed by TGA. Pyrolyzed samples retained 80% of the original mass when heated to 550° C. in air, whereas C-etched samples retained 97% of their original mass. TEM confirmed that the samples were still mesostructured and that the grainy texture indicative of C had disappeared.

Because of the easier accessibility of large quantities, the electrical conductivity of only of the CCM-Pt-6 Pt—C nanocomposites was measured. Two-point measurements were made, which slightly underestimate the true conductivity.

For bulk use the material can be protected from impact and other damage. Brittleness, moreover, will not be an issue in static thin-film geometries that are most relevant for applications.

The NP-polymer hybrid had a conductivity of 2.5 mS/cm, which increased to 400 S/cm upon pyrolysis. Despite the presence of C, this value represented the highest electrical conductivity yet measured for ordered porous mesostructured materials derived from block copolymers.

Because polymer-NP interactions are largely mediated via the NP ligands, this approach can be extended to other metals for which similarly sized ligand-stabilized NPs can be synthesized. Thus, using the methods described herein, ordered porous metal mesostructures of other elements, disordered alloys, or even ordered intermetallics can be produced. Furthermore, these methods can be used to produce new classes of ordered porous metal mesostructures made from NPs of distinct compositions. Such nanoheterogeneous porous metal mesostructures can have a range of exceptional electrical, optical, and catalytic properties.

6.2 Example 2

Synthesis of Metal-Silica Nanocomposite Mesostructure

This example describes the formation of a metal-silica nanocomposite during heat treatment of a metal NP-block copolymer hybrid.

The formation of a metal-silica nanocomposite can be achieved by using an amphiphilic block copolymer that contains silicon, for example, polydimethylsiloxane. Upon heat treatment under an inert atmosphere, an ordered porous metal/silica/carbon nanocomposite mesostructure will form. Upon heat treatment in air, an ordered porous metal/silica nanocomposite mesostructure will form. In either case, the carbon/silica or silica ensures that structural order is maintained by limiting the aggregation of the metal NPs. Block copolymers of alternate compositions can be employed. Examples of such hydrophobic block copolymers include but are not limited to polynorbornene-decarborane which transforms under heat into boron carbonitride and boron nitride and polysilazanes which transform under heat into silicon carbonitride and silicon carbide.

6.3 Example 3

Hydrophobic Block Copolymer that Forms an Inorganic/Ceramic Material

This example describes the use of a hydrophobic block copolymer that forms an inorganic/ceramic material.

Rather than forming a carbonaceous material upon heating, a hydrophobic block copolymer is chosen such that it disintegrates into another inorganic/ceramic material. The inorganic material plays the same role as the carbonaceous material formed from sp or sp2 hybridized carbon containing hydrophobic blocks, i.e. it will act as a scaffold to keep the structure intact upon crystallization of the transition metal oxide. This leads to the formation of a nanostructured inorganic/ceramic-transition metal oxide nanocomposite which can be of value. Examples for such hydrophobic block copolymers include but are not limited to polynorbornene-decarborane which transforms under heat into boron carbonitride and boron nitride and polysilazanes which transform under heat into silicon carbonitride and silicon carbide.

6.4 Example 4

Porous Metal Mesostructures Comprising Metals Other than Platinum or Palladium Multiple compositions of matter in addition to those described for platinum can be made according to the methods of the invention. Generally, the methods provided herein for making porous metal mesostructure compositions can be extended to a range of metals, as long as they meet the following criteria. These criteria apply specifically to metal NPs made of a single metal, but not necessarily to NPs made of two or more metals. These criteria are listed in addition to the four criteria described in above in Section 5.1.

6.4.1 Criteria for Metals that can be Used to Make Porous Metal Mesostructure Compositions Criterion of Positive Reduction Potential.

The chosen metal should have a relatively positive reduction potential; thus the metal does not readily react with oxygen or water. The reduction potential should be more positive than approximately −0.5 V, preferably more positive than +0.3 V. Metals with reduction potentials more positive than +0.3 V include but are not limited to Cu, Tc, Ru, Rh, Pd, Ag, Re, Os, Ir, Pt, Au, Hg, Tl, Bi, and Po.

Some metals or semi-metals that have reduction potentials more negative than +0.3 V or −0.5 V are also acceptable candidates in this process if their tendency to form oxides can be inhibited. For example, aluminum forms a self-limiting oxide layer that inhibits further oxide growth. Other metals or semi-metals can be appropriately protected via the adsorption of a passivating layer. For example, the presence of a covalently bound methyl group (or more complicated organic species, such as alkane-based derivatives of the ligand presented in this patent) successfully prevent oxide formation.

Criterion of Low Metal Diffusion Rate.

A high diffusion rate of the metal can lead to collapse of the mesostructure, as described in for the case of gold. That is, gold has a relatively high diffusion rate, even at modest temperatures. The diffusion rate increases as the temperature is increased; thus processing the material at as low a temperature as possible will favor the incorporation of a wider range of metals. Notably, hybrid formation is typically performed at 50° C., and thus nearly every metal listed in criterion (1) should be acceptable for use (with the notable exception of mercury). Furthermore, mesoporous thin films can be produced via low temperature processing (i.e., avoiding the pyrolysis step). Specifically, thin films of the hybrid can be produced (via, e.g., spin-coating or dip-coating) and converted to a mesoporous or mesostructured material by directly treating the thin film with an argon-oxygen plasma. Alternatively, thin films (of a thickness between 20 nm and 200 nm) can be prepared from thick films by, e.g., microtoming. Subsequent treatment with an argon-oxygen plasma will also convert the material into an ordered porous metal mesostructure. Thus, by using these lower temperature processing routes, mesostructure collapse can be circumvented and metals can be incorporated that have modest melting points and modest diffusion rates. If hybrid films are to be pyrolyzed, however, higher melting points (and lower diffusion rates) are preferably used. Thus, the melting point of the bulk metal should be higher than 700° C., or more preferably higher than 1070° C. Metals with melting points higher than 1070° C. and that also meet criterion (1) include Cu, Tc, Ru, Rh, Pd, Re, Os, Ir, and Pt. Thus, a process involving an elevated temperature (400° C. or higher) pyrolysis will be largely confined to noble metals and the neighboring transition metals.

Ligand-stabilized metal NPs of the appropriate size, wherein the metals meet criterion the criterion of having positive reduction potential, include, but are not limited to Cu, Ru, Rh, Pd, Ag, Ir, Pt, Au, and Bi. For each of these, thiols similar or identical to N,N-di-2-propoxyethyl-N-3-mercaptopropyl-N-methylammonium chloride can be used to stabilize the particles.

Criterion of tunable ligand density. A tunable ligand density allows particle hydrophilicity to be controlled and also enables the metal surface to be exposed to the polymer. In the case of platinum, the ligand density can be decreased by boiling the particles in water. The success of this or similar protocols depends on the binding energy of the ligand to the surface. The binding energy of thiols to Cu, Ru, Rh, Pd, Ag, Ir, Au, and Bi is similar or less than the binding energy of thiols to Pt; thus this is a generalizable method and has, in fact, been reported for other metals.

There are notable exceptions to the criteria discussed above, owing to the flexibility in the synthesis methods of the invention. The most important exception is the ability to extend the synthesis method to less noble metals. This results primarily from the reductive nature of the pyrolysis process, as well as the ease with which the hybrids or nanocomposites can be processed under an inert atmosphere. Other exceptions include flexibility in the structure of the ligand that is attached to the NP.

Reductive pyrolysis broadens the scope of metals that can be employed by circumventing the criterion of having a positive reduction potential. Pyrolysis is an inherently reductive process. In pyrolysis, the sample is heated in an inert atmosphere, causing the organic components of the sample to decompose into a variety of hydrocarbons and partially oxidized molecular species. These molecular species have the ability to act as reducing agents. One of the largest byproducts of pyrolysis is carbon monoxide, which is a stronger reducing agent than hydrogen. Thus, even if the metal NPs incorporated in the hybrid are partially oxidized because of their less than optimal reduction potential, it is possible to reconvert the metal oxide back into the metal during the pyrolysis. Metals for which this reduction can happen by 410° C. include Ag, Au, Bi, Cd, Co, Cu, Fe, Hg, Ir, Os, Pd, Po, Pt, Re, Rh, Ru, Tc, and Tl. By 800° C., Ge, Sn, and W can also be reduced.

Another criterion is handling under inert atmospheres. It may be desirable to handle metal NPs that oxidize easily under an inert atmosphere. The synthesis of the NPs is performed in inherently reductive conditions since a strong reducing agent is employed. The NPs can also be purified entirely under an inert atmosphere, further preventing the reduction of the metals. The synthesis of the hybrids can be performed in air as well as in an inert atmosphere. The use of methanol and chloroform for casting the hybrid makes this process especially amenable to inert environments since neither solvent is a strong oxidant. As mentioned above, pyrolysis is an inherently reductive process. The nanocomposites produced from the pyrolysis can be handled under an inert atmosphere (if necessary) to preserve their metallic character.

Another criterion is flexibility in ligand structure. The ligand for the NPs, N,N-di-2-propoxyethyl-N-3-mercaptopropyl-N-methylammonium chloride, is not the only structure for which hybrids can be made. There are several derivatives of the ligand which work just as well, including N,N-di-2-propoxyethyl-N-3-mercaptopropyl-N-methylammonium bromide and mixtures of the chloride and bromide. Other derivatives are possible, including the unhydrogenated form of the ligand, N,N-di-2-allyloxyethyl-N-3-mercaptopropyl-N-methylammonium chloride, N,N-di-2-allyloxyethyl-N-3-mercaptopropyl-N-methylammonium bromide, and mixtures of the halides. Furthermore, mixtures of any of the above-mentioned ligands work as well, i.e., mixtures of the hydrogenated and unhydrogenated forms with various halide anions. Other derivations of the ligand are possible, such as modification in the length (number of carbons and oxygens) in each of the substituents attached to the ammonium (see Section 5.2).

In addition to ordered materials, poorly ordered (disordered) materials can be made. This can be achieved by omitting the annealing protocol.

6.4.2 Gold-Containing Compositions

Although gold has relatively high surface atom mobility and relatively low melting point, it is possibly to work with gold by avoiding temperatures above 200 to 300° C. As discussed above, the high temperature pyrolysis can be avoided by working with thin films and using an argon-oxygen plasma for removal of all organic material. NP synthesis is similar to platinum except that a salt such as gold (III) chloride is utilized. Either an argon-oxygen plasma or an etch with nitric acid/sulfuric acid successfully removes carbon without significant oxidation of gold.

6.4.3 Silver-Containing Compositions

The situation is essentially identical to gold. Low processing temperatures are required. A silver salt, such as silver (I) chloride, or silver (1) nitrate is utilized and about a quarter as much reducing agent is required, as compared to the synthesis with platinum.

6.4.4 Copper-Containing Compositions

Copper (I) chloride is used as the starting salt. Greater care is required during handling to prevent the oxidation of the copper metal to copper oxide. Less reducing agent (about a quarter as much as for platinum) is required for the NP synthesis. Removal of carbon from the copper-carbon nanocomposite is performed via an argon-oxygen plasma to avoid oxidation of copper by the nitric acid/sulfuric acid solution.

6.4.5 Rhodium-containing compositions

A rhodium salt such as rhodium (III) chloride trihydrate is used as the starting salt. The high melting point of rhodium allows the sample to be pyrolized. Removal of carbon from the rhodium-carbon nanocomposite is performed via an argon-oxygen plasma to avoid oxidation of rhodium by the nitric acid/sulfuric acid solution.

6.4.6 Ruthenium-Containing Compositions

A ruthenium salt such as ruthenium (III) chloride is used as the starting salt. The ruthenium NPs are slightly less stable than the platinum NPs and so they must be purified and used rapidly. The high melting point of ruthenium allows the sample to be pyrolized. Removal of carbon from the ruthenium-carbon nanocomposite is performed via an argon-oxygen plasma to avoid oxidation of ruthenium by the nitric acid/sulfuric acid solution.

6.4.7 Iridium-Containing Compositions

An iridium salt such as iridium (III) chloride is used as the starting salt. The high melting point of ruthenium allows the sample to be pyrolized. Either an argon-oxygen plasma or an etch with nitric acid/sulfuric acid successfully removes carbon without significant oxidation of iridium.

6.4.8 Bismuth-Containing Compositions

Bismuth NPs are preferably formed using a different synthesis procedure because these particles tend to be somewhat air sensitive. In one embodiment, bismuth acetate and the thiol N,N-di-2-propoxyethyl-N-3-mercaptopropyl-N-methylammonium chloride is combined in a 1:3 molar ratio in anhydrous THF under nitrogen. The solution is irradiated with UV light (at 365 nm) from a hand-held chromatography lamp for 1 week. The irradiation causes a ligand-to-metal charge transfer, thereby reducing the bismuth salt to bismuth metal and spontaneously forming bismuth NPs that are capped by the thiol. These NPs can be exposed to air for short periods of time at room temperature without completely oxidizing the bismuth. Thus it is preferable to purify the NPs and cast hybrids from the bismuth particles in an inert atmosphere. Furthermore, because of the low melting point of bismuth, it is preferable to remove the organic components of the hybrid with an argon-oxygen plasma.

6.5 Example 5

Porous Metal-Ceramic Nanocomposite Mesostructures

Ordered, porous metal-ceramic nanocomposite mesostructures can be made according to the methods of the invention. This class of materials includes a hybrid (mesostructured metal NPs and sol-gel material with block copolymer), a nanocomposite (the pyrolized hybrid, consisting of an ordered porous metal/metal oxide/carbon nanocomposite mesostructure), and a carbon free-nanocomposite, composed of just the metal and the metal oxide.

Numerous sol-gel routes are known, and many of these are compatible with block copolymers self-assembly. These sol-gel procedures are compatible with the non-aqueous conditions (methanol, chloroform) used for casting hybrid films of metal NPs with block copolymers. Casting can be performed, e.g., in air or in an inert environment such as $N_2$ or Ar.

Thus a wide variety of different mesostructured metal-ceramic nanocomposites can be produced by mixing a sol of ceramic NPs with metal NPs, including but not limited to the mesostructured metal-ceramic nanocomposites disclosed in U.S. Pat. No. 6,592,991 (entitled "Block of copolymer phases as templates for structured organic-inorganic hybrid materials" by Wiesner et al., Jul. 15, 2003). The same range of metal NPs can be used in this process as for mesostructures without a ceramic sol. Sol-gel materials compatible with this process are an organically modified aluminosilica sol-gel, a sol-gel process based on the universal ligand, a silica sol-gel, and non-hydrolytic sol-gel processes, such as those based on titania or niobia. The ceramic sol can be mixed with the metal NPs in any ratio.

The samples can be pyrolized to remove the organic components. This enables the residual carbon to act as a scaffold to maintain the structure as the ceramic and/or metal crystallizes.

Depending on the ceramic/metal ratio, various strategies can be employed to remove the carbon. At modest to high ceramic ratios, the metal/ceramic/carbon nanocomposite can simply be heated in air to remove the carbon. At higher metal loadings, the carbon can be removed using a sulfuric acid/nitric acid etch or an argon-oxygen plasma.

At high metal loadings (low ceramic loadings), a metal percolation network will form in the walls of the ordered porous metal-metal oxide nanocomposite mesostructure, leading to a material with high electrical conductivity. At low metal loadings (high ceramic loadings) a ceramic percolation network will form.

6.6 Example 6

Mesostructuring Metals and Metal-Ceramic Nanocomposites with Triblock Copolymers Beyond structuring metal NPs with diblock copolymers, metals can be structured with triblock copolymers. Triblock copolymers provide improved structural control and development of more complex morphologies.

The metal NP-triblock copolymer hybrids have a hydrophilic block in the block copolymer that is capable of chemisorbing onto the surface of metal NPs to create a more favorable interaction between the NP and the polymer. For example, polymers such as poly(dimethylaminoethyl methacrylate), poly(2-vinylpyridine), and poly(4-vinylpyridine) are acceptable blocks. The two other blocks preferably enhance the polymer's solubility in chloroform/methanol solvent combinations.

For metal-ceramic nanocomposites from triblock copolymers, either the metal NPs are directed into the same or a different block as the ceramic NPs. As discussed above, the metal NPs favorably interact with hydrophilic blocks that are capable of chemisorption onto the metal surface (typically containing amines, phosphines, thiols, etc.). A second hydrophilic block can interact favorably with ceramic NPs. In particular, the use of PEO can interact strongly with metal oxide sols without interacting strongly with the metal NPs. To direct the metal NPs into the same block as the ceramic NPs, the hydrophilic block should be capable of chemisorption onto the metal surface and the two other blocks should be relatively hydrophobic so that the metal sol prefers to swell the domain with the metal NPs.

For both diblock and triblock copolymers, the length scale of the hybrid, nanocomposite mesostructure, and porous metal mesostructure can be tuned through polymer molecular weight. Using block copolymers as small as 5,000 g/mol, or, more preferably 8,000 g/mol, can lead to structures with repeat spacings of approximately 8 nm. The process can easily be extended to larger polymers, enabling the production of mesostructures with repeat spacings of up to 150 nm.

Mesostructures other than lamellar and inverse hexagonal from diblock copolymers can be produced, simply by varying the ratio between NP and block copolymer. Bicontinuous morphologies, hexagonal morphologies, bcc spheres morphologies are produced by adding varying the ratio between NP and block copolymer.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

All references cited herein are incorporated herein by reference in their entirety and for all purposes to the same extent as if each individual publication, patent or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

What is claimed is:

1. A method of preparing a nanocomposite mesostructure which comprises:
    (a) providing a block copolymer/ligand-stabilized nanoparticle solution;
    (b) casting said solution resulting in the formation of a mesostructured nanoparticle-block copolymer hybrid; and
    (c) heating said hybrid in an inert atmosphere to an elevated temperature for pyrolysis, thereby achieving pyrolysis and resulting in the formation of an ordered porous nanocomposite mesostructure, wherein:
    in step (a), the block copolymer/ligand-stabilized nanoparticle solution is a block copolymer/ligand-stabilized metallic nanoparticle solution in which nanoparticles are selected from the group consisting of semiconductor, insulator, metal, metal alloy, metal mixture, and intermetallic nanoparticles or combinations of metal, metal alloy, metal mixture and intermetallic nanoparticles; and in step (c) the porous nanocomposite mesostructure is a porous semiconductor-carbon, insulator-carbon, or metal-carbon nanocomposite mesostructure.

2. The method of claim 1 wherein the ligand-stabilized nanoparticle solution comprises metallic nanoparticles, semiconductor nanoparticles, insulator nanoparticles or combinations thereof.

3. The method of claim 1 wherein said block copolymer includes a hydrophobic portion which comprises sp or $sp^2$ hybridized carbon atoms.

4. The method of claim 1 wherein the ligand-stabilized metallic nanoparticle further comprises a nonmetallic component selected from the group consisting of a semiconductor and an insulator.

5. The method of claim 4 wherein the semiconductor is selected from the group consisting of a transition metal oxide, a type IV semiconductor, a type III-V semiconductor and a type II-VI semiconductor.

6. The method of claim 1 in which following step (c), carbon is removed to produce an ordered porous metal, semiconductor or insulator mesostructure.

7. The method of claim 6 in which the carbon is removed by the use of a plasma, by acid etch or by heat treatment in air.

8. The method of claim 1 wherein the ordered porous nanocomposite mesostructure has a unit cell size of ≥10 nm.

9. The method of claim 1 wherein the ordered porous nanocomposite mesostructure has structural feature sizes of ≥10 nm.

10. The method of claim 6 wherein the ordered porous metal, semiconductor or insulator mesostructure has a unit cell size of ≥10 nm.

11. The method of claim 6 wherein the ordered porous metal, semiconductor or insulator mesostructure has structural features sizes of ≥10 nm.

12. The method of claim 1 in which the ordered porous metal-carbon nanocomposite mesostructure is an ordered porous platinum nanocomposite mesostructure.

13. The method of claim 12 in which in step (a), the block copolymer/ligand-stabilized nanoparticle solution is a PI-b-PDMAEMA block copolymer-ligand-stabilized platinum nanoparticle solution;
    in step (b), casting the solution results in the formation of a platinum rich mesostructured nanoparticle-block copolymer hybrid; and
    in step (c), heating the hybrid in the inert atmosphere to the elevated temperature results in the formation of an ordered porous platinum-carbon nanocomposite mesostructure.

14. The method of claim 13 in which following step (c), the carbon is removed to produce an ordered porous platinum mesostructure.

15. The method of claim 1 in which the metal is selected from the group consisting of platinum, palladium, gold, silver, copper, rhodium, ruthenium, iridium and bismuth.

16. The method of claim 1 in which the metal component comprises at least two distinct metals.

17. The method of claim 16 in which the at least two metals comprise an alloy, a metal mixture or an intermetallic.

18. The method of claim 1 in which the ligand comprises N,N-di-2-propoxyethyl-N-3-mercaptopropyl-N-methylammonium chloride or N,N-diethoxyethyl-N-methyl-N-3-mercaptopropyl ammonium chloride.

19. The method of claim 1 in which the nanoparticle has high solubility in organic solvents.

20. The method of claim 1 in which the nanoparticle has a metal volume fraction of at least 3%.

21. The method of claim 1 in which the nanoparticle has a semiconductor or insulator volume fraction of at least 3%.

22. The method of claim 1 in which the nanoparticle has dispersion in a block of the block copolymer from 5-95 vol. %.

23. The method of claim 1 in which the diameter of the nanoparticle is equal or below the root mean square end-to-end distance relative to the size of the block of the block copolymer with which it mixes.

24. A composition comprising an ordered porous metal-carbon nanocomposite mesostructure having:
    a unit cell size in the range of about 10 nm to about 80 nm,
    metal nanoparticles in a concentration above 5% by volume,
    block copolymer-type morphology, and
    a high degree of structural order (periodicity) as characterized by analysis of said nanocomposite mesostructure in reciprocal space.

25. The composition of claim 24 having metal nanoparticles in a concentration above 10% by volume.

26. An ordered porous metal mesostructure having:
    a pore size in the range of about 5 nm to about 70 nm,
    block copolymer-type morphology, and
    a high degree of structural order (periodicity) as characterized by analysis of said nanocomposite mesostructure in reciprocal space.

27. The compositions of claim 24 or 26 wherein the block copolymer-type morphology is selected from the group consisting of cubic micellar, hexagonal cylinder, lamellar, and bicontinuous cubic morphology.

28. The method of claim 1 wherein the metallic nanoparticle solution comprises metallic nanoparticles made from different metals or from a combination of different metals.

29. The method of claim 1 wherein the semiconductor is selected from the group consisting of a transition metal oxide, a type IV semiconductor, a type III-V semiconductor and a type II-VI semiconductor.

* * * * *